US009621323B2

(12) United States Patent
Han et al.

(10) Patent No.: US 9,621,323 B2
(45) Date of Patent: Apr. 11, 2017

(54) METHOD FOR TRANSMITTING CONTROL INFORMATION AND APPARATUS FOR SAME

(75) Inventors: Seunghee Han, Anyang-si (KR);
Hyukmin Son, Anyang-si (KR);
Hyeyoung Choi, Anyang-si (KR);
Hyunwoo Lee, Anyang-si (KR);
Jinmin Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 17 days.

(21) Appl. No.: 14/232,140

(22) PCT Filed: Jul. 16, 2012

(86) PCT No.: PCT/KR2012/005646
§ 371 (c)(1),
(2), (4) Date: Jan. 10, 2014

(87) PCT Pub. No.: WO2013/009154
PCT Pub. Date: Jan. 17, 2013

(65) Prior Publication Data
US 2014/0169315 A1   Jun. 19, 2014

Related U.S. Application Data

(60) Provisional application No. 61/507,611, filed on Jul. 14, 2011, provisional application No. 61/508,081, (Continued)

(51) Int. Cl.
*H04L 5/00* (2006.01)
*H04L 1/18* (2006.01)
*H04L 27/26* (2006.01)

(52) U.S. Cl.
CPC .......... *H04L 5/0055* (2013.01); *H04L 1/1861* (2013.01); *H04L 5/001* (2013.01); *H04L 5/0017* (2013.01); *H04L 27/2627* (2013.01)

(58) Field of Classification Search
None
See application file for complete search history.

(56) References Cited

U.S. PATENT DOCUMENTS 8,634,370 B2*   1/2014   Yu et al. .................. 370/329
2009/0196229 A1*   8/2009   Shen et al. .................. 370/328
(Continued)

FOREIGN PATENT DOCUMENTS

| KR | 1020110073334 A | 6/2011 |
| WO | 2010090492 A2 | 8/2010 |
| WO | 2011052961 A2 | 5/2011 |

OTHER PUBLICATIONS

"3rd Generation Partnership Project; Technical Specification Group Radio Access Network; Evolved Universal Terrestrial Radio Access (E-UTRA); Physical layer procedures (Release 10)", 3GPP Standard; 3GPP TS 36.213, 3rd Generation Partnership Project (3GPP), Mobile Competence Centre; vol. RAN WG1, No. V10.2.0, Jun. 22, 2011, pp. 1-120, XP050553381.
(Continued)

*Primary Examiner* — Hoon J Chung
*Assistant Examiner* — Zhensheng Zhang
(74) *Attorney, Agent, or Firm* — Dentons US LLP

(57) ABSTRACT

A method for transmitting uplink control information and an apparatus thereto are disclosed, wherein the method includes: generating a plurality of HRAQ-ACKs; selecting one first resource index and two second resource indices, each corresponding to the plurality of HARQ-ACKs; transmitting through a first antenna port a first modulation symbol and a first reference signal for demodulating the first modulation symbol; and transmitting through a second antenna port a second modulation symbol and a second reference signal for demodulating the second modulation symbol. Both a transmission resource for the first modulation symbol and a transmission resource for the first refer-
(Continued)

ence signal are given using one first resource index. A transmission resource for the second modulation symbol is given using one of two second resource indices, and a transmission resource for the second reference signal is given using the other of two second resource indices.

12 Claims, 12 Drawing Sheets

Related U.S. Application Data filed on Jul. 15, 2011, provisional application No. 61/508,695, filed on Jul. 18, 2011, provisional application No. 61/510,498, filed on Jul. 22, 2011, provisional application No. 61/512,918, filed on Jul. 29, 2011, provisional application No. 61/523,845, filed on Aug. 16, 2011, provisional application No. 61/524,335, filed on Aug. 17, 2011, provisional application No. 61/524,737, filed on Aug. 17, 2011, provisional application No. 61/524,777, filed on Aug. 18, 2011, provisional application No. 61/537,585, filed on Sep. 22, 2011.

(56) References Cited

U.S. PATENT DOCUMENTS

| 2010/0172308 A1* | 7/2010 | Nam et al. ............ 370/329 |
| 2010/0272048 A1* | 10/2010 | Pan ............ H04L 1/1635 370/329 |
| 2010/0303035 A1* | 12/2010 | Gao et al. ............ 370/329 |
| 2011/0013615 A1 | 1/2011 | Lee et al. |
| 2011/0268062 A1* | 11/2011 | Ji ............ H04L 5/0055 370/329 |

OTHER PUBLICATIONS

International Search Report from PCT/KR2012/005646, dated Jan. 23, 2013.
Written Opinion of the ISA from PCT/KR2012/005646, dated Jan. 23, 2013.

* cited by examiner

PUCCH format 1a and 1b structure (normal CP case)

PUCCH format 1a and 1b structure (extended CP case)

METHOD FOR TRANSMITTING CONTROL INFORMATION AND APPARATUS FOR SAME

This application is a 35 USC §371 National Stage entry of International Application No. PCT/KR2012/005646, filed on Jul. 16, 2012, and claims priority of U.S. Provisional Application Nos. 61/507,611 filed Jul. 14, 2011; 61/508,081 filed Jul. 15, 2011; 61/508,695 filed Jul. 18, 2011; 61/510,498 filed Jul. 22, 2011; 61/512,918 filed Jul. 29, 2011; 61/523,845 filed Aug. 16, 2011; 61/524,335 filed Aug. 17, 2011; 61/524,737 filed Aug. 17, 2011; 61/524,777 filed Aug. 18, 2011; and 61/537,585 filed Sep. 22, 2011, which are each hereby incorporated by reference in its entirety.

TECHNICAL FIELD

The present invention relates to a wireless communication system, and more particularly, to a method for transmitting control information and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Problem

An object of the present invention devised to solve the problem lies in a method for efficiently transmitting control information in a wireless communication system and an apparatus for the same. Another object of the present invention is to provide a method for efficiently transmitting uplink control information and efficiently managing resources for uplink control information transmission and an apparatus for the same in a multi-antenna system.

The technical problems solved by the present invention are not limited to the above technical problems and those skilled in the art may understand other technical problems from the following description.

Technical Solution

The object of the present invention can be achieved by providing a method for transmitting uplink control information in a wireless communication system, including: generating a plurality of hybrid ARQ acknowledgements (HARQ-ACKs); selecting, from among a plurality of resource indices, one first resource index and two second resource indices corresponding to the plurality of HARQ-ACKs; transmitting, through a first antenna port, a first modulation symbol corresponding to the plurality of HARQ-ACKs and a first reference signal for demodulating the first modulation symbol; and transmitting, through a second antenna port, a second modulation symbol corresponding to the plurality of HARQ-ACKs and a second reference signal for demodulating the second modulation symbol, wherein both a transmission resource for the first modulation symbol and a transmission resource for the first reference signal are given using the first resource index, wherein a transmission resource for the second modulation symbol is given using one of the two second resource indices and a transmission resource for the second reference signal is given using the other of the two second resource indices.

In another aspect of the present invention, provided herein is a communication device configured to transmit uplink control information in a wireless communication system, including: a radio frequency (RF) unit; and a processor, wherein the processor is configured to generate a plurality of hybrid HARQ-ACKs, to select, from among a plurality of resource indices, one first resource index and two second resource indices corresponding to the plurality of HARQ-ACKs, to transmit, through a first antenna port, a first modulation symbol corresponding to the plurality of HARQ-ACKs and a first reference signal for demodulating the first modulation symbol and to transmit, through a second antenna port, a second modulation symbol corresponding to the plurality of HARQ-ACKs and a second reference signal for demodulating the second modulation symbol, wherein both a transmission resource for the first modulation symbol and a transmission resource for the first reference signal are given using the first resource index, wherein a transmission resource for the second modulation symbol is given using one of the two second resource indices and a transmission resource for the second reference signal is given using the other of the two second resource indices.

The two second resource indices may be different from each other.

The plurality of resource indices may include a plurality of physical uplink control channel (PUCCH) format 1b resource indices.

The transmission resources for the first modulation symbol, the second modulation symbol, the first reference signal and the second reference signal may include at least one of a physical resource block (PRB), cyclic shift (CS) and orthogonal cover code (OCC).

A PRB, CS and OCC used for transmission of the first modulation symbol may be identical to a PRB, CS and OCC used for transmission of the first reference signal, and a PRB, CS and OCC used for transmission of the second modulation symbol may be identical to a PRB, CS and OCC used for transmission of the second reference signal.

When normal cyclic prefix (CP) is configured, the first and second modulation symbols may be transmitted on single carrier frequency division multiple access (SC-FDMA) symbols #0, #1, #5 and #6 in a slot and the first and second reference signals may be transmitted on SC-FDMA symbols #2, #3 and #4 in the slot.

When extended CP is configured, the first and second modulation symbols may be transmitted on SC-FDMA symbols #0, #1, #4 and #5 in a slot and the first and second reference signals may be transmitted on SC-FDMA symbols #2, #3 and #4 in the slot.

Advantageous Effects

According to the present invention, it is possible to efficiently transmit control information in a wireless communication system. Specifically, it is possible to efficiently transmit uplink control information and efficiently manage resources for uplink control information transmission in a multi-antenna system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
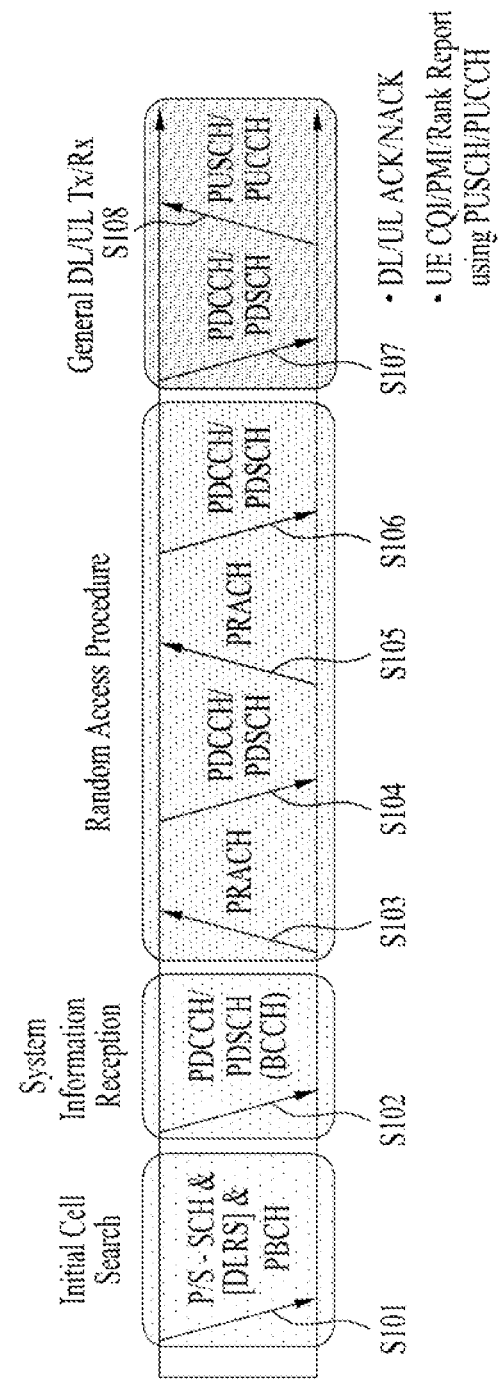
FIG. 1 illustrates physical channels used in a 3GPP LTE system as a wireless communication system and a signal transmission method using the same.

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE.

While the following description is given, centering on 3GPP LTE/LTE-A for clarity, this is purely exemplary and thus should not be construed as limiting the present invention.

It should be noted that specific terms disclosed in the present invention are proposed for convenience of description and better understanding of the present invention, and the use of these specific terms may be changed to other formats within the technical scope or spirit of the present invention.

The terms used in the specification are described.

HARQ-ACK (Hybrid Automatic Repeat request-Acknowledgement): this represents an acknowledgment response to downlink transmission (e.g. PDSCH or SPS release PDCCH), that is, an ACK/NACK/DTX response (simply, ACK/NACK response, ACK/NACK). The ACK/NACK/DTX response refers to ACK, NACK, DTX or NACK/DTX. HARQ-ACK for a specific CC or HARQ-ACK of a specific CC refers to an ACK/NACK response to a downlink signal (e.g. PDSCH) related to (e.g. scheduled for) the corresponding CC. A PDSCH can be replaced by a transport block (TB) or a codeword.

PDSCH: this corresponds to a DL grant PDCCH. The PDSCH is used interchangeably with a PDSCH w/PDCCH in the specification.

SPS release PDCCH: this refers to a PDCCH indicating SPS release. A UE performs uplink feedback of ACK/NACK information about an SPS release PDCCH.

SPS PDSCH: this is a PDSCH transmitted on DL using a resource semi-statically set according to SPS. The SPS PDSCH has no DL grant PDCCH corresponding thereto. The SPS PDSCH is used interchangeably with a PDSCH w/o PDCCH in the specification.

PUCCH index: This corresponds to a PUCCH resource. The PUCCH index represents a PUCCH resource index, for example. The PUCCH resource index is mapped to at least one of an orthogonal cover (OC), a cyclic shift (CS) and a PRB.

ARI (ACK/NACK resource indicator): This is used to indicate a PUCCH resource. For example, the ARI can be used to indicate a resource change value (e.g. offset) with respect to a specific PUCCH resource (configured by a higher layer). Furthermore, the ARI can be used to indicate a specific PUCCH resource (group) index in a PUCCH resource (group) set (configured by a higher layer). The ARI can be included in a TPC field of a PDCCH corresponding to a PDSCH on an SCC. PUCCH power control is performed in a TPC field in a PDCCH (that is, PDCCH corresponding to a PDSCH on a PCC) that schedules the PCC. The ARI can be included in a TPC field of a PDCCH other than a PDCCH that has a downlink assignment index (DAI) initial value and schedules a specific cell (e.g. PCell). The ARI is used with a HARQ-ACK resource indication value.

DAI (downlink assignment index): this is included in DCI transmitted through a PDCCH. The DAI can indicate an order value or counter value of a PDCCH. A value indicated by a DAI field of a DL grant PDCCH is called a DL DAI and a value indicated by a DAI field of a UL grant PDCCH is called a UL DAI for convenience.

Implicit PUCCH resource: This represents a PUCCH resource/index linked to the smallest CCE index of a PDCCH that schedules a PCC (refer to Equation 1).

Explicit PUCCH resource: This can be indicated using the ARI.

PDCCH scheduling CC: This represents a PDCCH that schedules a PDSCH on a CC, that is, a PDCCH corresponding to a PDSCH on the CC.

PCell PDCCH: This represents a PDCCH that schedules a PCell. That is, the PCell PDCCH indicates a PDCCH corresponding to a PDSCH on the PCell. When it is assumed that cross-carrier scheduling is not allowed for the PCell, the PCell PDCCH is transmitted only on the PCell.

SCell PDCCH: This represents a PDCCH that schedules an SCell. That is, the SCell PDCCH indicates a PDCCH corresponding to a PDSCH on the SCell. When cross-carrier scheduling is allowed for the SCell, the SCell PDCCH can be transmitted on the PCC. On the other hand, when cross-carrier scheduling is not allowed for the SCell, the SCell PDCCH is transmitted only on the SCell.

Cross-carrier scheduling: This represents an operation of scheduling/transmitting a PDCCH that schedules a first cell through a second cell different from the first cell.

Non-cross-carrier scheduling: This represents an operation of scheduling/transmitting a PDCCH that schedules a cell through the cell.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement(ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
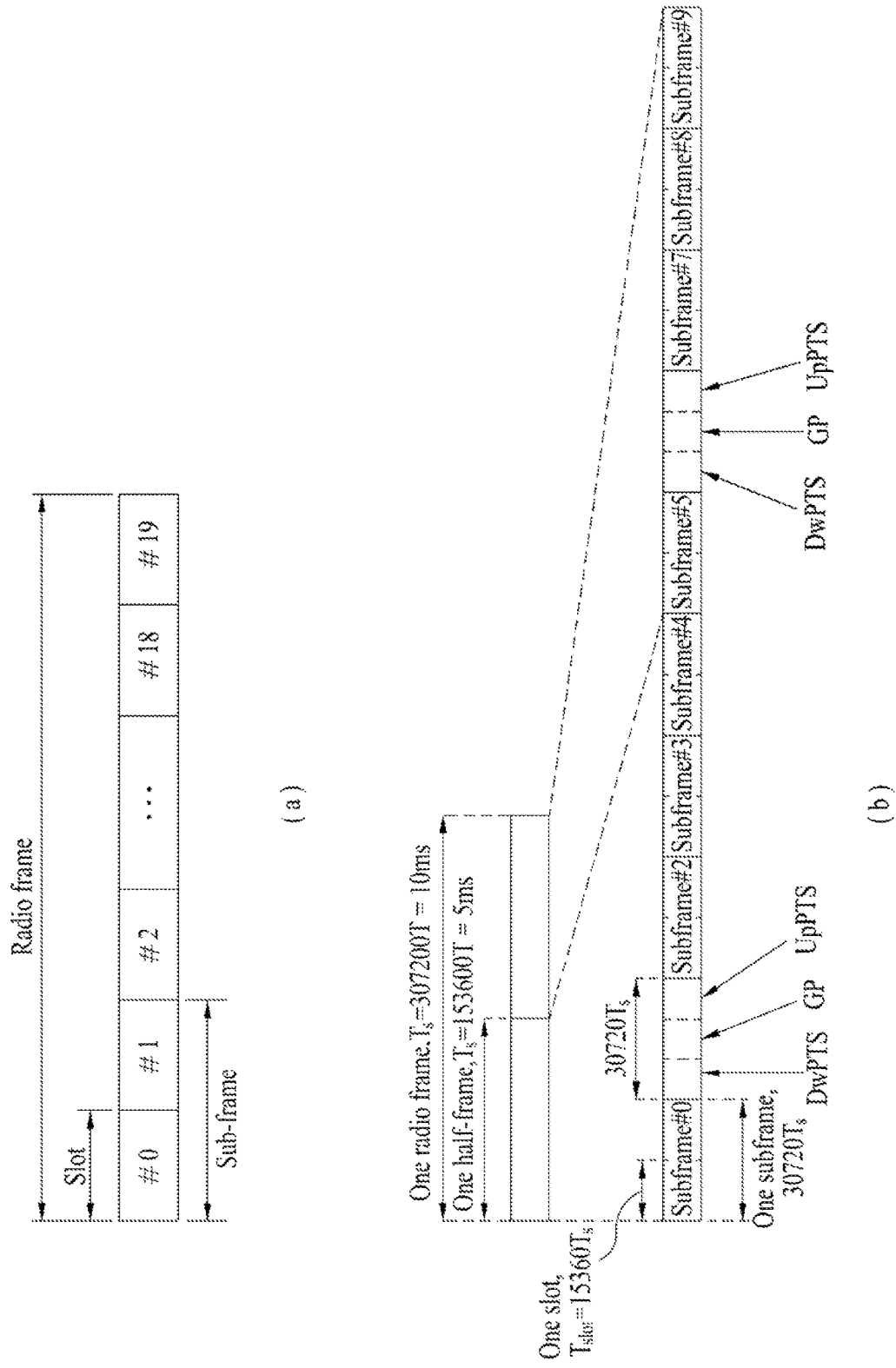
FIG. 2 illustrates a radio frame structure.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes. A subframe may be one of a downlink subframe, an uplink subframe and a special subframe. The special subframe can be used as a downlink subframe or an uplink subframe according to TDD configuration. The special subframe includes a downlink pilot time slot (DwPTS), a guard period (GP), and an uplink pilot time slot (UpPTS). The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between a UL and a DL.

Table 1 shows UL-DL configurations of subframes in a radio frame in the TDD mode.

TABLE 1

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

The radio frame structure is merely exemplary and the number of subframes included in the radio frame, the number of slots included in a subframe, and the number of symbols included in a slot can be vary.

Figure 3:
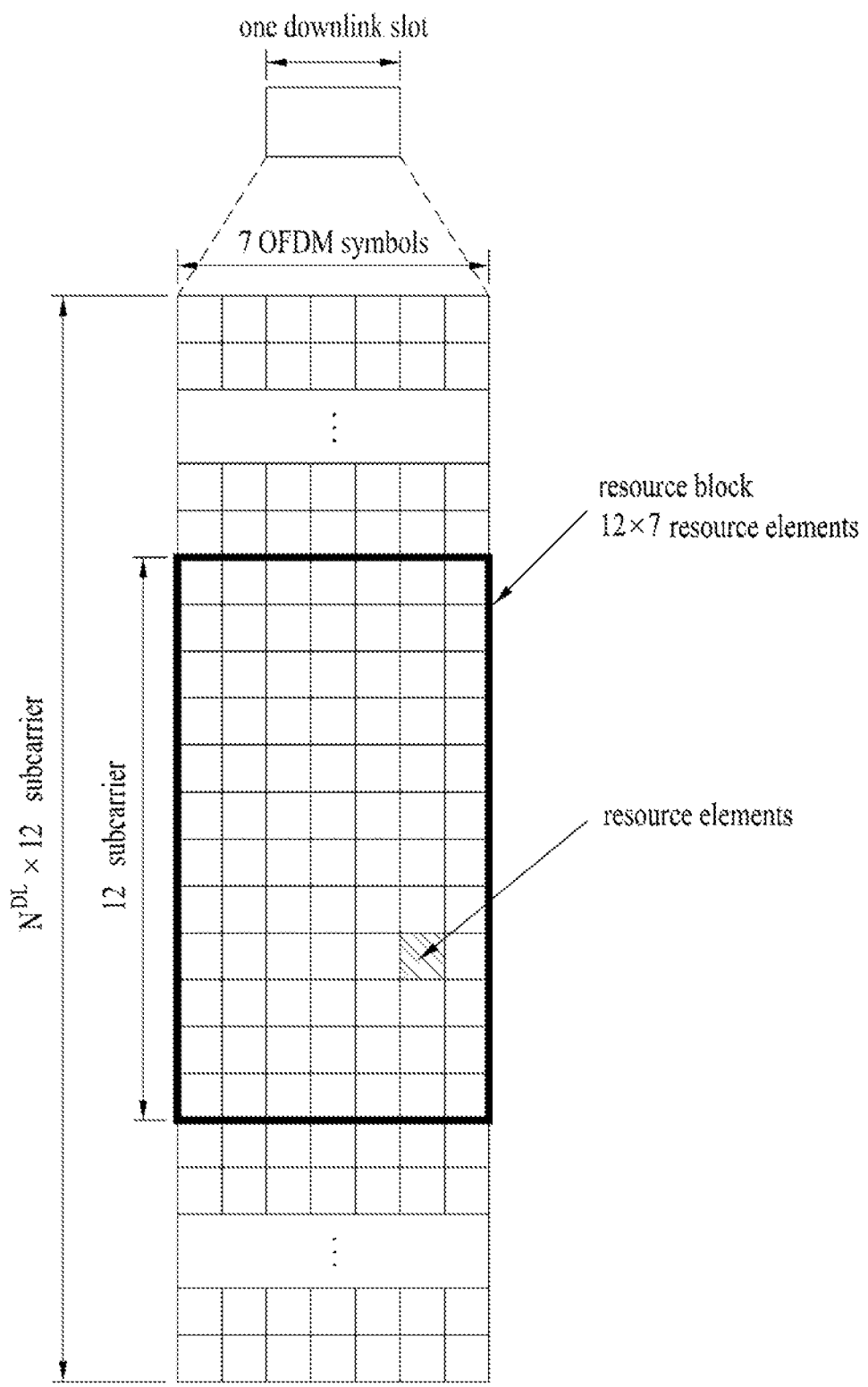
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 4:
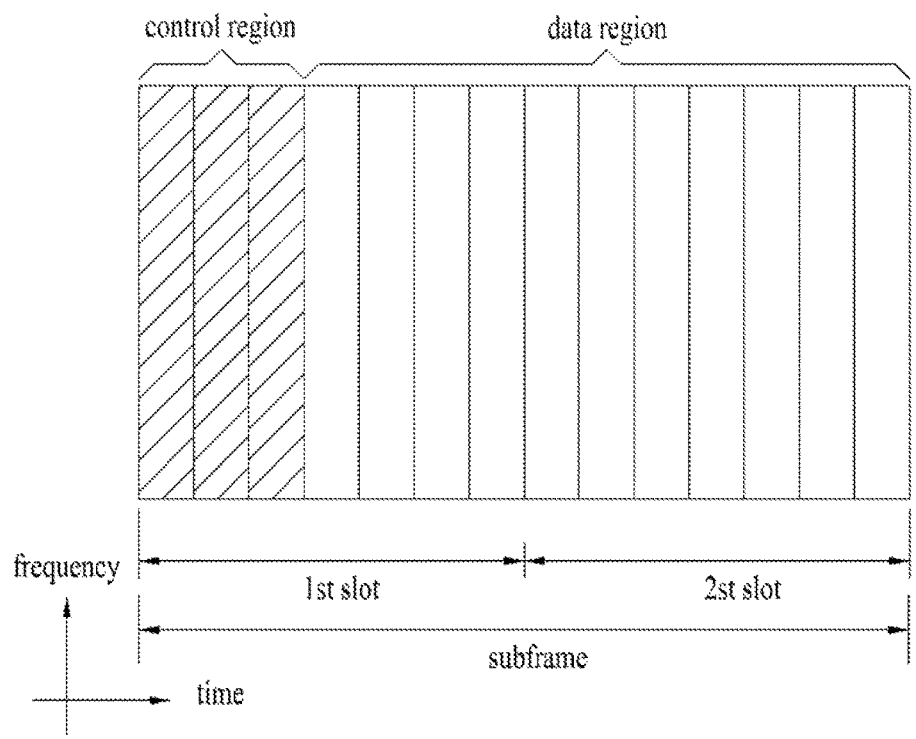
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
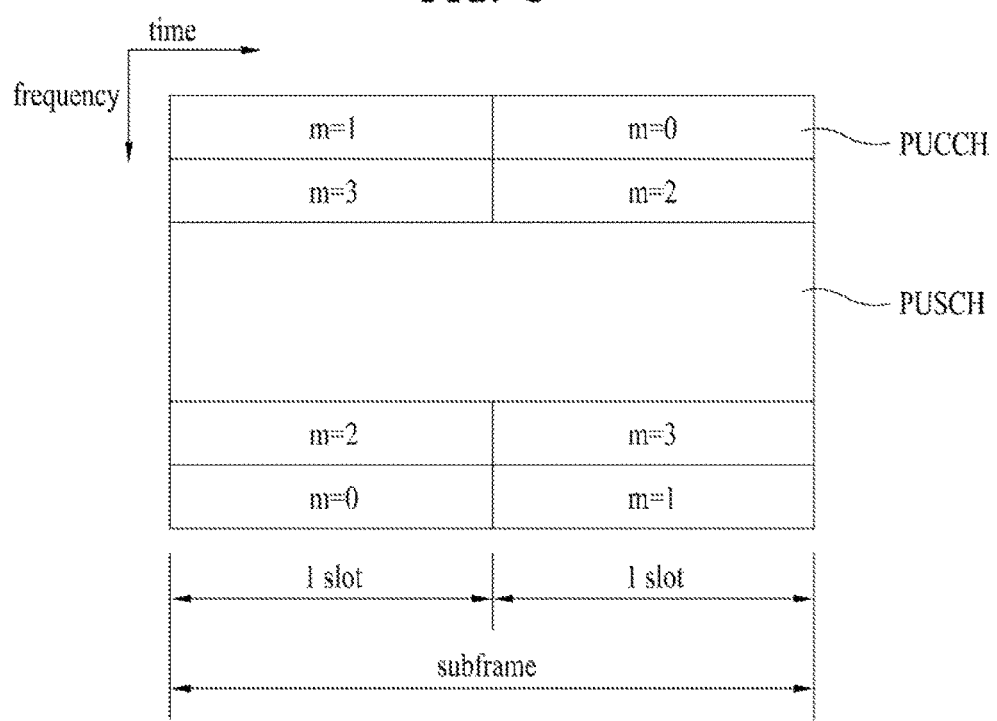
FIG. 5 illustrates an uplink subframe structure.

FIG. 5 illustrates an uplink subframe structure used in LTE.

Referring to FIG. 5, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

SR (scheduling request): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

CQI (channel quality indicator): This is feedback information about a downlink channel. Feedback information regarding Multiple Input Multiple Output (MIMO) includes Rank Indicator (RI) and Precoding Matrix Indicator (PMI). 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 2 shows the mapping relationship between PUCCH formats and UCI in LTE.

TABLE 2

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR (48 bits) |

Figure 6:
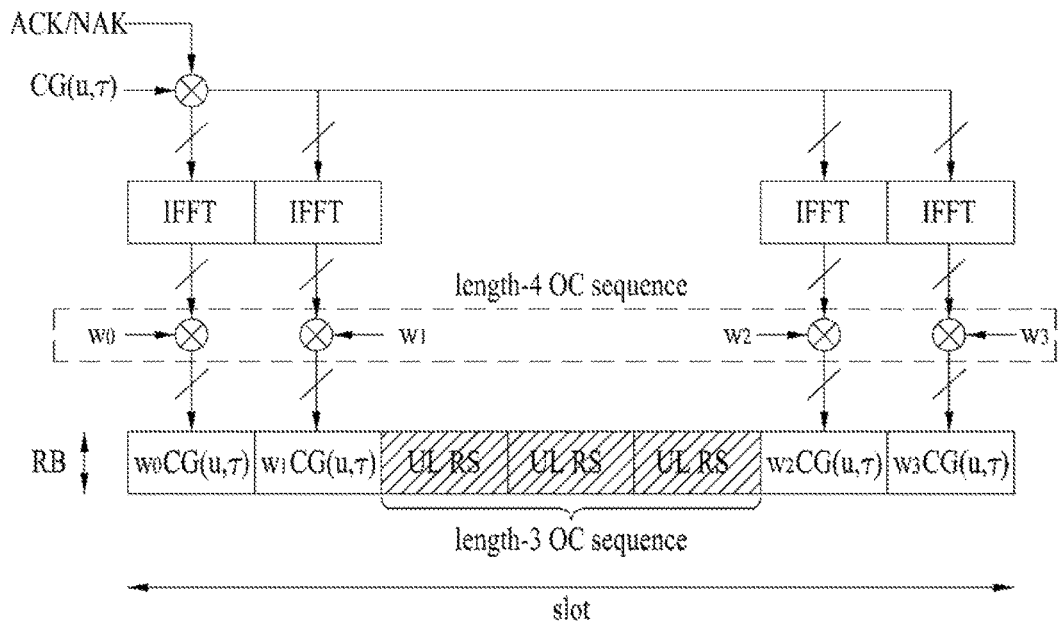
FIGS. 6 and 7 illustrate PUCCH format 1a/1b slot level structures.
Figure 7:
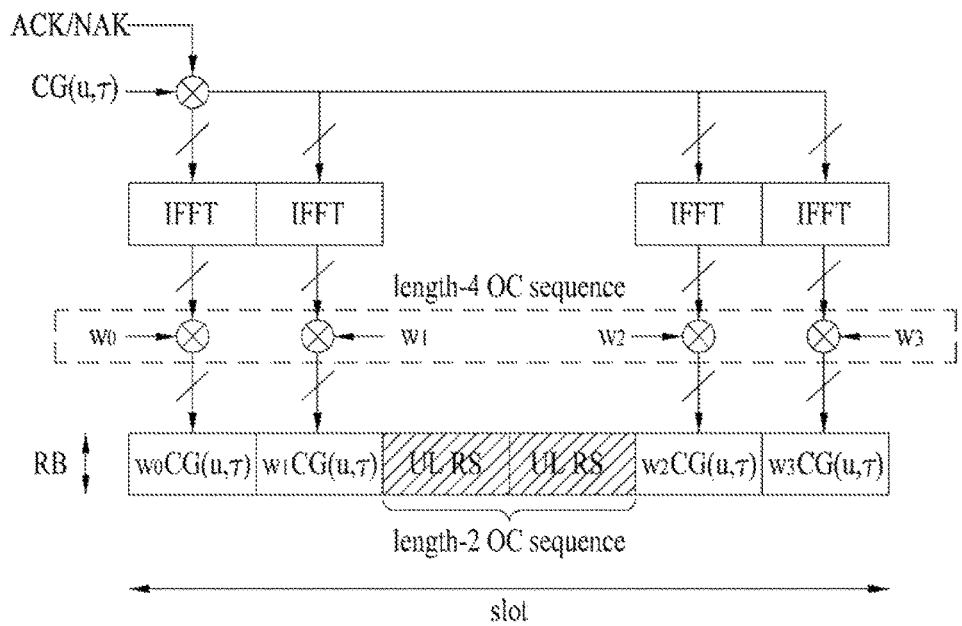

FIGS. 6 and 7 illustrate slot level structures of PUCCH formats 1a/1b. FIG. 6 shows normal CP case and FIG. 7 shows extended CP case. The PUCCH formats 1a/1b are used for ACK/NACK transmission. In the case of normal CP, SC-FDMA symbols #2, #3 and #4 are used for DMRS transmission. In the case of extended CP, SC-FDMA symbols #2 and #3 are used for DMRS transmission. Accordingly, 4 SC-FDMA symbols in a slot are used for ACK/NACK transmission. PUCCH format 1a/1b is called PUCCH format 1 in the specification unless otherwise mentioned.

Referring to FIGS. 6 and 7, 1-bit [b(0)] and 2-bit [b(0)b(1)] ACK/NACK information are modulated according to BPSK (binary phase shift keying) and QPSK (quadrature phase shift keying) modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (NACK). Table 3 shows a modulation table defined for PUCCH formats 1a and 1b in LTE/LTE-A.

TABLE 3

| PUCCH format | b(0), . . . , b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

In the case of PUCCH format 1, the same control information is repeated on a slot basis in a subframe. UEs transmit ACK/NACK signals through different resources configured of different cyclic shifts (CSs) (frequency domain codes) of a CG-CAZAC (computer-generated constant amplitude zero auto correlation) sequence and orthogonal covers or orthogonal cover codes (OCs or OCCs) (time domain spreading codes). The OC includes a Walsh/DFT orthogonal code, for example. When the number of CSs is 6 and the number of OCs is 3, 18 UEs can be multiplexed in the same PRB on the basis of a single antenna. An orthogonal sequence w0, w1, w2, w3 can be applied in a time domain (after FFT) or a frequency domain (before FFT).

RSs transmitted from different UEs are multiplexed using the same method as is used to multiplex UCI. The number of cyclic shifts supported by SC-FDMA symbols for PUCCH ACK/NACK RB can be configured by cell-specific higher layer signaling parameter $\Delta_{shift}^{PUCCH}$. $\Delta_{shift}^{PUCCH} \in \{1, 2, 3\}$ represents that shift values are 12, 6 and 4, respectively. In time-domain CDM, the number of spreading codes actually used for ACK/NACK can be limited by the number of RS symbols because multiplexing capacity of RS symbols is less than that of UCI symbols due to a smaller number of RS symbols.

Figure 8:
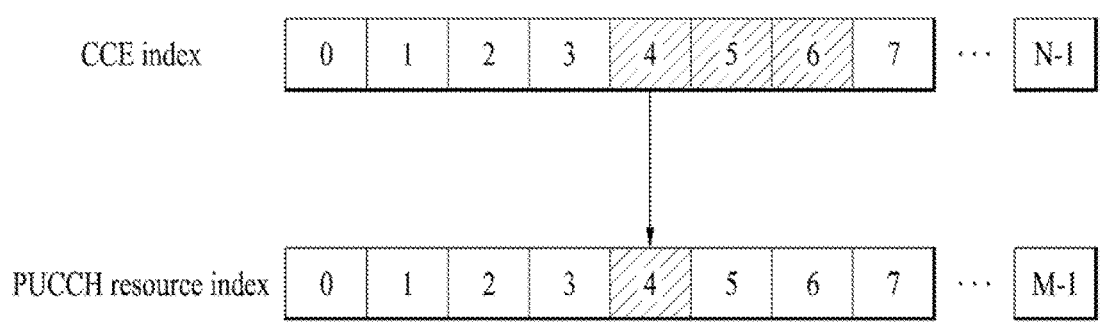
FIG. 8 illustrates determination of a PUCCH resource for ACK/NACK (A/N)

FIG. 8 illustrates an example of determining PUCCH resources for ACK/NACK. In LTE, a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data involving the ACK/NACK signal is delivered. A PDCCH transmitted in a DL subframe to a UE is configured with one or more control channel elements (CCEs), and ACK/NACK can be transmitted through a PUCCH resource corresponding to a specific one (e.g. first CCE) of the CCEs constituting the PDCCH.

Referring to FIG. 8, each block in a downlink component carrier (DL CC) represents a CCE and each block in an uplink component carrier (UL CC) indicates a PUCCH resource. Each PUCCH index corresponds to a PUCCH resource for ACK/NACK. If information on a PDSCH is delivered on a PDCCH composed of CCEs #4, #5 and #6, as shown in FIG. 8, a UE transmits an ACK/NACK signal on PUCCH #4 corresponding to CCE #4, the first CCE of the PDCCH. FIG. 8 illustrates a case in which maximum M PUCCHs are present in the UL CC when maximum N CCEs exist in the DL CC. Though N can equal M, N may differ from M and CCEs are mapped to PUCCHs in an overlapped manner.

Specifically, a PUCCH resource index in LTE is determined as follows.

$$n^{(1)}_{PUCCH} = n_{CCE} + N^{(1)}_{PUCCH} \quad \text{[Equation 1]}$$

Here, $n^{(1)}_{PUCCH}$ represents a resource index of PUCCH format 1 for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal cover code (or orthogonal spreading code) and a PRB for PUCCH format 1 are obtained from $n^{(1)}_{PUCCH}$.

When an LTE system operates in TDD, a UE transmits a single multiplexed ACK/NACK signal for a plurality of data units (e.g. PDSCHs, SPS release PDCCHs, etc.) received through different subframes. Methods of transmitting ACK/NACK for a plurality of data units include the following.

1) ACK/NACK bundling: ACK/NACK bits for a plurality of data units are combined according to a logical AND operation. For example, upon successful decoding of all data units, an Rx node (e.g. UE) transmits ACK signals. If any of data units has not been decoded (detected), the Rx node transmits a NACK signal or no signal.

2) Channel selection: Upon reception of a plurality of PDSCHs, a UE occupies a plurality of PUCCH resources for ACK/NACK transmission. ACK/NACK responses to the plurality of data units are discriminated according to combinations of PUCCH resources used for ACK/NACK transmission and transmitted ACK/NACK information (e.g. bit values). This is also referred to as ACK/NACK (or PUCCH) selection.

Channel selection will now be described in detail. When the UE receives a plurality of DL data according to the channel selection scheme, the UE occupies a plurality of UL physical channels in order to transmit a multiplexed ACK/NACK signal. For example, when the UE receives a plurality of PDSCHs, the UE can occupy the same number of PUCCHs as the PDSCHs using a specific CCE of a PDCCH which indicates each PDSCH. In this case, the UE can transmit a multiplexed ACK/NACK signal using combination of which one of the occupied PUCCHs is selected and modulated/coded results applied to the selected PUCCH.

Table 4 shows a mapping table for channel selection, defined in LTE/LTE-A

TABLE 4

| HARQ-ACK(0), HARQ-ACK(1), HARQ-ACK(2), HARQ-ACK(3) | Subframe $n^{(1)}_{PUCCH,i}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK,DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 4, HARQ-ACK(i) indicates the HARQ ACK/NACK/DTX result of an i-th data unit ($0 \leq i \leq 3$). Results of HARQ ACK/NACK/DTX include ACK, NACK, DTX and NACK/DTX. NACK/DTX represents NACK or DTX. ACK represents that a transport block (equivalent to a code block) transmitted on a PDSCH has been successfully decoded whereas NACK represents that the transport block has not been successfully decode. DTX represents PDCCH detection failure. Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 4, $n^{(1)}_{PUCCH,i}$ represents a PUCCH resource actually used for ACK/NACK transmission, and b(0)b(1) indicates two bits transmitted through the selected PUCCH resource, which are modulated using QPSK. For example, when the UE has decoded 4 data units successfully, the UE transits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except some cases (NACK/DTX, N/D).

Figure 9:
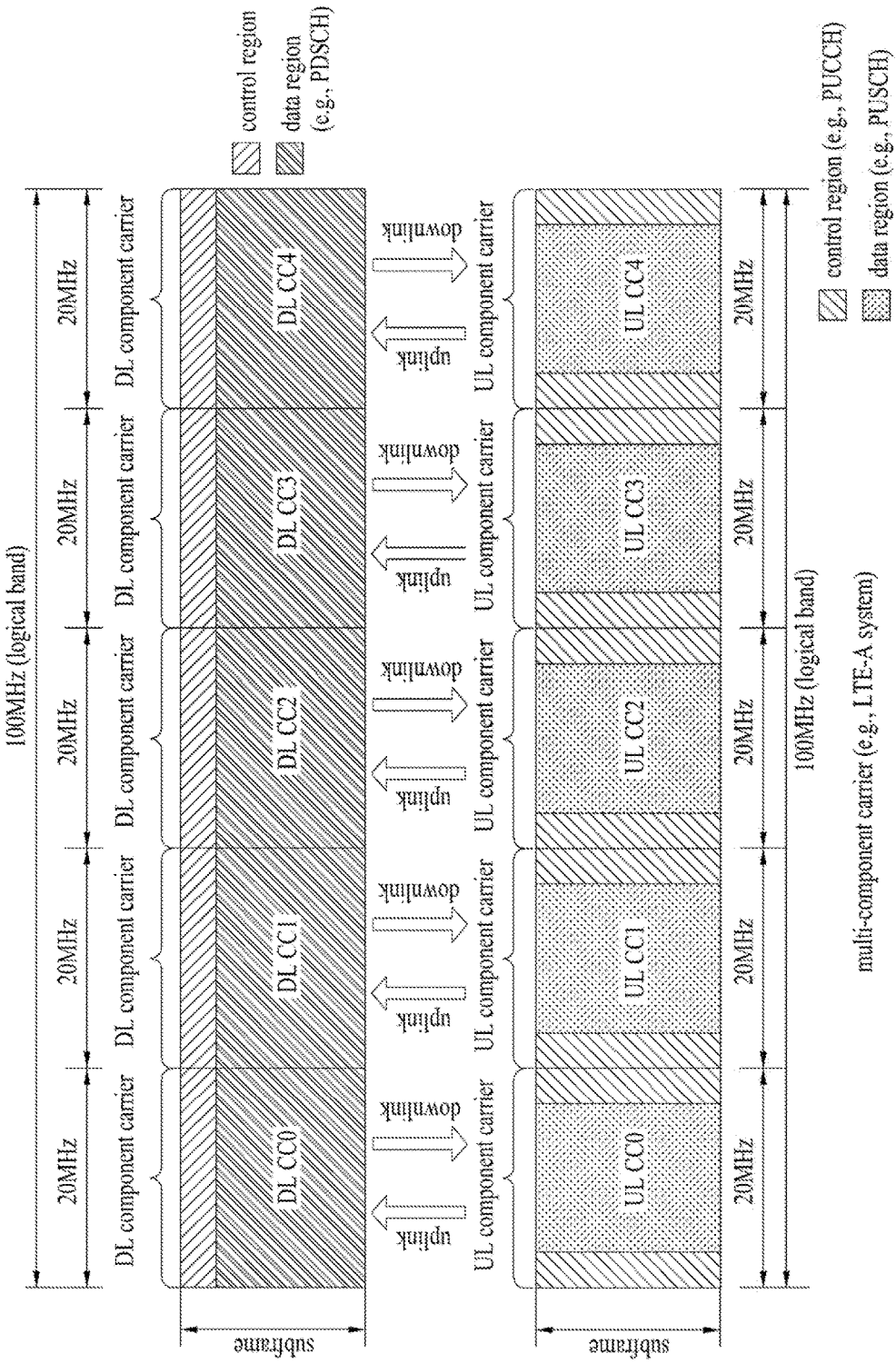
FIG. 9 illustrates a CA (carrier aggregation) communication system.

FIG. 9 illustrates a carrier aggregation (CA) communication system. LTE-A aggregates a plurality of UL/DL frequency blocks to support a wider UL/DL bandwidth in order to use a wider frequency band.

Referring to FIG. 9, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a primary CC (PCC) (or anchor CC) and other CCs can be referred to as secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_CONNECTED state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 10:
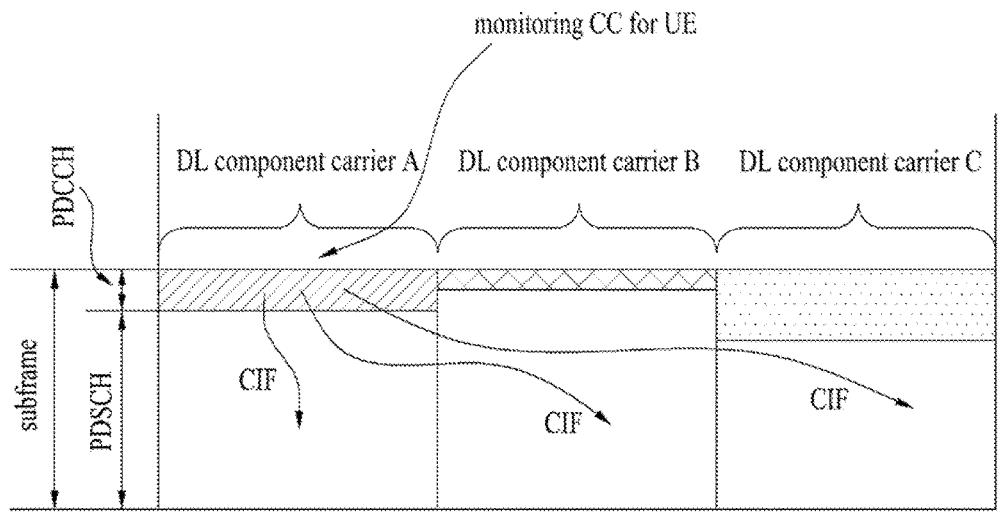
FIG. 10 illustrates cross-carrier scheduling.

FIG. 10 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF according to LTE PDCCH rule. When the CIF is enabled, DL CC A (monitoring DL CC) can transmit not only a PDCCH that schedules the PDSCH corresponding to the DL CC A but also PDCCHs that schedule PDSCHs of other DL CCs using the CIF. In this case, A PDCCH is not transmitted in DL CC B/C which is not set to a PDCCH monitoring DL CC.

A description will be given of a method for transmitting ACK/NACK using channel selection in a CA system. For this method, PUCCH formats 1a/1b, preferably, PUCCH format 1b can be used. Channel selection using PUCCH format 1b (simply, PUCCH format 1b/channel selection) is used for both FDD and TDD.

FDD channel selection is described first. When a plurality of (e.g. 2) serving cells are configured and PUCCH format 1b/channel selection is set, a UE transmits b(0)b(1) through a PUCCH resource selected from A PUCCH resources ($n_{PUCCH,i}^{(1)}$, $0 \leq i \leq A-1$ and $A \in [2,3,4]$) according to HARQ-ACK(j). HARQ-ACK(j) represents an ACK/NACK/DTX response to a transport block related to serving cell c or an SPS release PDCCH.

Table 5 shows the relationship of HARQ-ACK(j), serving cells and transport blocks.

TABLE 5

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 PCell | TB2 SCell | — | — |
| 3 | TB1 serving cell 1 | TB2 serving cell 1 | TB3 serving cell 2 | — |
| 4 | TB1 PCell | TB2 PCell | TB3 SCell | TB4 SCell |

* TB: transport block

A PUCCH resources ($n_{PUCCH,i}^{(1)}$, $0 \leq i \leq A-1$ and $A \in [2,3,4]$) are determined in the following manner.

PUCCH resource $n_{PUCCH,i}^{(1)}$ is given by $n_{PUCCH,i}^{(1)} = n_{CCE} + N_{PUCCH}^{(1)}$ for a PDSCH indicated by a PDCCH detected from subframe n−4 on a PCell or a PDCCH indicating downlink SPS release, detected from subframe n−4 on the PCell. When the transmission mode of the PCell supports two transport blocks, an additional PUCCH resource $n_{PUCCH,i+1}^{(1)}$ is given by $n_{PUCCH,i+1}^{(1)} = n_{CCE} + 1 + N_{PUCCH}^{(1)}$. Here, $n_{CCE}$ represents the first CCE used for transmission of the corresponding PDCCH and $N_{PUCCH}^{(1)}$ is set by a higher layer.

For transmission of a PDSCH (without a PDCCH detected from subframe n−4) on the PCell, PUCCH resource $n_{PUCCH,i}^{(1)}$ is provided by a higher layer. When the transmission mode of the PCell supports two transport blocks, an additional PUCCH resource $n_{PUCCH,i+1}^{(1)}$ is given by $n_{PUCCH,i+1}^{(1)} = n_{CCE} + 1 + N_{PUCCH}^{(1)}$.

For a PDSCH indicated by a PDCCH detected from subframe n−4 of an SCell, $n_{PUCCH,i}^{(1)}$ and $n_{PUCCH,i+1}^{(1)}$ (in the case of transmission mode supporting two transport blocks) are determined according to higher layer configuration. A TPC field vale for a PUCCH in the DCI format of the corresponding PDCCH is used to indicate one of 4 PUCCH resource values configured by a higher layer (ARI). The indicated PUCCH resource value is mapped to two PUCCH resources $n_{PUCCH,i}^{(1)}$ and $n_{PUCCH,i+1}^{(1)}$ if the transmission mode of the SCell supports two transport blocks and mapped to one PUCCH resource $n_{PUCCH,i}^{(1)}$ if not.

Table 6 shows a mapping table for PUCCH format 1b/channel selection when A=2.

TABLE 6

| HARQ-ACK(0) | HARQ-ACK(1) | $n_{PUCCH,i}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | No Transmission | |

Table 7 shows a mapping table for PUCCH format 1b/channel selection when A=3.

TABLE 7

| HARQ-ACK(0) | HARQ-ACK(1) | HARQ-ACK(2) | $n_{PUCCH,i}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | No Transmission | |

Table 8 shows a mapping table for PUCCH format 1b/channel selection when A=4.

TABLE 8

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | No Transmission | |

In the case of a TDD based CA system, A/N signals for M DL subframes (DL bundling window) are transmitted through one UL subframe.

Tables 9, 10 and 11 show mapping tables for PUCCH format 1b/channel selection when M=2, 3 and 4. Here, HARQ-ACK(j) (0≤j≤M−1) (M=2, 3, 4) represents an ACK/NACK/DTX response to a PDSCH or SPS release PDCCH transmitted through a (j+1)-th DL subframe.

TABLE 9

| Pcell HARQ-ACK(0), HARQ-ACK(1) | SCell HARQ-ACK(0), HARQ-ACK(1) | Resource $n_{PUCCH}^{(1)}$ | Constellation b(0), b(1) |
|---|---|---|---|
| A, A | A, A | $n_{PUCCH,1}^{(1)}$ | 1, 1 |
| N/D, A | A, A | $n_{PUCCH,1}^{(1)}$ | 0, 0 |
| A, N/D | A, A | $n_{PUCCH,3}^{(1)}$ | 1, 1 |
| N/D, N/D | A, A | $n_{PUCCH,3}^{(1)}$ | 0, 1 |
| A, A | N/D, A | $n_{PUCCH,0}^{(1)}$ | 1, 0 |
| N/D, A | N/D, A | $n_{PUCCH,3}^{(1)}$ | 1, 0 |
| A, N/D | N/D, A | $n_{PUCCH,0}^{(1)}$ | 0, 1 |
| N/D, N/D | N/D, A | $n_{PUCCH,3}^{(1)}$ | 0, 0 |
| A, A | A, N/D | $n_{PUCCH,2}^{(1)}$ | 1, 1 |
| N/D, A | A, N/D | $n_{PUCCH,2}^{(1)}$ | 0, 1 |
| A, N/D | A, N/D | $n_{PUCCH,2}^{(1)}$ | 1, 0 |
| N/D, N/D | A, N/D | $n_{PUCCH,2}^{(1)}$ | 0, 0 |
| A, A | N/D, N/D | $n_{PUCCH,1}^{(1)}$ | 1, 0 |
| N/D, A | N/D, N/D | $n_{PUCCH,1}^{(1)}$ | 0, 1 |
| A, N/D | N/D, N/D | $n_{PUCCH,0}^{(1)}$ | 1, 1 |
| N, N/D | N/D, N/D | $n_{PUCCH,0}^{(1)}$ | 0, 0 |
| D, N/D | N/D, N/D | No Transmission | |

TABLE 10

| Pcell HARQ-ACK(0), HARQ-ACK(1), HARQ-ACK(2) | SCell HARQ-ACK(0), HARQ-ACK(1), HARQ-ACK(2) | Resource $n_{PUCCH}^{(1)}$ | Constellation b(0), b(1) |
|---|---|---|---|
| A, A, A | A, A, A | $n_{PUCCH,1}^{(1)}$ | 1, 1 |
| A, A, N/D | A, A, A | $n_{PUCCH,1}^{(1)}$ | 0, 0 |
| A, N/D, any | A, A, A | $n_{PUCCH,3}^{(1)}$ | 1, 1 |
| N/D, any, any | A, A, A | $n_{PUCCH,3}^{(1)}$ | 0, 1 |
| A, A, A | A, A, N/D | $n_{PUCCH,0}^{(1)}$ | 1, 0 |
| A, A, N/D | A, A, N/D | $n_{PUCCH,3}^{(1)}$ | 1, 0 |
| A, N/D, any | A, A, N/D | $n_{PUCCH,0}^{(1)}$ | 0, 1 |
| N/D, any, any | A, A, N/D | $n_{PUCCH,3}^{(1)}$ | 0, 0 |
| A, A, A | A, N/D, any | $n_{PUCCH,2}^{(1)}$ | 1, 1 |
| A, A, N/D | A, N/D, any | $n_{PUCCH,2}^{(1)}$ | 0, 1 |
| A, N/D, any | A, N/D, any | $n_{PUCCH,2}^{(1)}$ | 1, 0 |
| N/D, any, any | A, N/D, any | $n_{PUCCH,2}^{(1)}$ | 0, 0 |
| A, A, A | N/D, any, any | $n_{PUCCH,1}^{(1)}$ | 1, 0 |
| A, A, N/D | N/D, any, any | $n_{PUCCH,1}^{(1)}$ | 0, 1 |
| A, N/D, any | N/D, any, any | $n_{PUCCH,0}^{(1)}$ | 1, 1 |
| N, any, any | N/D, any, any | $n_{PUCCH,0}^{(1)}$ | 0, 0 |
| D, any, any | N/D, any, any | No Transmission | |

TABLE 11

| PCell HARQ-ACK(0), HARQ-ACK(1), HARQ-ACK(2), HARQ-ACK(3) | SCell HARQ-ACK(0), HARQ-ACK(1), HARQ-ACK(2), HARQ-ACK(3) | Resource $n_{PUCCH}^{(1)}$ | Constellation b(0), b(1) |
|---|---|---|---|
| A, A, A, N/D | A, A, A, N/D | $n_{PUCCH,1}^{(1)}$ | 1, 1 |
| A, A, N/D, any | A, A, A, N/D | $n_{PUCCH,1}^{(1)}$ | 0, 0 |
| A, D, D, D | A, A, A, N/D | $n_{PUCCH,3}^{(1)}$ | 1, 1 |
| A, A, A, A | A, A, A, N/D | $n_{PUCCH,3}^{(1)}$ | 1, 1 |
| N/D, any, any, any | A, A, A, N/D | $n_{PUCCH,3}^{(1)}$ | 0, 1 |
| (A, N/D, any, any), except for (A, D, D, D) | A, A, A, N/D | $n_{PUCCH,3}^{(1)}$ | 0, 1 |
| A, A, A, N/D | A, A, N/D, any | $n_{PUCCH,0}^{(1)}$ | 1, 0 |
| A, A, N/D, any | A, A, N/D, any | $n_{PUCCH,3}^{(1)}$ | 1, 0 |
| A, D, D, D | A, A, N/D, any | $n_{PUCCH,0}^{(1)}$ | 0, 1 |
| A, A, A, A | A, A, N/D, any | $n_{PUCCH,0}^{(1)}$ | 0, 1 |
| N/D, any, any, any | A, A, N/D, any | $n_{PUCCH,3}^{(1)}$ | 0, 0 |
| (A, N/D, any, any), except for (A, D, D, D) | A, A, N/D, any | $n_{PUCCH,3}^{(1)}$ | 0, 0 |
| A, A, A, N/D | A, D, D, D | $n_{PUCCH,2}^{(1)}$ | 1, 1 |
| A, A, A, N/D | A, A, A, A | $n_{PUCCH,2}^{(1)}$ | 1, 1 |
| A, A, N/D, any | A, D, D, D | $n_{PUCCH,2}^{(1)}$ | 0, 1 |
| A, A, N/D, any | A, A, A, A | $n_{PUCCH,2}^{(1)}$ | 0, 1 |
| A, D, D, D | A, D, D, D | $n_{PUCCH,2}^{(1)}$ | 1, 0 |
| A, D, D, D | A, A, A, A | $n_{PUCCH,2}^{(1)}$ | 1, 0 |
| A, A, A, A | A, D, D, D | $n_{PUCCH,2}^{(1)}$ | 1, 0 |
| A, A, A, A | A, A, A, A | $n_{PUCCH,2}^{(1)}$ | 1, 0 |
| N/D, any, any, any | A, D, D, D | $n_{PUCCH,2}^{(1)}$ | 0, 0 |
| N/D, any, any, any | A, A, A, A | $n_{PUCCH,2}^{(1)}$ | 0, 0 |
| (A, N/D, any, any), except for (A, D, D, D) | A, D, D, D | $n_{PUCCH,2}^{(1)}$ | 0, 0 |
| (A, N/D, any, any), except for (A, D, D, D) | A, A, A, A | $n_{PUCCH,2}^{(1)}$ | 0, 0 |
| A, A, A, N/D | N/D, any, any, any | $n_{PUCCH,1}^{(1)}$ | 1, 0 |
| A, A, A, N/D | (A, N/D, any, any), except for (A, D, D, D) | $n_{PUCCH,1}^{(1)}$ | 1, 0 |
| A, A, N/D, any | N/D, any, any, any | $n_{PUCCH,1}^{(1)}$ | 0, 1 |

TABLE 11-continued

| PCell | SCell | Resource $n_{PUCCH}^{(1)}$ | Constellation b(0), b(1) |
|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | | |
| A, A, N/D, any | (A, N/D, any, any), except for (A, D, D, D) | $n_{PUCCH,1}^{(1)}$ | 0, 1 |
| A, D, D, D | N/D, any, any, any | $n_{PUCCH,0}^{(1)}$ | 1, 1 |
| A, D, D, D | (A, N/D, any, any), except for (A, D, D, D) | $n_{PUCCH,0}^{(1)}$ | 1, 1 |
| A, A, A, A | N/D, any, any, any | $n_{PUCCH,0}^{(1)}$ | 1, 1 |
| A, A, A, A | (A, N/D, any, any), except for (A, D, D, D) | $n_{PUCCH,0}^{(1)}$ | 1, 1 |
| N, any, any, any | N/D, any, any, any | $n_{PUCCH,0}^{(1)}$ | 0, 0 |
| N, any, any, any | (A, N/D, any, any), except for (A, D, D, D) | $n_{PUCCH,0}^{(1)}$ | 0, 0 |
| (A, N/D, any, any), except for (A, D, D, D) | N/D, any, any, any | $n_{PUCCH,0}^{(1)}$ | 0, 0 |
| (A, N/D, any, any), except for (A, D, D, D) | (A, N/D, any, any), except for (A, D, D, D) | $n_{PUCCH,0}^{(1)}$ | 0, 0 |
| D, any, any, any | N/D, any, any, any | No Transmission | |
| D, any, any, any | (A, N/D, any, any), except for (A, D, D, D) | No Transmission | |

In Tables 9, 10 and 11, $n_{PUCCH,0}^{(1)}$ and/or $n_{PUCCH,1}^{(1)}$ may correspond to implicit PUCCH resources (refer to Equation 1) linked to PDCCHs (i.e. PCell PDCCHs) that schedule PCell irrespective of whether or not cross-carrier scheduling is applied and $n_{PUCCH,2}^{(1)}$ and/or $n_{PUCCH,3}^{(1)}$ may be correspond to implicit PUCCH resources linked to PDCCHs (i.e. SCell PDCCHs) that schedule SCell according to whether or not cross-carrier scheduling is applied or PUCCH resources reserved by RRC. For example, $n_{PUCCH,0}^{(1)}$ and $n_{PUCCH,1}^{(1)}$ can respectively correspond to implicit PUCCH resources linked to PCell PDCCHs with DAI=1 and DAI=2 and $n_{PUCCH,2}^{(1)}$ and $n_{PUCCH,3}^{(1)}$ can respectively correspond to implicit PUCCH resources linked to SCell PDCCHs with DAI=1 and DAI=2.

A description will be given of a transmit diversity (TxD) scheme for channel selection.

Figure 11:
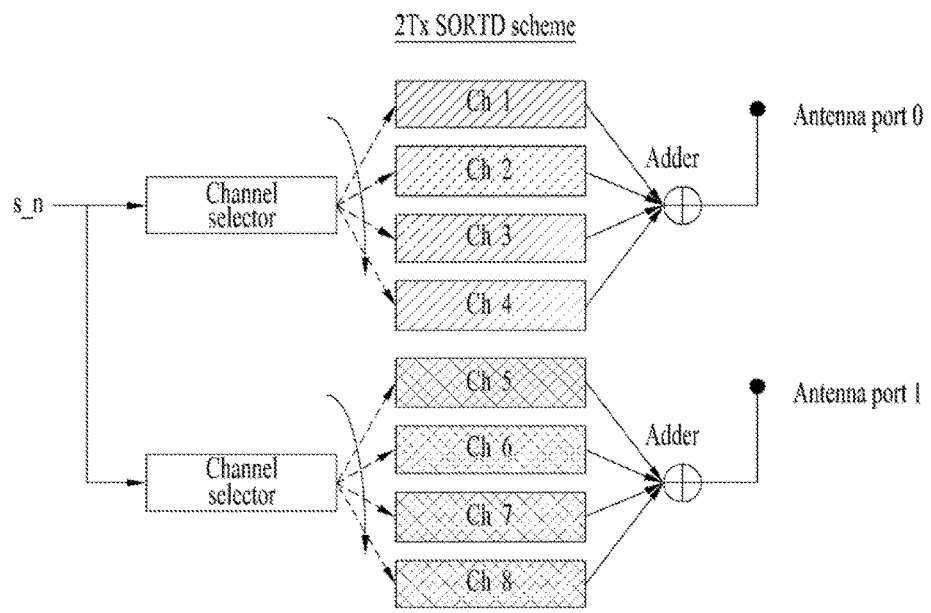
FIG. 11 illustrates exemplary SORTD (spatial orthogonal resource transmit diversity) transmission.

FIG. 11 illustrates a signal transmission method using spatial orthogonal resource transmit diversity (SORTD).

Referring to FIG. 11, SORTD repeatedly transmits the same information by additionally using as many PUCCH resources used (or reserved) for channel selection as the number of transmit (Tx) antennas (antenna ports). For example, if 4 PUCCH resources are used (or reserved) for channel selection during transmission using a single Tx antenna, 8 PUCCH resources are used (or reserved) during transmission using 2 Tx antennas. In one embodiment, the same channel selector (or mapping table) is applied to two antenna ports and the same information s_n is transmitted through selected channels, as described in FIG. 11. Here, s_n can represent a modulation symbol (or bit value). While the present embodiment illustrates 2Tx SORTD, SORTD for transmission using three or more Tx antennas is applicable in the same manner.

Tables 12, 13 and 14 show application of SORTD in the case of 2-bit, 3-bit and 4-bit ACK/NACK information. In the tables, ChX denotes PUCCH channel X/resource X and may be replaced by $n_{PUCCH,X}^{(1)}$.

TABLE 12

| A/N | Antenna port #0 | | Antenna port #1 | |
|---|---|---|---|---|
| State | Ch0 | Ch1 | Ch2 | Ch3 |
| NN | +1 | | +1 | |
| NA | | +1 | | +1 |
| AN | −1 | | −1 | |
| AA | | −1 | | −1 |

TABLE 13

| A/N | Antenna port #0 | | | Antenna port #1 | | |
|---|---|---|---|---|---|---|
| State | Ch0 | Ch1 | Ch2 | Ch3 | Ch4 | Ch5 |
| NNN | 1 | | | 1 | | |
| NNA | −j | | | −j | | |
| NAN | j | | | j | | |
| NAA | | 1 | | | 1 | |
| ANN | 1 | | | 1 | | |
| ANA | −j | | | −j | | |
| AAN | j | | | j | | |
| AAA | | −1 | | | −1 | |

TABLE 14

| A/N | Antenna port #0 | | | | Antenna port #1 | | | |
|---|---|---|---|---|---|---|---|---|
| State | Ch0 | Ch1 | Ch2 | Ch3 | Ch4 | Ch5 | Ch6 | Ch7 |
| NNNN | 1 | | | | 1 | | | |
| NNNA | −j | | | | −j | | | |
| NNAN | J | | | | j | | | |
| NNAA | −1 | | | | −1 | | | |
| NANN | | 1 | | | | 1 | | |
| NANA | | −j | | | | −j | | |
| NAAN | | j | | | | j | | |
| NAAA | | −1 | | | | −1 | | |
| ANNN | | | 1 | | | | 1 | |
| ANNA | | | −j | | | | −j | |
| ANAN | | | j | | | | j | |
| ANAA | | | −1 | | | | −1 | |
| AANN | | | | 1 | | | | 1 |
| AANA | | | | −j | | | | −j |
| AAAN | | | | j | | | | j |
| AAAA | | | | −1 | | | | −1 |

The number of (orthogonal) resources used for $N_{TX}$ (SORTD can be represented by $N_{TX} \cdot M$ ($N_{TX}$ being the number of Tx antenna ports, M being the number of (orthogonal) resources used for 1 Tx channel selection).

Accordingly, if Table 14 is applied to the example of FIG. 11 and A/N state is NANA, channel selection can be applied to the two antenna ports as follows.

In the case of antenna port #0, Ch1 is selected to transmit −j(s_n).

In the case of antenna port #1, Ch5 is selected to transmit −j(s_n).

Table 15 shows A/N performance of 1Tx transmission and 2Tx SORTD according to Tables 12, 13 and 14.

TABLE 15

| | | 2 A/N bits | 3 A/N bits | 4 A/N bits |
|---|---|---|---|---|
| 1 Tx | Number of resources used | 2 | 3 | 4 |
| | Required SNR [dB] (ETU3 kmph/EPA3 km/h) | −6.50 dB/ −7.34 dB | −6.14 dB/ −6.78 dB | −5.77 dB/ −6.34 dB |
| | SNR gain [dB] for 1Tx (ETU3 kmph/EPA3 km/h) | 0 dB/0 dB | 0 dB/0 dB | 0 dB/0 dB |

TABLE 15-continued

|  |  | 2 A/N bits | 3 A/N bits | 4 A/N bits |
|---|---|---|---|---|
| SORTD | Number of resources used | 4 | 6 | 8 |
|  | Required SNR [dB] (ETU3 kmph/EPA3 km/h) | −7.68 dB/ −8.10 dB | −7.16 dB/ −7.76 dB | −7.05 dB/ −7.55 dB |
|  | SNR gain [dB] for 1Tx (ETU3 kmph/EPA3 km/h) | 1.18 dB/ 0.76 dB | 1.02 dB/ 0.98 dB | 1.28 B/ 1.21 dB |

Here, required SNR denotes a maximum SNR that satisfies the following conditions. Higher performance is achieved as the required SNR decreases.

DTX→ACK probability: 1% or lower (i.e. Pr(D→A)≤1%)

ACK misdetection (ACK→NACK, ACK→DTX) probability: 1% or lower (i.e. Pr(A→N/D)≤1%)

NACK→ACK probability: 0.1% or lower (i.e. Pr(N→A)≤0.1%)

Figure 15:
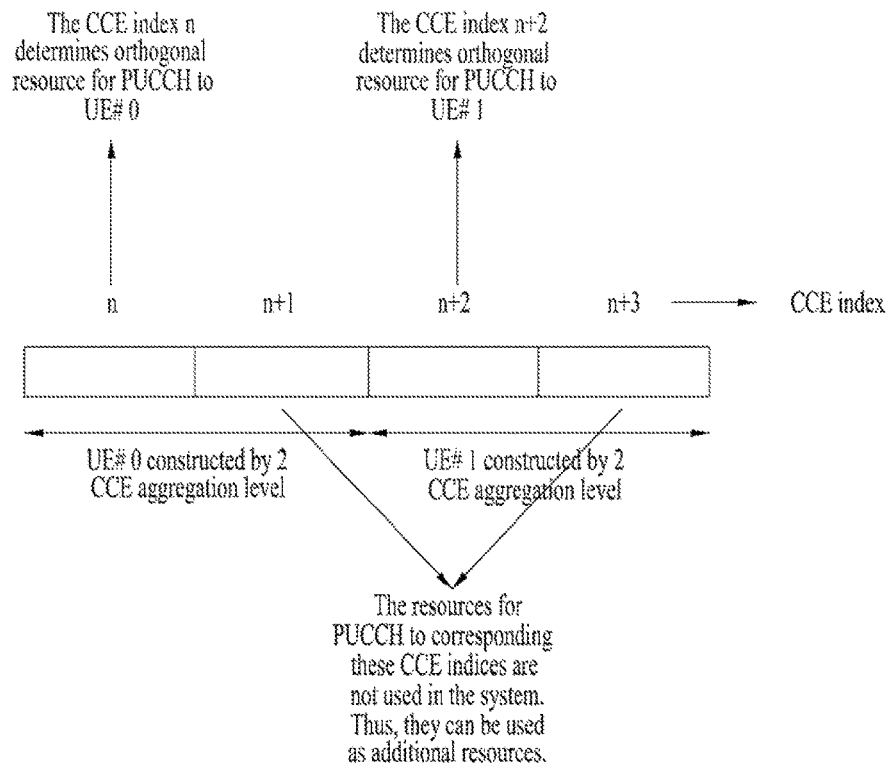
FIG. 15 illustrates PUCCH resource allocation for A/N transmission.

Referring to FIG. 15, SORTD can achieve a maximum SNR gain of 1.28.

The number of available PUCCH resources is associated with the number of UEs multiplexed in one PRB. Accordingly, when 2Tx SORTD is applied to PUCCH format 1b, the number of PUCCH resources available in one PRB is reduced by half, resulting in 50% reduction in multiplexing capacity. For example, when $\Delta_{shift}^{PUCCH}=2$, a maximum of eighteen 1Tx UEs can be multiplexed in one PRB whereas a maximum of nine 2Tx SORTD UEs can be multiplexed in one PRB. When $\Delta_{shift}^{PUCCH}=2$ in PUCCH format 1b/channel selection and 4-bit A/N is transmitted, multiplexing capacity of 1Tx UEs is 4.5 (=18/4) in one PRB whereas multiplexing capacity of 2Tx SORTD UEs is 2.25 (=9/4) in one PRB. If SORTD is used for transmission using three or more Tx antennas, resource overhead increases in proportion to the number of antennas. That is, trade-off is present between diversity gain and multiplexing capacity in SORTD.

Embodiment

The present invention proposes a transmit diversity scheme for channel selection, which solves the above-described problem with respect to multiplexing and achieves performance corresponding to SORTD, and resource allocation for the same. While a case in which two antennas (or antenna ports) are used is described in the following for facilitation of description, the present invention is applicable to a case in which three or more antennas (or antenna ports) are used. In addition, while channel selection for 3(4)-bit A/N information transmission will be described in the following for convenience, the present invention can be generalized as channel selection for N-bit A/N information transmission. Here, N is a positive integer.

In the case of transmission using at least two antennas (or antenna ports), the transmit diversity scheme according to the present invention includes channel selection respectively performed on a reference signal (RS) and data, which is extended from conventional channel selection carried out on a pair of an RS and data (i.e. UCI, e.g. A/N). That is, according to a conventional method, a single PUCCH resource index $n_{PUCCH}^{(1)}$ is selected according to channel selection (refer to Tables 4 and 6 to 14) and both resources (e.g. PRB, CS and OCC) for RS transmission and resources (e.g. PRB, CS and OCC) for data transmission are inferred from the PUCCH resource index $n_{PUCCH}^{(1)}$. In this case, the RS transmission resources and data transmission resources, obtained from the PUCCH resource index $n_{PUCCH}^{(1)}$, are identical to each other. That is, the PRB, CS and OCC used for RS transmission are identical to the PRB, CS and OCC used for data transmission. The present invention independently selects a PUCCH resource index ($n_{PUCCH,RS}^{(1)}$) for an RS and a PUCCH resource index ($n_{PUCCH,DATA}^{(1)}$) for data during channel selection and respectively derives transmission resources (e.g. PRB, CS and OCC) from the PUCCH resource indices. Accordingly, at least one of the PRB, CS and OCC used for RS transmission is different from the corresponding one of the PRB, CS and OCC used for data transmission. For convenience, a method of independently performing channel selection on the RS and data is referred to as RS-data separate channel selection. According to RS-data separate channel selection, considerable performance can be achieved using a minimum mean square error (MMSE) receiver or the like even when selected channels are located in different PRBs although optimum performance is achieved when selected channels are positioned in the same PRB.

Figure 12:
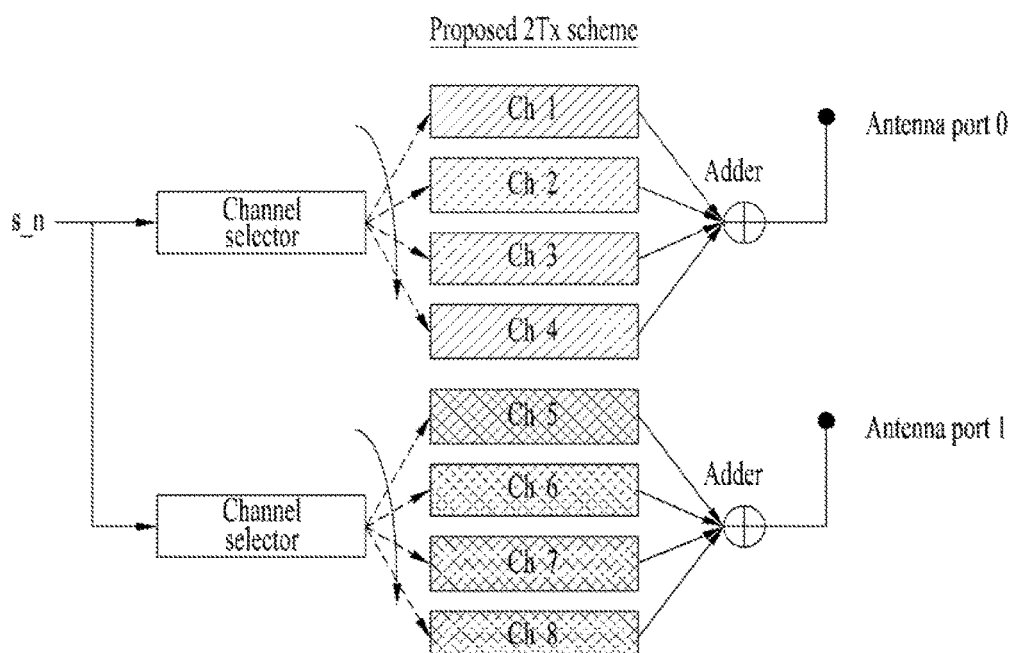
FIG. 12 illustrates a multi-antenna transmission scheme according to an embodiment of the present invention.

FIG. 12 illustrates transmit diversity scheme according to an embodiment of the present invention. Basics of the transmit diversity scheme is similar to those illustrated in FIG. 11. However, the transmit diversity scheme according to the present invention pairs an RS and data for an antenna port during channel selection and separates the RS from data for a different antenna port during channel selection, distinguished from SORTD illustrated in FIG. 11. Here, the data represents UCI, for example, A/N. For the proposed scheme, antenna port #0 can use conventional mapping tables (e.g. Tables 4 and 6 to 14) defined for channel selection performed on a pair of an RS and data for single antenna transmission whereas antenna port #1 can use mapping tables defined for channel selection respectively performed on the RS and data. The same modulation symbol (e.g. QAM or PSK symbol) value may be transmitted through data parts according to channel selection for the respective antenna ports.

Tables 16, 17 and 18 are mapping tables according to an embodiment of the present invention, which show implementation of transmit diversity using 4 PUCCHs during channel selection for 4-bit A/N transmission. Numbers in the tables denote complex values modulated to RS/data channels. For an A/N state, different complex values may be transmitted through respective antennas (antenna ports). However, the present embodiment illustrates a case in which the same complex value is transmitted through the antennas.

Table 16 shows a case in which an RS channel corresponding to antenna port #1 is selected by "(RS channel selected for antenna port #0+2) mod 4" and a data channel corresponding to antenna port #1 is selected by "RS channel of antenna port #0+(−1)$^{(RS\ channel\ number\ of\ antenna\ port\ \#1)}$". Table 17 is a modification of Table 16.

TABLE 16

| A/N state | Antenna port #0 | | | | | | | | Antenna port #1 | | | | | | | |
|---|---|---|---|---|---|---|---|---|---|---|---|---|---|---|---|---|
| | Ch0 | | Ch1 | | Ch2 | | Ch3 | | Ch0 | | Ch1 | | Ch2 | | Ch3 | |
| | RS | Data | RS | Data | RS | Data | RS | Data | RS | Data | RS | Data | RS | Data | RS | Data |
| NNNN | 1 | 1 | | | | | | | | | | | 1 | | | 1 |
| NNNA | 1 | −j | | | | | | | | | | | 1 | | | −j |
| NNAN | 1 | j | | | | | | | | | | | 1 | | | J |
| NNAA | 1 | −1 | | | | | | | | | | | 1 | | | −1 |
| NANN | | | 1 | 1 | | | | | | | | | | | 1 | 1 |
| NANA | | | 1 | −j | | | | | | | | | | | −j | 1 |
| NAAN | | | 1 | J | | | | | | | | | | | J | 1 |
| NAAA | | | 1 | −1 | | | | | | | | | | | −1 | 1 |
| ANNN | | | | | 1 | 1 | | | 1 | | | 1 | | | | |
| ANNA | | | | | 1 | −j | | | 1 | | | −j | | | | |
| ANAN | | | | | 1 | j | | | 1 | | | j | | | | |
| ANAA | | | | | 1 | −1 | | | 1 | | | −1 | | | | |
| AANN | | | | | | | 1 | 1 | 1 | 1 | | | | | | |
| AANA | | | | | | | 1 | −j | −j | 1 | | | | | | |
| AAAN | | | | | | | 1 | j | j | 1 | | | | | | |
| AAAA | | | | | | | 1 | −1 | −1 | 1 | | | | | | |

TABLE 17

| State | Antenna port #0 | | | | | | | | Antenna port #1 | | | | | | | |
|---|---|---|---|---|---|---|---|---|---|---|---|---|---|---|---|---|
| | Ch0 | | Ch1 | | Ch2 | | Ch3 | | Ch0 | | Ch1 | | Ch2 | | Ch3 | |
| | RS | Data | RS | Data | RS | Data | RS | Data | RS | Data | RS | Data | RS | Data | RS | Data |
| NNNN | 1 | 1 | | | | | | | | | | | 1 | 1 | | |
| NNNA | 1 | −j | | | | | | | | | | | −j | 1 | | |
| NNAN | 1 | J | | | | | | | | | | | j | 1 | | |
| NNAA | 1 | −1 | | | | | | | | | | | −1 | 1 | | |
| NANN | | | 1 | 1 | | | | | | | | | | | 1 | 1 |
| NANA | | | 1 | −j | | | | | | | | | | | 1 | −j |
| NAAN | | | 1 | J | | | | | | | | | | | 1 | j |
| NAAA | | | 1 | −1 | | | | | | | | | | | 1 | −1 |
| ANNN | | | | | 1 | 1 | | | 1 | 1 | | | | | | |
| ANNA | | | | | 1 | −j | | | −j | 1 | | | | | | |
| ANAN | | | | | 1 | j | | | j | 1 | | | | | | |
| ANAA | | | | | 1 | −1 | | | −1 | 1 | | | | | | |
| AANN | | | | | | | 1 | 1 | 1 | | | 1 | | | | |
| AANA | | | | | | | 1 | −j | 1 | | | −j | | | | |
| AAAN | | | | | | | 1 | j | 1 | | | j | | | | |
| AAAA | | | | | | | 1 | −1 | 1 | | | −1 | | | | |

While Tables 16 and 17 show channel selection respectively performed on the RS and data for antenna port #1 only, the RS-data separate channel selection can be performed for all antennas as shown in Table 18.

TABLE 18

| State | Antenna port #0 | | | | | | | | Antenna port #1 | | | | | | | |
|---|---|---|---|---|---|---|---|---|---|---|---|---|---|---|---|---|
| | Ch0 | | Ch1 | | Ch2 | | Ch3 | | Ch0 | | Ch1 | | Ch2 | | Ch3 | |
| | RS | Data | RS | Data | RS | Data | RS | Data | RS | Data | RS | Data | RS | Data | RS | Data |
| NNNN | 1 | 1 | | | | | | | | | | | 1 | 1 | | |
| NNNA | 1 | −j | | | | | | | | | | | 1 | −j | | |
| NNAN | 1 | j | | | | | | | | | | | 1 | j | | |
| NNAA | 1 | −1 | | | | | | | | | | | 1 | −1 | | |
| NANN | | | 1 | 1 | | | | | | | | | | | 1 | 1 |
| NANA | | | 1 | −j | | | | | | | | | | | 1 | −j |
| NAAN | | | 1 | J | | | | | | | | | | | 1 | j |
| NAAA | | | 1 | −1 | | | | | | | | | | | 1 | −1 |
| ANNN | | | | | 1 | 1 | | | 1 | 1 | | | | | | |
| ANNA | | | | | 1 | −j | | | 1 | −j | | | | | | |
| ANAN | | | | | 1 | J | | | 1 | j | | | | | | |
| ANAA | | | | | 1 | −1 | | | 1 | −1 | | | | | | |
| AANN | | | | | | | 1 | 1 | | | | | 1 | 1 | | |

TABLE 18-continued

| | Antenna port #0 | | | | | | | | Antenna port #1 | | | | | | | |
|---|---|---|---|---|---|---|---|---|---|---|---|---|---|---|---|---|
| | Ch0 | | Ch1 | | Ch2 | | Ch3 | | Ch0 | | Ch1 | | Ch2 | | Ch3 | |
| State | RS | Data | RS | Data | RS | Data | RS | Data | RS | Data | RS | Data | RS | Data | RS | Data |
| AANA | −j | 1 | | | | | | | | | | | | | −j | 1 |
| AAAN | j | 1 | | | | | | | | | | | | | j | 1 |
| AAAA | −1 | 1 | | | | | | | | | | | | | −1 | 1 |

In Tables 16, 17 and 18, positions of Ch0, Ch2 and Ch3 can be limited such that Ch0 and Ch1 correspond to the same PRB and Ch2 and Ch3 correspond to the same PRB. As described above, when an RS part and a data part are separated from each other and channel selection is respectively performed on the RS part and data part, it is advantageous to allocate corresponding channels to the same PRB such that an RS-data pair undergoes the same channel. When cross-carrier scheduling is used, channels (or resources) Ch0 and Ch1 obtained according to LTE-A FDD channel selection are present in the same PRB and Ch2 and Ch3 are present in the same PRB, and thus the present invention is easily applicable. In the case of non-cross-carrier scheduling, Ch0 and Ch1 can be present in the same PRB, and Ch2 and Ch3 can be present in the same PRB through explicit resource allocation. Here, for application of single antenna (port) fallback, which will be described later, a mapping table for single antenna (port) transmission and a mapping table for an antenna (port) for multi-antenna (port) transmission preferably have nested property.

Table 19 shows application of the transmit diversity scheme according to the present invention on the basis of the mapping table (A=4) for CA FDD channel selection, listed in Table 8. Referring to Table 19, RS-to-data mapping is applied to antenna port #0 (Table 8) as in the conventional scheme and RS-data separate channel selection according to the present invention is applied to antenna port #1.

TABLE 19

| HARQ-ACK (0) | HARQ-ACK (1) | HARQ-ACK (2) | HARQ-ACK (3) | Antenna port #0 | | Antenna port #1 | |
|---|---|---|---|---|---|---|---|
| | | | | RS | | RS | |
| | | | | Modulation | Data | Modulation | Data |
| | | | | $n_{PUCCH,i}^{(1)}$ value | $n_{PUCCH,i}^{(1)}$ b(0)b(1) | $n_{PUCCH,i}^{(1)}$ value | $n_{PUCCH,i}^{(1)}$ b(0)b(1) |
| ACK | ACK | ACK | ACK | $n_{PUCCH,1}^{(1)}$ 1 + 0j | $n_{PUCCH,1}^{(1)}$ 1, 1 | $n_{PUCCH,3}^{(1)}$ 1 + 0j | $n_{PUCCH,2}^{(1)}$ 1, 1 |
| ACK | NACK/DTX | ACK | ACK | $n_{PUCCH,2}^{(1)}$ 1 + 0j | $n_{PUCCH,2}^{(1)}$ 0, 1 | $n_{PUCCH,0}^{(1)}$ 1 + 0j | $n_{PUCCH,1}^{(1)}$ 0, 1 |
| NACK/DTX | ACK | ACK | ACK | $n_{PUCCH,1}^{(1)}$ 1 + 0j | $n_{PUCCH,1}^{(1)}$ 0, 1 | $n_{PUCCH,3}^{(1)}$ 1 + 0j | $n_{PUCCH,2}^{(1)}$ 0, 1 |
| NACK/DTX | NACK/DTX | ACK | ACK | $n_{PUCCH,3}^{(1)}$ 1 + 0j | $n_{PUCCH,3}^{(1)}$ 1, 1 | $n_{PUCCH,1}^{(1)}$ 1 + 0j | $n_{PUCCH,0}^{(1)}$ 1, 1 |
| ACK | ACK | ACK | NACK/DTX | $n_{PUCCH,1}^{(1)}$ 1 + 0j | $n_{PUCCH,1}^{(1)}$ 1, 0 | $n_{PUCCH,3}^{(1)}$ 1 + 0j | $n_{PUCCH,2}^{(1)}$ 1, 0 |
| ACK | NACK/DTX | ACK | NACK/DTX | $n_{PUCCH,2}^{(1)}$ 1 + 0j | $n_{PUCCH,2}^{(1)}$ 0, 0 | $n_{PUCCH,0}^{(1)}$ 1 + 0j | $n_{PUCCH,1}^{(1)}$ 0, 0 |
| NACK/DTX | ACK | ACK | NACK/DTX | $n_{PUCCH,1}^{(1)}$ 1 + 0j | $n_{PUCCH,1}^{(1)}$ 0, 0 | $n_{PUCCH,3}^{(1)}$ 1 + 0j | $n_{PUCCH,2}^{(1)}$ 0, 0 |
| NACK/DTX | NACK/DTX | ACK | NACK/DTX | $n_{PUCCH,3}^{(1)}$ 1 + 0j | $n_{PUCCH,3}^{(1)}$ 1, 0 | $n_{PUCCH,1}^{(1)}$ 1 + 0j | $n_{PUCCH,0}^{(1)}$ 1, 0 |
| ACK | ACK | NACK/DTX | ACK | $n_{PUCCH,2}^{(1)}$ 1 + 0j | $n_{PUCCH,2}^{(1)}$ 1, 1 | $n_{PUCCH,0}^{(1)}$ 1 + 0j | $n_{PUCCH,1}^{(1)}$ 1, 1 |
| ACK | NACK/DTX | NACK/DTX | ACK | $n_{PUCCH,2}^{(1)}$ 1 + 0j | $n_{PUCCH,2}^{(1)}$ 1, 0 | $n_{PUCCH,0}^{(1)}$ 1 + 0j | $n_{PUCCH,1}^{(1)}$ 1, 0 |
| NACK/DTX | ACK | NACK/DTX | ACK | $n_{PUCCH,3}^{(1)}$ 1 + 0j | $n_{PUCCH,3}^{(1)}$ 0, 1 | $n_{PUCCH,1}^{(1)}$ 1 + 0j | $n_{PUCCH,0}^{(1)}$ 0, 1 |
| NACK/DTX | NACK/DTX | NACK/DTX | ACK | $n_{PUCCH,3}^{(1)}$ 1 + 0j | $n_{PUCCH,3}^{(1)}$ 0, 0 | $n_{PUCCH,1}^{(1)}$ 1 + 0j | $n_{PUCCH,0}^{(1)}$ 0, 0 |
| ACK | ACK | NACK/DTX | NACK/DTX | $n_{PUCCH,0}^{(1)}$ 1 + 0j | $n_{PUCCH,0}^{(1)}$ 1, 1 | $n_{PUCCH,2}^{(1)}$ 1 + 0j | $n_{PUCCH,3}^{(1)}$ 1, 1 |
| ACK | NACK/DTX | NACK/DTX | NACK/DTX | $n_{PUCCH,0}^{(1)}$ 1 + 0j | $n_{PUCCH,0}^{(1)}$ 1, 0 | $n_{PUCCH,2}^{(1)}$ 1 + 0j | $n_{PUCCH,3}^{(1)}$ 1, 0 |
| NACK/DTX | ACK | NACK/DTX | NACK/DTX | $n_{PUCCH,0}^{(1)}$ 1 + 0j | $n_{PUCCH,0}^{(1)}$ 0, 1 | $n_{PUCCH,2}^{(1)}$ 1 + 0j | $n_{PUCCH,3}^{(1)}$ 0, 1 |
| NACK/DTX | NACK | NACK/DTX | NACK/DTX | $n_{PUCCH,0}^{(1)}$ 1 + 0j | $n_{PUCCH,0}^{(1)}$ 0, 0 | $n_{PUCCH,2}^{(1)}$ 1 + 0j | $n_{PUCCH,3}^{(1)}$ 0, 0 |
| NACK | NACK/DTX | NACK/DTX | NACK/DTX | $n_{PUCCH,0}^{(1)}$ 1 + 0j | $n_{PUCCH,0}^{(1)}$ 0, 0 | $n_{PUCCH,2}^{(1)}$ 1 + 0j | $n_{PUCCH,3}^{(1)}$ 0, 0 |
| DTX | DTX | NACK/DTX | NACK/DTX | No transmission | | | |

Table 20 shows an example when resource allocation methods for data and RS are switched in Table 19.

TABLE 20

| HARQ-ACK(0) | HARQ-ACK(1) | HARQ-ACK(2) | HARQ-ACK(3) | Antenna port #0 | | | | Antenna port #1 | | | |
|---|---|---|---|---|---|---|---|---|---|---|---|
| | | | | RS | | Data | | RS | | Data | |
| | | | | $n_{PUCCH,i}^{(1)}$ | Modulation value | $n_{PUCCH,i}^{(1)}$ | Modulation value | $n_{PUCCH,i}^{(1)}$ | Modulation value | $n_{PUCCH,i}^{(1)}$ | Modulation value |
| ACK | ACK | ACK | ACK | $n_{PUCCH,1}^{(1)}$ | $1 + 0j$ | $n_{PUCCH,1}^{(1)}$ | 1, 1 | $n_{PUCCH,2}^{(1)}$ $1 + 0j$ | | $n_{PUCCH,3}^{(1)}$ 1, 1 | |
| ACK | NACK/DTX | ACK | ACK | $n_{PUCCH,2}^{(1)}$ | $1 + 0j$ | $n_{PUCCH,2}^{(1)}$ | 0, 1 | $n_{PUCCH,1}^{(1)}$ $1 + 0j$ | | $n_{PUCCH,0}^{(1)}$ 0, 1 | |
| NACK/DTX | ACK | ACK | ACK | $n_{PUCCH,1}^{(1)}$ | $1 + 0j$ | $n_{PUCCH,1}^{(1)}$ | 0, 1 | $n_{PUCCH,2}^{(1)}$ $1 + 0j$ | | $n_{PUCCH,3}^{(1)}$ 0, 1 | |
| NACK/DTX | NACK/DTX | ACK | ACK | $n_{PUCCH,3}^{(1)}$ | $1 + 0j$ | $n_{PUCCH,3}^{(1)}$ | 1, 1 | $n_{PUCCH,0}^{(1)}$ $1 + 0j$ | | $n_{PUCCH,1}^{(1)}$ 1, 1 | |
| ACK | ACK | ACK | NACK/DTX | $n_{PUCCH,1}^{(1)}$ | $1 + 0j$ | $n_{PUCCH,1}^{(1)}$ | 1, 0 | $n_{PUCCH,2}^{(1)}$ $1 + 0j$ | | $n_{PUCCH,3}^{(1)}$ 1, 0 | |
| ACK | NACK/DTX | ACK | NACK/DTX | $n_{PUCCH,2}^{(1)}$ | $1 + 0j$ | $n_{PUCCH,2}^{(1)}$ | 0, 0 | $n_{PUCCH,1}^{(1)}$ $1 + 0j$ | | $n_{PUCCH,0}^{(1)}$ 0, 0 | |
| NACK/DTX | ACK | ACK | NACK/DTX | $n_{PUCCH,1}^{(1)}$ | $1 + 0j$ | $n_{PUCCH,1}^{(1)}$ | 0, 0 | $n_{PUCCH,2}^{(1)}$ $1 + 0j$ | | $n_{PUCCH,3}^{(1)}$ 0, 0 | |
| NACK/DTX | NACK/DTX | ACK | NACK/DTX | $n_{PUCCH,3}^{(1)}$ | $1 + 0j$ | $n_{PUCCH,3}^{(1)}$ | 1, 0 | $n_{PUCCH,0}^{(1)}$ $1 + 0j$ | | $n_{PUCCH,1}^{(1)}$ 1, 0 | |
| ACK | ACK | NACK/DTX | ACK | $n_{PUCCH,2}^{(1)}$ | $1 + 0j$ | $n_{PUCCH,2}^{(1)}$ | 1, 1 | $n_{PUCCH,1}^{(1)}$ $1 + 0j$ | | $n_{PUCCH,0}^{(1)}$ 1, 1 | |
| ACK | NACK/DTX | NACK/DTX | ACK | $n_{PUCCH,2}^{(1)}$ | $1 + 0j$ | $n_{PUCCH,2}^{(1)}$ | 1, 0 | $n_{PUCCH,1}^{(1)}$ $1 + 0j$ | | $n_{PUCCH,0}^{(1)}$ 1, 0 | |
| NACK/DTX | ACK | NACK/DTX | ACK | $n_{PUCCH,3}^{(1)}$ | $1 + 0j$ | $n_{PUCCH,3}^{(1)}$ | 0, 1 | $n_{PUCCH,0}^{(1)}$ $1 + 0j$ | | $n_{PUCCH,1}^{(1)}$ 0, 1 | |
| NACK/DTX | NACK/DTX | NACK/DTX | ACK | $n_{PUCCH,3}^{(1)}$ | $1 + 0j$ | $n_{PUCCH,3}^{(1)}$ | 0, 0 | $n_{PUCCH,0}^{(1)}$ $1 + 0j$ | | $n_{PUCCH,1}^{(1)}$ 0, 0 | |
| ACK | ACK | NACK/DTX | NACK/DTX | $n_{PUCCH,0}^{(1)}$ | $1 + 0j$ | $n_{PUCCH,0}^{(1)}$ | 1, 1 | $n_{PUCCH,3}^{(1)}$ $1 + 0j$ | | $n_{PUCCH,2}^{(1)}$ 1, 1 | |
| ACK | NACK/DTX | NACK/DTX | NACK/DTX | $n_{PUCCH,0}^{(1)}$ | $1 + 0j$ | $n_{PUCCH,0}^{(1)}$ | 1, 0 | $n_{PUCCH,3}^{(1)}$ $1 + 0j$ | | $n_{PUCCH,2}^{(1)}$ 1, 0 | |
| NACK/DTX | ACK | NACK/DTX | NACK/DTX | $n_{PUCCH,0}^{(1)}$ | $1 + 0j$ | $n_{PUCCH,0}^{(1)}$ | 0, 1 | $n_{PUCCH,3}^{(1)}$ $1 + 0j$ | | $n_{PUCCH,2}^{(1)}$ 0, 1 | |
| NACK/DTX | NACK | NACK/DTX | NACK/DTX | $n_{PUCCH,0}^{(1)}$ | $1 + 0j$ | $n_{PUCCH,0}^{(1)}$ | 0, 0 | $n_{PUCCH,3}^{(1)}$ $1 + 0j$ | | $n_{PUCCH,2}^{(1)}$ 0, 0 | |
| NACK | NACK/DTX | NACK/DTX | NACK/DTX | $n_{PUCCH,0}^{(1)}$ | $1 + 0j$ | $n_{PUCCH,0}^{(1)}$ | 0, 0 | $n_{PUCCH,3}^{(1)}$ $1 + 0j$ | | $n_{PUCCH,2}^{(1)}$ 0, 0 | |
| DTX | DTX | NACK/DTX | NACK/DTX | No transmission | | | | | | | |

Table 21 shows application of the present invention to TDD channel selection. Table 21 corresponds to a case in which a DL bundling window is set to 4 (i.e. M=4) (refer to Table 4) in a single cell configuration or a case in which two cells are configured and the DL bundling window is set to 2 (i.e. M=2) (refer to Table 9) for each cell. Referring to Table 21, RS-to-data mapping is applied to antenna port #0 (refer to Table 9) and RS-data separate channel selection according to the present invention is applied to antenna port #1.

TABLE 21

| HARQ-ACK(0), HARQ-ACK(1), HARQ-ACK(2), HARQ-ACK(3) | Antenna port #0 | | | | Antenna port #1 | | | |
|---|---|---|---|---|---|---|---|---|
| | RS | | Data | | RS | | Data | |
| | $n_{PUCCH}^{(1)}$ | value | $n_{PUCCH}^{(1)}$ | b(0)b(1) | $n_{PUCCH}^{(1)}$ | value | $n_{PUCCH}^{(1)}$ | b(0)b(1) |
| ACK, ACK, ACK, ACK | $n_{PUCCH,1}^{(1)}$ | $1 + 0j$ | $n_{PUCCH,1}^{(1)}$ | 1, 1 | $n_{PUCCH,3}^{(1)}$ | $1 + 0j$ | $n_{PUCCH,2}^{(1)}$ | 1, 1 |
| ACK, ACK, ACK, NACK/DTX | $n_{PUCCH,2}^{(1)}$ | $1 + 0j$ | $n_{PUCCH,2}^{(1)}$ | 1, 1 | $n_{PUCCH,0}^{(1)}$ | $1 + 0j$ | $n_{PUCCH,1}^{(1)}$ | 1, 1 |
| ACK, ACK, NACK/DTX, ACK | $n_{PUCCH,0}^{(1)}$ | $1 + 0j$ | $n_{PUCCH,0}^{(1)}$ | 1, 0 | $n_{PUCCH,2}^{(1)}$ | $1 + 0j$ | $n_{PUCCH,3}^{(1)}$ | 1, 0 |
| ACK, ACK, NACK/DTX, NACK/DTX | $n_{PUCCH,1}^{(1)}$ | $1 + 0j$ | $n_{PUCCH,1}^{(1)}$ | 1, 0 | $n_{PUCCH,3}^{(1)}$ | $1 + 0j$ | $n_{PUCCH,2}^{(1)}$ | 1, 0 |

TABLE 21-continued

| HARQ-ACK(0), HARQ-ACK(1), HARQ-ACK(2), HARQ-ACK(3) | Antenna port #0 | | | Antenna port #1 | | |
|---|---|---|---|---|---|---|
| | RS | | Data | RS | | Data |
| | $n_{PUCCH}^{(1)}$ value | Modulation $n_{PUCCH}^{(1)}$ | b(0)b(1) | $n_{PUCCH}^{(1)}$ value | Modulation $n_{PUCCH}^{(1)}$ | b(0)b(1) |
| ACK, NACK/DTX, ACK, ACK | $n_{PUCCH,3}^{(1)}$ 1 + 0j | $n_{PUCCH,3}^{(1)}$ | 1, 1 | $n_{PUCCH,1}^{(1)}$ 1 + 0j | $n_{PUCCH,0}^{(1)}$ | 1, 1 |
| ACK, NACK/DTX, ACK, NACK/DTX | $n_{PUCCH,2}^{(1)}$ 1 + 0j | $n_{PUCCH,2}^{(1)}$ | 1, 0 | $n_{PUCCH,0}^{(1)}$ 1 + 0j | $n_{PUCCH,1}^{(1)}$ | 1, 0 |
| ACK, NACK/DTX, NACK/DTX, ACK | $n_{PUCCH,0}^{(1)}$ 1 + 0j | $n_{PUCCH,0}^{(1)}$ | 0, 1 | $n_{PUCCH,2}^{(1)}$ 1 + 0j | $n_{PUCCH,3}^{(1)}$ | 0, 1 |
| ACK, NACK/DTX, NACK/DTX, NACK/DTX | $n_{PUCCH,0}^{(1)}$ 1 + 0j | $n_{PUCCH,0}^{(1)}$ | 1, 1 | $n_{PUCCH,2}^{(1)}$ 1 + 0j | $n_{PUCCH,3}^{(1)}$ | 1, 1 |
| NACK/DTX, ACK, ACK, ACK | $n_{PUCCH,1}^{(1)}$ 1 + 0j | $n_{PUCCH,1}^{(1)}$ | 0, 0 | $n_{PUCCH,3}^{(1)}$ 1 + 0j | $n_{PUCCH,2}^{(1)}$ | 0, 0 |
| NACK/DTX, ACK, ACK, NACK/DTX | $n_{PUCCH,2}^{(1)}$ 1 + 0j | $n_{PUCCH,2}^{(1)}$ | 0, 1 | $n_{PUCCH,0}^{(1)}$ 1 + 0j | $n_{PUCCH,1}^{(1)}$ | 0, 1 |
| NACK/DTX, ACK, NACK/DTX, ACK | $n_{PUCCH,3}^{(1)}$ 1 + 0j | $n_{PUCCH,3}^{(1)}$ | 1, 0 | $n_{PUCCH,1}^{(1)}$ 1 + 0j | $n_{PUCCH,0}^{(1)}$ | 1, 0 |
| NACK/DTX, ACK, NACK/DTX, NACK/DTX | $n_{PUCCH,1}^{(1)}$ 1 + 0j | $n_{PUCCH,1}^{(1)}$ | 0, 1 | $n_{PUCCH,3}^{(1)}$ 1 + 0j | $n_{PUCCH,2}^{(1)}$ | 0, 1 |
| NACK/DTX, NACK/DTX, ACK, ACK | $n_{PUCCH,3}^{(1)}$ 1 + 0j | $n_{PUCCH,3}^{(1)}$ | 0, 1 | $n_{PUCCH,1}^{(1)}$ 1 + 0j | $n_{PUCCH,0}^{(1)}$ | 0, 1 |
| NACK/DTX, NACK/DTX, ACK, NACK/DTX | $n_{PUCCH,2}^{(1)}$ 1 + 0j | $n_{PUCCH,2}^{(1)}$ | 0, 0 | $n_{PUCCH,0}^{(1)}$ 1 + 0j | $n_{PUCCH,1}^{(1)}$ | 0, 0 |
| NACK/DTX, NACK/DTX, NACK/DTX, ACK | $n_{PUCCH,3}^{(1)}$ 1 + 0j | $n_{PUCCH,3}^{(1)}$ | 0, 0 | $n_{PUCCH,1}^{(1)}$ 1 + 0j | $n_{PUCCH,0}^{(1)}$ | 0, 0 |
| NACK, NACK/DTX, NACK/DTX, NACK/DTX | $n_{PUCCH,0}^{(1)}$ 1 + 0j | $n_{PUCCH,0}^{(1)}$ | 0, 0 | $n_{PUCCH,2}^{(1)}$ 1 + 0j | $n_{PUCCH,3}^{(1)}$ | 0, 0 |
| DTX, NACK/DTX, NACK/DTX, NACK/DTX | | No transmission | | | | |

Figure 13:
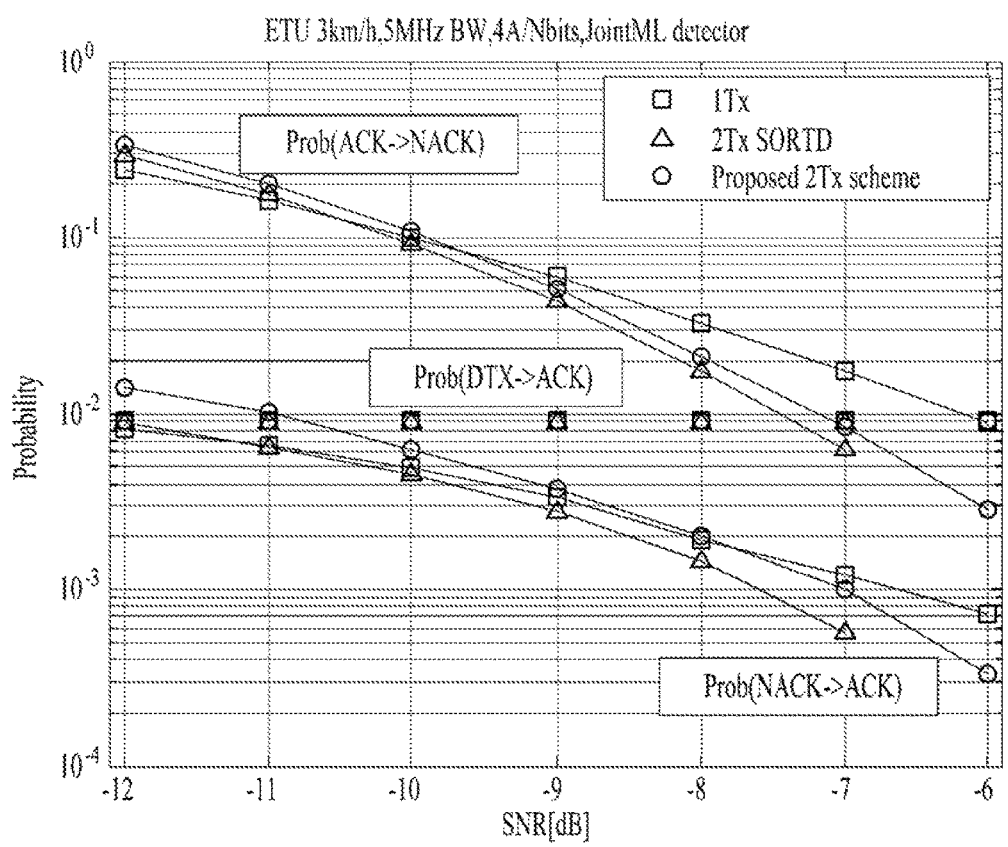
FIG. 13 shows a simulation result when the multi-antenna transmission scheme according to an embodiment of the present invention is used.

FIG. 13 shows a simulation result showing performances of the proposed scheme according to the present invention, single antenna transmission and SORTD to which Table 19 is applied. Simulation was performed on the assumption that the number of receive (Rx) antennas is 2, normal CP is used, 3 km/h is applied to ETU channel model, a system bandwidth is 5 MHz, and a joint ML (maximum likelihood) detector using both an RS and data is used as a receiver algorithm. 4-bit A/N information transmission performances of the proposed scheme, single antenna transmission and SORTD were compared according to the simulation.

Table 22 lists required SNR and the number of resources used, which satisfy conditions of DTX→ACK error rate of 1% or lower, ACK→NACK error rate of 1% or lower and NACK→ACK error rate of 0/1% or lower.

TABLE 22

| | 1Tx | 2Tx SORTD | Proposed 2Tx (FIG. 12, Table 16) |
|---|---|---|---|
| Required SNR | −6.14 dB | −7.34 dB | −6.99 dB |
| SNR gain compared with 1Tx | 0 dB | 1.20 dB | 0.85 dB |
| Number of resources used | 4 | 8 | 4 |
| Resource overhead rate compared with 1Tx | 0% | 100% | 0% |

2Tx SORTD achieves 1.2 dB SNR gain as compared with 1Tx and the proposed 2Tx scheme achieves 0.85 dB SNR gain as compared with 1Tx. However, 2Tx SORTD requires 8 resources corresponding to twice the resources for 1Tx (100% additional overhead), whereas the proposed 2Tx scheme requires the same overhead as that of 1Tx (0% additional overhead). Accordingly, the transmit diversity scheme proposed by the present invention does not additionally require resource overhead while having an SNR gain corresponding to that of SORTD that achieves optimum performance.

Tables 23 and 24 show applications of the present invention. Specifically, Tables 23 and 24 respectively show applications of 2-bit A/N channel selection using 2 channels to FDD and TDD. Tables 23 and 24 correspond to a case in which a single cell is configured and the DL bundling window is set to 2 (i.e. M=2) or a case in which two cells are configured and the DL bundling window is set to 1 (i.e. M=1).

TABLE 23

| HARQ-ACK(0) | HARQ-ACK(1) | Antenna port #0 RS Modulation $n_{PUCCH,i}^{(1)}$ value | Data $n_{PUCCH,i}^{(1)}$ b(0)b(1) | Antenna port #1 RS Modulation $n_{PUCCH,i}^{(1)}$ value | Data $n_{PUCCH,i}^{(1)}$ b(0)b(1) |
|---|---|---|---|---|---|
| ACK | ACK | $n_{PUCCH,1}^{(1)}$ 1 + 0j | $n_{PUCCH,1}^{(1)}$ 1, 1 | $n_{PUCCH,0}^{(1)}$ 1 + 0j | $n_{PUCCH,1}^{(1)}$ 1, 1 |
| ACK | NACK/DTX | $n_{PUCCH,0}^{(1)}$ 1 + 0j | $n_{PUCCH,0}^{(1)}$ 1, 1 | $n_{PUCCH,1}^{(1)}$ 1 + 0j | $n_{PUCCH,0}^{(1)}$ 1, 1 |
| NACK/DTX | ACK | $n_{PUCCH,1}^{(1)}$ 1 + 0j | $n_{PUCCH,1}^{(1)}$ 0, 0 | $n_{PUCCH,0}^{(1)}$ 1 + 0j | $n_{PUCCH,1}^{(1)}$ 0, 0 |
| NACK | NACK/DTX | $n_{PUCCH,0}^{(1)}$ 1 + 0j | $n_{PUCCH,0}^{(1)}$ 0, 0 | $n_{PUCCH,1}^{(1)}$ 1 + 0j | $n_{PUCCH,0}^{(1)}$ 0, 0 |
| DTX | NACK/DTX | | | No transmission | |

TABLE 24

| HARQ-ACK(0), HARQ-ACK(1) | Antenna port #0 RS Modulation $n_{PUCCH,i}^{(1)}$ value | Data $n_{PUCCH,i}^{(1)}$ b(0)b(1) | Antenna port #1 RS Modulation $n_{PUCCH,i}^{(1)}$ value | Data $n_{PUCCH,i}^{(1)}$ b(0)b(1) |
|---|---|---|---|---|
| ACK, ACK | $n_{PUCCH,1}^{(1)}$ 1 + 0j | $n_{PUCCH,1}^{(1)}$ 1, 0 | $n_{PUCCH,0}^{(1)}$ 1 + 0j | $n_{PUCCH,1}^{(1)}$ 1, 0 |
| ACK, NACK/DTX | $n_{PUCCH,0}^{(1)}$ 1 + 0j | $n_{PUCCH,0}^{(1)}$ 1, 1 | $n_{PUCCH,1}^{(1)}$ 1 + 0j | $n_{PUCCH,0}^{(1)}$ 1, 1 |
| NACK/DTX, ACK | $n_{PUCCH,1}^{(1)}$ 1 + 0j | $n_{PUCCH,1}^{(1)}$ 0, 1 | $n_{PUCCH,0}^{(1)}$ 1 + 0j | $n_{PUCCH,1}^{(1)}$ 0, 1 |
| NACK, NACK/DTX | $n_{PUCCH,0}^{(1)}$ 1 + 0j | $n_{PUCCH,0}^{(1)}$ 0, 0 | $n_{PUCCH,1}^{(1)}$ 1 + 0j | $n_{PUCCH,0}^{(1)}$ 0, 0 |
| DTX, NACK/DTX | | | No transmission | |

Tables 25 and 26 show applications of the present invention based on the conventional 3-bit A/N mapping table. Table 25 corresponds to application of the present invention to Table 7. The examples of Tables 25 and 26 correspond to a case in which one (orthogonal) resource is additionally used in addition to 3 (orthogonal) resources used for 3-bit A/N channel selection.

TABLE 25

| HARQ-ACK(0) | HARQ-ACK(1) | HARQ-ACK(2) | Antenna port #0 RS Modulation $n_{PUCCH,i}^{(1)}$ value | Data $n_{PUCCH,i}^{(1)}$ b(0)b(1) | Antenna port #1 RS Modulation $n_{PUCCH,i}^{(1)}$ value | Data $n_{PUCCH,i}^{(1)}$ b(0)b(1) |
|---|---|---|---|---|---|---|
| ACK | ACK | ACK | $n_{PUCCH,1}^{(1)}$ 1 + 0j | $n_{PUCCH,1}^{(1)}$ 1, 1 | $n_{PUCCH,3}^{(1)}$ 1 + 0j | $n_{PUCCH,2}^{(1)}$ 1, 1 |
| ACK | NACK/DTX | ACK | $n_{PUCCH,1}^{(1)}$ 1 + 0j | $n_{PUCCH,1}^{(1)}$ 1, 0 | $n_{PUCCH,3}^{(1)}$ 1 + 0j | $n_{PUCCH,2}^{(1)}$ 1, 0 |
| NACK/DTX | ACK | ACK | $n_{PUCCH,1}^{(1)}$ 1 + 0j | $n_{PUCCH,1}^{(1)}$ 0, 1 | $n_{PUCCH,3}^{(1)}$ 1 + 0j | $n_{PUCCH,2}^{(1)}$ 0, 1 |
| NACK/DTX | NACK/DTX | ACK | $n_{PUCCH,2}^{(1)}$ 1 + 0j | $n_{PUCCH,2}^{(1)}$ 1, 1 | $n_{PUCCH,0}^{(1)}$ 1 + 0j | $n_{PUCCH,1}^{(1)}$ 1, 1 |
| ACK | ACK | NACK/DTX | $n_{PUCCH,0}^{(1)}$ 1 + 0j | $n_{PUCCH,0}^{(1)}$ 1, 1 | $n_{PUCCH,2}^{(1)}$ 1 + 0j | $n_{PUCCH,3}^{(1)}$ 1, 1 |

TABLE 25-continued

| | | | Antenna port #0 | | Antenna port #1 | |
|---|---|---|---|---|---|---|
| | | | RS | Data | RS | Data |
| HARQ-ACK(0) | HARQ-ACK(1) | HARQ-ACK(2) | $n_{PUCCH,i}^{(1)}$ Modulation value | $n_{PUCCH,i}^{(1)}$ b(0)b(1) | $n_{PUCCH,i}^{(1)}$ Modulation value | $n_{PUCCH,i}^{(1)}$ b(0)b(1) |
| ACK | NACK/DTX | NACK/DTX | $n_{PUCCH,0}^{(1)}$ 1 + 0j | $n_{PUCCH,0}^{(1)}$ 1, 0 | $n_{PUCCH,2}^{(1)}$ 1 + 0j | $n_{PUCCH,3}^{(1)}$ 1, 0 |
| NACK/DTX | ACK | NACK/DTX | $n_{PUCCH,0}^{(1)}$ 1 + 0j | $n_{PUCCH,0}^{(1)}$ 0, 1 | $n_{PUCCH,2}^{(1)}$ 1 + 0j | $n_{PUCCH,3}^{(1)}$ 0, 1 |
| NACK/DTX | NACK/DTX | NACK | $n_{PUCCH,2}^{(1)}$ 1 + 0j | $n_{PUCCH,2}^{(1)}$ 0, 0 | $n_{PUCCH,0}^{(1)}$ 1 + 0j | $n_{PUCCH,1}^{(1)}$ 0, 0 |
| NACK | NACK/DTX | DTX | $n_{PUCCH,0}^{(1)}$ 1 + 0j | $n_{PUCCH,0}^{(1)}$ 0, 0 | $n_{PUCCH,2}^{(1)}$ 1 + 0j | $n_{PUCCH,3}^{(1)}$ 0, 0 |
| NACK/DTX | NACK | DTX | $n_{PUCCH,0}^{(1)}$ 1 + 0j | $n_{PUCCH,0}^{(1)}$ 0, 0 | $n_{PUCCH,2}^{(1)}$ 1 + 0j | $n_{PUCCH,3}^{(1)}$ 0, 0 |
| DTX | DTX | DTX | | No transmission | | |

TABLE 26

| HARQ-ACK(0), HARQ-ACK(1), HARQ-ACK(2) | Antenna port #0 | | Antenna port #1 | |
|---|---|---|---|---|
| | RS | Data | RS | Data |
| | $n_{PUCCH}^{(1)}$ Modulation value | $n_{PUCCH}^{(1)}$ b(0)b(1) | $n_{PUCCH}^{(1)}$ Modulation value | $n_{PUCCH}^{(1)}$ b(0)b(1) |
| ACK, ACK, ACK | $n_{PUCCH,2}^{(1)}$ 1 + 0j | $n_{PUCCH,2}^{(1)}$ 1, 1 | $n_{PUCCH,0}^{(1)}$ 1 + 0j | $n_{PUCCH,1}^{(1)}$ 1, 1 |
| ACK, ACK, NACK/DTX | $n_{PUCCH,1}^{(1)}$ 1 + 0j | $n_{PUCCH,1}^{(1)}$ 1, 0 | $n_{PUCCH,3}^{(1)}$ 1 + 0j | $n_{PUCCH,2}^{(1)}$ 1, 0 |
| ACK, NACK/DTX, ACK | $n_{PUCCH,2}^{(1)}$ 1 + 0j | $n_{PUCCH,2}^{(1)}$ 1, 0 | $n_{PUCCH,0}^{(1)}$ 1 + 0j | $n_{PUCCH,1}^{(1)}$ 1, 0 |
| ACK, NACK/DTX, NACK/DTX | $n_{PUCCH,0}^{(1)}$ 1 + 0j | $n_{PUCCH,0}^{(1)}$ 1, 1 | $n_{PUCCH,2}^{(1)}$ 1 + 0j | $n_{PUCCH,3}^{(1)}$ 1, 1 |
| NACK/DTX, ACK, ACK | $n_{PUCCH,2}^{(1)}$ 1 + 0j | $n_{PUCCH,2}^{(1)}$ 0, 1 | $n_{PUCCH,0}^{(1)}$ 1 + 0j | $n_{PUCCH,1}^{(1)}$ 0, 1 |
| NACK/DTX, ACK, NACK/DTX | $n_{PUCCH,1}^{(1)}$ 1 + 0j | $n_{PUCCH,1}^{(1)}$ 0, 1 | $n_{PUCCH,3}^{(1)}$ 1 + 0j | $n_{PUCCH,2}^{(1)}$ 0, 1 |
| NACK/DTX, NACK/DTX, ACK | $n_{PUCCH,2}^{(1)}$ 1 + 0j | $n_{PUCCH,2}^{(1)}$ 1, 1 | $n_{PUCCH,0}^{(1)}$ 1 + 0j | $n_{PUCCH,1}^{(1)}$ 1, 1 |
| NACK, NACK/DTX, NACK/DTX | $n_{PUCCH,0}^{(1)}$ 1 + 0j | $n_{PUCCH,0}^{(1)}$ 1, 1 | $n_{PUCCH,2}^{(1)}$ 1 + 0j | $n_{PUCCH,3}^{(1)}$ 1, 1 |
| DTX, NACK/DTX, NACK/DTX | | No transmission | | |

Tables 19 and 21 (4-bit A/N) and Tables 25 and 26 (3-bit A/N) are formulated as follows. A resource used for an antenna port p is referred to as $n_{PUCCH}^{(1,p)}$ and resources and information bits (before modulation) used for an RS part and a data part at antenna ports p=p0 and p=p1 are defined as follows.

$n_{PUCCH, RS}^{(1,p=p0)}$: (orthogonal) resource index of the RS part for antenna port p0

$n_{PUCCH, RS}^{(1,p=p1)}$: (orthogonal) resource index of the RS part for antenna port p1

$n_{PUCCH, DATA}^{(1,p=p0)}$: (orthogonal) resource index of the data part for antenna port p0

$n_{PUCCH, DATA}^{(1,p=p1)}$: (orthogonal) resource index of the data part for antenna port p1

$b^{p=p0}$ (0): 0-th information bit of the data part for antenna port p0

$b^{p=p0}$ (1): first information bit of the data part for antenna port p0

$b^{p=p1}$ (0): 0-th information bit of the data part for antenna port p1

$b^{p=p1}$ (1): first information bit of the data part for antenna port p1

If an (orthogonal) resource index defined for single antenna transmission is $n_{PUCCH}^{(1)}$ and the 0-th and first information bits are b(0) and b(1), (orthogonal) resources and information bits selected for channel selection according to the present invention can be represented as follows.

$$n_{PUCCH,RS}^{(1,p=p0)} = n_{PUCCH}^{(1)}$$

$$n_{PUCCH,RS}^{(1,p=p1)} = (n_{PUCCH}^{(1)} + \alpha) \bmod(\beta) \text{ where } \alpha \text{ and } \beta \text{ are integers}$$

$n_{PUCCH,DATA}^{(1,p=p_0)} = n_{PUCCH}^{(1)}$ $n_{PUCCH,DATA}^{(1,p=p_1)} = n_{PUCCH,RS}^{(1,p=p_1)} + \gamma$ where $\gamma$ is an integer $b^{p=p_0}(0) = b(0)$ $b^{p=p_0}(1) = b(1)$ $b^{p=p_1}(0) = b(0)$ $b^{p=p_1}(1) = b(1)$ [Equation 2]

Here, (A) mod (B) represents a remainder obtained by dividing A by B and $n_{PUCCH}^{(1)} + \alpha$ refers to application of an offset to a PUCCH resource index (or PRB index, CS index and OCC index derived from the PUCCH resource index). While it is assumed that b(0),b(1) modulated to data parts of antennas (antenna ports) have the same value, the present invention is applicable to a case in which modulation symbols have different values for antennas (antenna ports). In addition, the present invention includes application of the same rule to all slots or modification into slot-based application (e.g. change of channels selected in first and second slots and change of modulation symbols b(0),b(1), etc.).

In Equation 2, the RS resource index for the second antenna port is obtained by applying a predetermined offset to the resource index of the first antenna port and the data resource index for the second antenna port is derived from the second antenna port RS resource index, and vice versa as represented by Equation 3.

$n_{PUCCH,RS}^{(1,p=p_0)} = n_{PUCCH}^{(1)}$ $n_{PUCCH,DATA}^{(1,p=p_1)} = (n_{PUCCH}^{(1)} + \alpha) \bmod(\beta)$ where $\alpha$ and $\beta$ are integers $n_{PUCCH,DATA}^{(1,p=p_0)} = n_{PUCCH}^{(1)}$ $n_{PUCCH,RS}^{(1,p=p_1)} = n_{PUCCH,DATA}^{(1,p=p_1)} + \gamma$ where $\gamma$ is an integer $b^{p=p_0}(0) = b(0)$ $b^{p=p_0}(1) = b(1)$ $b^{p=p_1}(0) = b(0)$ $b^{p=p_1}(1) = b(1)$ [Equation 3]

Equation 4 is obtained by applying $\alpha=2$, $\beta=4$ and $$\gamma = (-1)^{n_{PUCCH,RS}^{(1,p=p_1)}}$$

to Equation 2.

$n_{PUCCH,RS}^{(1,p=p_0)} = n_{PUCCH}^{(1)}$ $n_{PUCCH,RS}^{(1,p=p_1)} = (n_{PUCCH}^{(1)} + 2) \bmod(4)$ $n_{PUCCH,DATA}^{(1,p=p_0)} = n_{PUCCH}^{(1)}$ $$n_{PUCCH,DATA}^{(1,p=p_1)} = n_{PUCCH,RS}^{(1,p=p_1)} + (-1)^{n_{PUCCH,RS}^{(1,p=p_1)}}$$

$b^{p=p_0}(0) = b(0)$ $b^{p=p_0}(1) = b(1)$ $b^{p=p_1}(0) = b(0)$ $b^{p=p_1}(1) = b(1)$ [Equation 4]

Equation 5 is obtained by applying $\alpha=2$, $\beta=4$, $$\gamma = (-1)^{n_{PUCCH,RS}^{(1,p=p_1)}}$$

and to Equation 3.

$n_{PUCCH,RS}^{(1,p=p_0)} = n_{PUCCH}^{(1)}$ $n_{PUCCH,DATA}^{(1,p=p_1)} = (n_{PUCCH}^{(1)} + 2) \bmod(4)$ $n_{PUCCH,DATA}^{(1,p=p_0)} = n_{PUCCH}^{(1)}$ $$n_{PUCCH,RS}^{(1,p=p_1)} = n_{PUCCH,DATA}^{(1,p=p_1)} + (-1)^{n_{PUCCH,DATA}^{(1,p=p_1)}}$$

$b^{p=p_0}(0) = b(0)$ $b^{p=p_0}(1) = b(1)$ $b^{p=p_1}(0) = b(0)$ $b^{p=p_1}(1) = b(1)$ [Equation 5]

Unlike $\alpha$ in Equations 2 to 5, offset $\alpha$ can be used to indicate the relative order of a corresponding PUCCH resource from among given PUCCH resources. For example, if $n_{PUCCH,i}^{(1)}$ indicates an i-th ($0 \leq i < N$) resource index from among N resources, the offset can be applied to i as represented by Equation 6.

$n_{PUCCH,RS}^{(1,p=p_0)} = n_{PUCCH,RS,i}^{(1,p=p_0)} = n_{PUCCH,i}^{(1)}$ $n_{PUCCH,RS}^{(1,p=p_1)} = n_{PUCCH,RS,k}^{(1,p=p_0)} = n_{PUCCH,k}^{(1)}$
where $k = i+\alpha$ or $k = (i+\alpha) \bmod(\beta)$ and $\alpha$ and $\beta$ are integers $n_{PUCCH,DATA}^{(1,p=p_0)} = n_{PUCCH,DATA,i}^{(1,p=p_0)} = n_{PUCCH,i}^{(1)}$ $n_{PUCCH,DATA}^{(1,p=p_1)} = n_{PUCCH,DATA,m}^{(1,p=p_1)} = n_{PUCCH,RS,m}^{(1,p=p_0)}$ where $m = k+\lambda$ or $m = (k+\lambda) \bmod(\gamma)$ and $\lambda$ and $\gamma$ are integers $b^{p=p_0}(0) = b(0)$ $b^{p=p_0}(1) = b(1)$ $b^{p=p_1}(0) = b(0)$ $b^{p=p_1}(1) = b(1)$ [Equation 6]

Equation 7 is a simplified form of Equation 6.

$n_{PUCCH,RS}^{(1,p=p_0)} = n_{PUCCH,i}^{(1)}$ $n_{PUCCH,RS}^{(1,p=p_1)} = n_{PUCCH,(i+\alpha)}^{(1)}$ or
$n_{PUCCH,RS}^{(1,p=p_1)} = n_{PUCCH,(i+\alpha) \bmod(\beta)}^{(1)}$ where $\alpha$ and $\beta$ are integers $n_{PUCCH,DATA}^{(1,p=p_0)} = n_{PUCCH,i}^{(1)}$ $n_{PUCCH,DATA}^{(1,p=p_1)} = n_{PUCCH,(i+\alpha+\lambda)}^{(1)}$ or
$n_{PUCCH,DATA}^{(1,p=p_1)} = n_{PUCCH,(i+\alpha+\lambda) \bmod(\gamma)}^{(1)}$
where $\lambda$ and $\gamma$ are integers $b^{p=p_0}(0) = b(0)$ $b^{p=p_0}(1) = b(1)$ $b^{p=p1}(0)=b(0)$ $b^{p=p1}(1)=b(1)$ [Equation 7]

Equation 8 is obtained by changing the RS inference method and data inference method in Equation 6.

$n_{PUCCH,RS}^{(1,p=p0)}=n_{PUCCH,RS,i}^{(1,p=p0)}=n_{PUCCH,i}^{(1)}$ $n_{PUCCH,DATA}^{(1,p=p0)}=n_{PUCCH,DATA,i}^{(1,p=p0)}=n_{PUCCH,i}^{(1)}$ $n_{PUCCH,DATA}^{(1,p=p1)}=n_{PUCCH,DATA,m}^{(1,p=p1)}=n_{PUCCH,RS,m}^{(1,p=p0)}$ where $m=k+\lambda$ or $m=(k+\lambda) \mod(\gamma)$ and $\lambda$ and $\gamma$ are integers $n_{PUCCH,RS}^{(1,p=p1)}=n_{PUCCH,RS,k}^{(1,p=p0)}=n_{PUCCH,k}^{(1)}$ where $k=i+\alpha$ or $k=(i+\alpha)\mod(\beta)$ and $\alpha$ and $\beta$ are integers $b^{p=p0}(0)=b(0)$ $b^{p=p0}(1)=b(1)$ $b^{p=p1}(0)=b(0)$ $b^{p=p1}(1)=b(1)$ [Equation 8]

Equations 9 and 10 are obtained by applying $\alpha=2$, $\beta=4$ and $$\lambda = (-1)^{n_{PUCCH,RS}^{(1,p=p_1)}}$$

to Equations 6 and 7.

$n_{PUCCH,RS}^{(1,p=p0)}=n_{PUCCH,RS,i}^{(1,p=p0)}=n_{PUCCH,i}^{(1)}$ $n_{PUCCH,RS}^{(1,p=p1)}=n_{PUCCH,RS,k}^{(1,p=p0)}=n_{PUCCH,k}^{(1)}$, $k=(i+2)\mod(4)$ $n_{PUCCH,DATA}^{(1,p=p0)}=n_{PUCCH,DATA,i}^{(1,p=p0)}=n_{PUCCH,i}^{(1)}$ $n_{PUCCH,DATA}^{(1,p=p1)}=n_{PUCCH,DATA,m}^{(1,p=p1)}=n_{PUCCH,RS,m}^{(1,p=p0)}$ where $$m = ((i+2) \mod (4)) + (-1)^{n_{PUCCH,RS}^{(1,p=p_1)}}$$

$b^{p=p0}(0)=b(0)$ $b^{p=p0}(1)=b(1)$ $b^{p=p1}(0)=b(0)$ $b^{p=p1}(1)=b(1)$ [Equation 9]

$n_{PUCCH,RS}^{(1,p=p0)}=n_{PUCCH,i}^{(1)}$ $n_{PUCCH,RS}^{(1,p=p1)}=n_{PUCCH,(i+2)\mod(4)}^{(1)}$ $n_{PUCCH,DATA}^{(1,p=p0)}=n_{PUCCH,i}^{(1)}$ $$n_{PUCCH,DATA}^{(1,p=p_1)} = n_{PUCCH,((i+2) \mod (4))+(-1)^{n_{PUCCH,RS}^{(1,p=p_1)}}}^{(1)}$$

$b^{p=p0}(0)=b(0)$ $b^{p=p0}(1)=b(1)$ $b^{p=p1}(0)=b(0)$ $b^{p=p1}(1)=b(1)$ [Equation 10]

Figure 14:
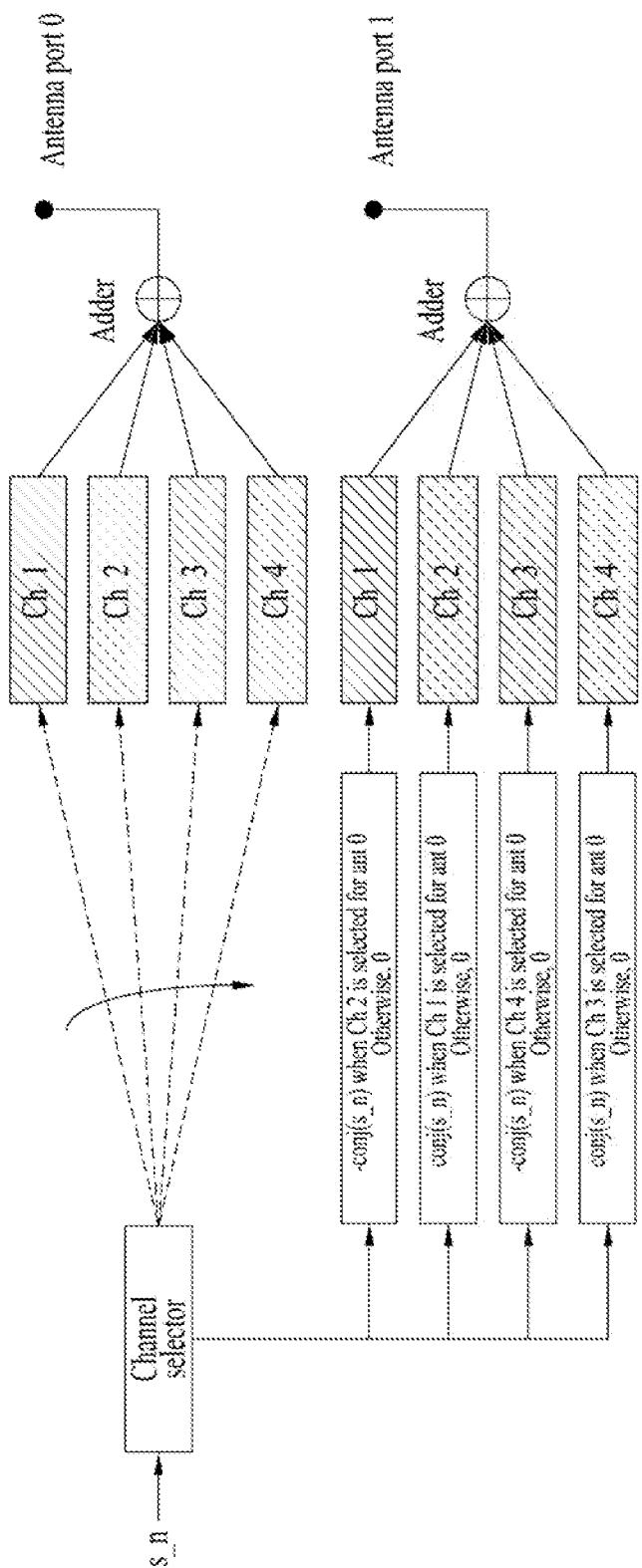
FIG. 14 illustrates exemplary SCBC (space-code block coding) transmission.

A description will be given of space-code block coding (SCBC) as a method for enabling transmit diversity without doubling the number of PUCCH resources. FIG. 14 illustrates a signal transmission method using SCBC. Referring to FIG. 14, according to SCBC, space block coding is applied between two (orthogonal) resources (e.g. PUCCH resources). As illustrated in FIG. 14, SCBC can achieve transmit diversity using the same (orthogonal) resources (e.g. Ch1 to Ch4) as those used for single antenna transmission. To obtain a high spatial diversity gain, the two (orthogonal) resources to which SCBC is applied can be paired in the same PRB or in PRBs close to each other.

The present invention proposes a resource allocation method for channel selection when the transmit diversity scheme is used. While a case in which a PDCCH corresponding to a PDSCH is transmitted along with the PDSCH for PDSCH transmission will now be described for convenience, the present invention can be equally applied to a case in which an SPS PDSCH without a PDCCH is transmitted and a case in which only a PDCCH such as an SPS release PDCCH is transmitted by applying the SPS PDSCH or SPS release PDCCH to a mapping table for channel selection. In addition, while two cells (i.e. PCell and SCell) (CCs) are configured in the following description, the present invention is applicable to TDD in which one cell is configured. Accordingly, if cross-carrier scheduling is applied, a PDCCH corresponding to a PDSCH transmitted in the SCell is transmitted in the PCell and a PDCCH corresponding to a PDSCH transmitted in the PCell is transmitted in the PCell. When non-cross-carrier scheduling is set, the PDCCH corresponding to the PDSCH transmitted in the SCell is transmitted in the SCell and the PDCCH corresponding to the PDSCH transmitted in the PCell is transmitted in the PCell.

Resource allocation for channel selection based on single antenna transmission in LTE-A is described first. Resource allocation for channel selection is applied to both FDD and TDD, resource allocation in each of FDD and TDD is divided into 2-bit, 3-bit and 4-bit A/N transmission cases, and each case is classified into cross-carrier scheduling case (CIF configuration) and non-cross-carrier-scheduling case (no CIF configuration). For facilitation of description, in the case of DL CC transmission modes 1, 2, 5, 6, and 7, a corresponding DL CC is regarded as being configured in SIMO (single input multiple output) transmission mode. In other transmission modes, a corresponding DL CC is regarded as being configured in MIMO transmission mode.

Conventional resource allocation for FDD channel selection is arranged as follows.

2-bit A/N→2 (orthogonal) resources are needed (PCell-SIMO, SCell-SIMO)

When a CIF is configured (i.e. cross-carrier scheduling)

$n_{PUCCH,0}^{(1)}$: This is determined by the lowest CCE index $n_{CCE,0}$ of a PDCCH corresponding to a PDSCH transmitted in the PCell. For example, $n_{PUCCH,0}^{(1)}=n_{CCE,0}+N_{PUCCH}^{(1)}$.

$n_{PUCCH,1}^{(1)}$: This is determined by the lowest CCE index $n_{CCE,1}$ of a PDCCH corresponding to a PDSCH transmitted in the SCell. For example, $n_{PUCCH,0}^{(1)}=n_{CCE,0}+N_{PUCCH}^{(1)}$.

When the CIF is not configured (i.e. non-cross-carrier scheduling)

$n_{PUCCH,0}^{(1)}$: This is determined by the lowest CCE index $n_{CCE,0}$ of the PDCCH corresponding to the PDSCH transmitted in the PCell. For example, $n_{PUCCH,0}^{(1)} = n_{CCE,0} + N_{PUCCH}^{(1)}$.

$n_{PUCCH,1}^{(1)}$: 4 resource values (e.g. PUCCH resource values) are configured by a higher layer for a UE and a resource value indicated by a TPC field in the PDCCH corresponding to the PDSCH transmitted in the SCell is used. The indicated resource value is mapped to a resource.

3-bit A/N→3 (orthogonal) resources are needed (PCell-MIMO, SCell-SIMO; or PCell-SIMO, SCell-MIMO)

When the CIF is configured $n_{PUCCH,0}^{(1)}$: This is determined by the lowest CCE index $n_{CCE,0}$ of a PDCCH corresponding to a PDSCH transmitted in a serving cell configured in MIMO mode. For example, $n_{PUCCH,1}^{(1)}$: This is determined by $n_{PUCCH,1}^{(1)} = n_{PUCCH,0}^{(1)} + 1$, for example (i.e. resource immediately following the resource linked to the lowest CCE index). In this case, the corresponding resource is determined by (lowest CCE index of the PDCCH corresponding to the PDSCH transmitted in the serving cell configured in MIMO mode)+1.

$n_{PUCCH,2}^{(1)}$: This is determined by the lowest CCE index $n_{CCE,1}$ of a PDCCH corresponding to a PDSCH transmitted in a serving cell configured in SIMO mode. For example, $n_{PUCCH,2}^{(1)} = n_{CCE,1} + N_{PUCCH}^{(1)}$.

In the case of no CIF, PCell-MIMO and SCell-SIMO $n_{PUCCH,0}^{(1)}$: This is determined by the lowest CCE index $n_{CCE,0}$ of the PDCCH corresponding to the PDSCH transmitted in the serving cell configured in MIMO mode. For example, $n_{PUCCH,0}^{(1)} = n_{CCE,0} + N_{PUCCH}^{(1)}$.

$n_{PUCCH,1}^{(1)}$: This is determined by $n_{PUCCH,1}^{(1)} = n_{PUCCH,0}^{(1)} + 1$ for example (i.e. resource immediately following the resource linked to the lowest CCE index). In this case, the corresponding resource is determined by (lowest CCE index of the PDCCH corresponding to the PDSCH transmitted in the serving cell configured in MIMO mode)+1.

$n_{PUCCH,2}^{(1)}$: 4 resource values (e.g. PUCCH resource values) are configured by a higher layer for a UE and a resource value indicated by the TPC field in the PDCCH corresponding to the PDSCH transmitted in the SCell is used. The indicated resource value is mapped to resource $n_{PUCCH,2}^{(1)}$.

In the case of no CIF, PCell-SIMO and SCell-MIMO $n_{PUCCH,0}^{(1)}$: This is determined by the lowest CCE index $n_{CCE,0}$ of a PDCCH corresponding to a PDSCH transmitted in a serving cell configured in SIMO mode. For example, $n_{PUCCH,0}^{(1)} = n_{CCE,0}^{(1)}$.

$n_{PUCCH,1}^{(1)}$, $n_{PUCCH,2}^{(1)}$: 4 resource values (e.g. PUCCH resource values) are configured by a higher layer for a UE and a resource value indicated by the TPC field in the PDCCH corresponding to the PDSCH transmitted in the SCell is used. The indicated resource value is mapped to two resources $n_{PUCCH,1}^{(1)}$ and $n_{PUCCH,2}^{(1)}$.

4-bit A/N→4 (orthogonal) resources are needed (PCell-MIMO, SCell-MIMO)

When the CIF is configured $n_{PUCCH,0}^{(1)}$: This is determined by the lowest CCE index $n_{CCE,0}$ of the PDCCH corresponding to the PDSCH transmitted in the PCell. For example, $n_{PUCCH,0}^{(1)} = n_{CCE,0} + N_{PUCCH}^{(1)}$.

$n_{PUCCH,1}^{(1)}$: This is determined by $n_{PUCCH,1}^{(1)} = n_{PUCCH,0}^{(1)} + 1$, for example (i.e. resource immediately following the resource linked to the lowest CCE index). In this case, the corresponding resource is determined by (lowest CCE index of the PDCCH corresponding to the PDSCH transmitted in the PCell)+1.

$n_{PUCCH,2}^{(1)}$: This is determined by the lowest CCE index $n_{CCE,1}$ of the PDCCH corresponding to the PDSCH transmitted in the SCell. For example, $n_{PUCCH,2}^{(1)} = n_{CCE,1} + N_{PUCCH}^{(1)}$.

$n_{PUCCH,3}^{(1)}$: This is determined by $n_{PUCCH,3}^{(1)} = n_{PUCCH,2}^{(1)} + 1$, for example (i.e. resource immediately following the resource linked to the lowest CCE index). In this case, the corresponding resource is determined by (lowest CCE index of the PDCCH corresponding to the PDSCH transmitted in the SCell)+1.

When the CIF is not configured $n_{PUCCH,0}^{(1)}$: This is determined by the lowest CCE index $n_{CCE,0}$ of the PDCCH corresponding to the PDSCH transmitted in the PCell. For example, $n_{PUCCH,0}^{(1)} = n_{CCE,0} + N_{PUCCH}^{(1)}$.

$n_{PUCCH,1}^{(1)}$: This is determined by $n_{PUCCH,1}^{(1)} = n_{PUCCH,0}^{(1)} + 1$, for example (i.e. resource immediately following the resource linked to the lowest CCE index). In this case, the corresponding resource is determined by (lowest CCE index of the PDCCH corresponding to the PDSCH transmitted in the PCell)+1.

$n_{PUCCH,2}^{(1)}$, $n_{PUCCH,3}^{(1)}$: 4 resource values (e.g. PUCCH resource values) are configured by a higher layer for a UE and a resource value indicated by the TPC field in the PDCCH corresponding to the PDSCH transmitted in the SCell is used. The indicated resource value is mapped to two resources $n_{PUCCH,2}^{(1)}$ and $n_{PUCCH,3}^{(1)}$.

Conventional resource allocation for TDD channel selection is arranged as follows.

Single cell configuration

A PUCCH resource index is determined by the lowest CCE index $n_{CCE}$ of the PDCCH in each DL subframe within a DL bundling window (i.e. M DL subframes).

Case in which two cells are configured

When a PDCCH is transmitted on the PCell

The PUCCH resource index is determined by the lowest CCE index or (lowest CCE index)+1 (as necessary).

The PUCCH resource index is determined by the lowest CCE index ($n_{CCE,m=0}$) of a PDCCH with DAI=1 and the lowest CCE index ($n_{CCE,m=1}$) of a PDCCH with DAI=2 (when M=3 or 4, time domain bundled channel selection mode is applicable).

When a PDCCH is transmitted on the SCell 4 resource values (e.g. PUCCH resource values) are configured by a higher layer for a UE and a resource value indicated by the TPC field in the PDCCH transmitted in the SCell is used (non-cross-carrier scheduling).

In the above-described resource allocation scheme, when the first resource is determined as $n_{PUCCH,i}^{(1)} = n_{CCE,i} + N_{PUCCH}^{(1)}$ to correspond to the lowest CCE index of the PDCCH and the second resource is determined as $n_{PUCCH,i+1}^{(1)} = n_{PUCCH,i}^{(1)} + 1$, the resources can be efficiently used. For example, when the CCE aggregation level for the PDCCH is 2 or higher, an (orthogonal) resource corresponding to the (lowest CCE index)+1 is not used and thus more resources can be used without additional overhead.

Use of an (orthogonal) resource corresponding to the (lowest CCE index of the PDCCH)+1 as a transmission resource for an additional antenna (port) can be considered even when transmit diversity transmission is performed. However, the (orthogonal) resource corresponding to the (lowest CCE index of the PDCCH)+1 is not always used for transmit diversity. That is, an additional resource for multi-antenna transmission cannot be obtained through the method illustrated in FIG. 15 (i.e. the PUCCH resource corresponding to $n_{CCE}+1$ is used for other purposes (e.g. channel selection, etc.)) (1) or can be given as a PUCCH resource corresponding to $n_{CCE}+1$ (2) while resources for single antenna transmission are present. Here, (1) may correspond to a case in which PUCCH resources corresponding to $n_{CCE}$ and $n_{CCE}+1$ are used by a different UE due to PDCCHs (including cross-carrier scheduling case) transmitted on the PCell or TPC fields in PDCCHs transmitted on the SCell indicate the PUCCH resources corresponding to $n_{CCE}$ and $n_{CCE}+1$.

Considering the above description, the present invention applies the proposed transmit diversity scheme (refer to FIG. 12) or SCBC to the case of (1) without additional resource allocation and applies SORTD to the case of (2) using additional resources. That is, transmit diversity applied to channel selection can be variably operated according to whether or not the lowest CCE index+1 (or PUCCH resource corresponding thereto) can be used as an additional resource for transmit diversity. For example, SORTD can be applied when the number of resources for multi-antenna (e.g. N Tx) transmission is N times the number of resources for single antenna transmission whereas the transmit diversity scheme (refer to FIG. 12) proposed by the present invention or SCBC can be applied when the number of resources for multi-antenna transmission is less than N times the number of resources for single antenna transmission.

The multi-antenna transmission scheme can be operated as follows. However, the present invention is not limited thereto. In the following, underlined resources denote resources additionally allocated for multi-antenna transmission.

Exemplary operation of multi-antenna transmission scheme
   FDD channel selection when two cells are configured
   Cross-carrier scheduling
   2-bit A/N→SORTD is applied (a total of 4 resources) (2 resources are additionally secured for multi-antenna transmission)
   PUCCH resource #0 for antenna port #0 (ant #0): $n_{CCE,0}$ (for PCell)
   PUCCH resource #1 for ant #0: $n_{CCE,1}$ (for SCell)
   PUCCH resource #2 for antenna port #1 (ant #1): $n_{CCE,0}+1$ (for PCell)
   PUCCH resource #3 for ant #1: $n_{CCE,1}+1$ (for SCell)
   3-bit A/N→SCBC or the TxD scheme according to the present invention is applied (a total of 4 resources) (one resource is additionally secured for multi-antenna transmission)
   PUCCH resource #0: $n_{CCE,m}$ (for MIMO cell)
   PUCCH resource #1: $n_{CCE,m}+1$ (for MIMO cell)
   PUCCH resource #2: $n_{CCE,n}$ (for SIMO cell)
   PUCCH resource #3: $n_{CCE,n}+1$ (for MIMO cell)
   4-bit A/N→The TxD scheme according to the present invention or SCBC is applied (a total of 4 resources) (no resource is additionally secured for multi-antenna transmission)
   PUCCH resource #0: $n_{CCE,0}$ (for PCell)
   PUCCH resource #1: $n_{CCE,0}+1$ (for PCell)
   PUCCH resource #2: $n_{CCE,1}$ (for SCell)
   PUCCH resource #3: $n_{CCE,1}+1$ (for SCell)
   Non-cross-carrier scheduling
   2-bit A/N→SORTD is applied (a total of 4 resources) (2 resources are additionally secured for multi-antenna transmission)
   PUCCH resource #0 for ant #0): $n_{CCE,0}$ (for PCell)
   PUCCH resource #1 for ant #0: from ARI (for SCell)
   PUCCH resource #0 for ant #1: $n_{CCE,0}+1$ (for PCell)
   PUCCH resource #1 for ant #1: from ARI or (PUCCH resource #1+1) (for SCell)
   3-bit A/N→SCBC or the TxD scheme according to the present invention is applied (a total of 4 resources) (one resource is additionally secured for multi-antenna transmission)
   When PCell is MIMO cell
   PUCCH resource #0: $n_{CCE,m}$ (for PCell)
   PUCCH resource #1: $n_{CCE,m}+1$ (for PCell)
   PUCCH resource #2: from ARI (for SCell)
   PUCCH resource #3: from ARI or (PUCCH resource #2+1) (for SCell)
   When SCell is MIMO cell
   PUCCH resource #0: from ARI (for SCell)
   PUCCH resource #1: from ARI or (PUCCH resource #0+1) (for SCell)
   PUCCH resource #2: $n_{CCE,m}$ (for PCell)
   PUCCH resource #3: $n_{CCE,m}+1$ (for PCell)
   4-bit A/N→The TxD scheme according to the present invention or SCBC is applied (a total of 4 resources) (no resource is additionally secured for multi-antenna transmission)
   PUCCH resource #0: $n_{CCE,0}$ (for PCell)
   PUCCH resource #1: $n_{CCE,0}+1$ (for PCell)
   PUCCH resource #2: from ARI (for SCell)
   PUCCH resource #3: from ARI or (PUCCH resource #2+1) (for SCell)
   TDD channel selection when a single is configured→SORTD is applied.
   (Resource Allocation Example 1)
   A PUCCH resource index is determined by the lowest CCE index $n_{CCE}$ of the PDCCH in each DL subframe within the DL bundling window→for ant#0
   A PUCCH resource index is determined by (the lowest CCE index+1 ($n_{CCE}+1$)) of the PDCCH in each DL subframe within the DL bundling window→for ant#1
   (Resource Allocation Example 2)
   A resource for ant#0 is determined by $n_{PUCCH,i}^{(1,\tilde{p}=p_0)} = M-i-1) \cdot N_c + i \cdot N_{c+1} + n_{CCE,i} + N_{PUCCH}^{(1)}$ where c is selected from $\{0, 1, 2, 3\}$ to satisfy $N_c \le n_{CCE,i} < N_{c+1}$ and $N_c = \max\{0, \lfloor [N_{RB}^{DL} \cdot (N_{sc}^{RB} \cdot c - 4)]/36 \rfloor\}$, $n_{CCE,i}$ denotes the first CCE index used for transmission of the PDCCH corresponding to subframe $n-k_i$, and $N_{PUCCH}^{(1)}$ is configured by a higher layer.
   A resource for ant#1 is determined by $n_{PUCCH,i}^{(1,\tilde{p}=p_1)} = n_{PUCCH,i}^{(1,\tilde{p}=p_0)} + 1$.
   TDD channel selection when two cells are configured
   When M (DL bundling window size)=1
   Identical to FDD 2-bit A/N channel selection
   When M=2, SORTD is applied.
   Cross-carrier scheduling
   PUCCH resource #0 for ant#0: $n_{CCE,0,0}$ ($n_{CCE}$ of PCell PDCCH in the first subframe within the DL bundling window)
   PUCCH resource #1 for ant#0: $n_{CCE,0,1}$ ($n_{CCE}$ of PCell PDCCH in the second subframe within the DL bundling window)
   PUCCH resource #2 for ant#0: $n_{CCE,1,0}$ ($n_{CCE}$ of SCell PDCCH in the first subframe within the DL bundling window)
   PUCCH resource #3 for ant#0: $n_{CCE,1,1}$ ($n_{CCE}$ of SCell PDCCH in the second subframe within the DL bundling window)
   PUCCH resource #4 for ant#1: $n_{CCE,0,0}+1$
   PUCCH resource #5 for ant#1: $n_{CCE,0,1}+1$
   PUCCH resource #6 for ant#1: $n_{CCE,1,0}+1$ PUCCH resource #7 for ant#1: $n_{CCE,1,1}+1$ Non-cross-carrier scheduling PUCCH resource #0 for ant#0: $n_{CCE,0,0}$ ($n_{CCE}$ of PCell PDCCH in the first subframe within the DL bundling window)

PUCCH resource #1 for ant#0: $n_{CCE,0,1}$ ($n_{CCE}$ of PCell PDCCH in the second subframe within the DL bundling window)

PUCCH resource #2 for ant#0: from ARI (for SCell)

PUCCH resource #3 for ant#0: from ARI (for SCell)

PUCCH resource #4 for ant#1: $n_{CCE,0,0}+1$

PUCCH resource #5 for ant#1: $n_{CCE,0,1}+1$

PUCCH resource #6 for ant#1: from ARI or (PUCCH resource #2+1) (for SCell)

PUCCH resource #7 for ant#1: from ARI or (PUCCH resource #3+1) (for SCell)

When M=3, SORTD is applied.

Cross-carrier scheduling

PUCCH resource #0 for ant#0: $n_{CCE,0,0}$ ($n_{CCE}$ of PCell PDCCH with DAI=1)

PUCCH resource #1 for ant#0: $n_{CCE,0,1}$ ($n_{CCE}$ of PCell PDCCH with DAI=2)

PUCCH resource #2 for ant#0: $n_{CCE,1,0}$ ($n_{CCE}$ of SCell PDCCH with DAI=1)

PUCCH resource #3 for ant#0: $n_{CCE,1,1}$ ($n_{CCE}$ of SCell PDCCH with DAI=2)

PUCCH resource #4 for ant#1: $n_{CCE,0,0}+1$

PUCCH resource #5 for ant#1: $n_{CCE,0,1}+1$

PUCCH resource #6 for ant#1: $n_{CCE,1,0}+1$

PUCCH resource #7 for ant#1: $n_{CCE,1,1}+1$

Non-cross-carrier scheduling

PUCCH resource #0 for ant#0: $n_{CCE,0,0}$ ($n_{CCE}$ of PCell PDCCH with DAI=1)

PUCCH resource #1 for ant#0: $n_{CCE,0,1}$ ($n_{CCE}$ of PCell PDCCH with DAI=2)

PUCCH resource #2 for ant#0: from ARI (for SCell)

PUCCH resource #3 for ant#0: from ARI (for SCell)

PUCCH resource #4 for ant#1: $n_{CCE,0,0}+1$

PUCCH resource #5 for ant#1: $n_{CCE,0,1}+1$

PUCCH resource #6 for ant#1: from ARI or (PUCCH resource #2+1) (for SCell)

PUCCH resource #7 for ant#1: from ARI or (PUCCH resource #3+1) (for SCell)

On the assumption that two cells are configured and cross-carrier scheduling is used in FDD, 4 (orthogonal) resources for 4-bit A/N transmission can be given as follows.

n0: a resource is determined by the lowest CCE index of PDCCH corresponding to PCell PDSCH.

n1: a resource is determined by (the lowest CCE index of PDCCH corresponding to PCell PDSCH)+1.

n2: a resource is determined by the lowest CCE index of PDCCH corresponding to SCell PDSCH.

n3: a resource is determined by (the lowest CCE index of PDCCH corresponding to SCell PDSCH)+1.

When the UE fails to decode the SCell PDCCH although the BS has scheduled the two cells, the UE generates DTX for SCell ACK/NACK. In this case, a problem may be encountered when the transmit diversity (TxD) scheme of the present invention is applied since the UE cannot secure two resources (n2 and n3) derived from the CCE index of the SCell PDCCH.

To solve this problem, the present invention proposes the following.

According to the first scheme, the UE can transmit A/N using the conventional single antenna port scheme when the UE cannot be aware of resources that need to be secured while transmit diversity has been configured. For example, when transmit diversity is configured for the UE, the following cases can be considered if 4 resources need to be secured for 4-bit A/N transmission in the above-described FDD example (i.e. two cells are configured and cross-carrier scheduling is applied).

Case in which both the PCell PDCCH and SCell PDCCH are successfully detected

The UE transmits A/N using the TxD scheme since the UE can secure all 4 resources.

Case in which the PCell PDCCH is successfully detected whereas the SCell PDCCH is not detected The UE uses the single antenna port scheme since the UE can be aware of n0 and n1 but cannot recognize n2 and n3.

Case in which the PCell PDCCH is not detected whereas the SCell PDCCH is successfully detected The UE uses the single antenna port scheme since the UE can be aware of n2 and n3 but cannot recognize n0 and n1.

Case in which both the PCell PDCCH and SCell PDCCH are not detected

No transmission is performed since the UE cannot be aware of any resource.

When the present invention is applied as described above, it is possible to determine whether a specific cell corresponds to DTX according to receiver (e.g. BS) implementation method to perform PDCCH link adaptation (e.g. CCE aggregation level adjustment, PDCCH power control, etc.).

1) When the receiver always performs decoding on the assumption that 2Tx is performed A. A/N information can be acquired even when decoding is performed on this assumption since the mapping tables for channel selection, proposed by the present invention, have nested property.

2) When the receiver performs blind decoding for both 1 Tx and 2Tx

A. A/N information can be acquired. However, it is difficult to discriminate DTX from NACK as described below because DTX and NACK are interchangeably used in the mapping tables.

i. In the case of detection on the assumption that 1Tx is performed: the receiver can determine that DTX is generated for a specific cell for which NACK and NACK are fed back.

ii. In the case of detection on the assumption that 2Tx is performed: the receiver can determine that DTX is not generated for a specific cell for which NACK and NACK are fed back.

According to the second scheme, N resources can be pre-configured by a higher layer (e.g. RRC) in case the UE cannot detect a resource. Here, N may be the maximum value (or minimum value) from among the numbers of resources that need to be acquired by the two cells (PCell and SCell). For example, if the PCell is MIMO cell, the SCell is SIMO cell and 3-bit A/N including 2-bit A/N transmitted for the PCell and 1-bit A/N transmitted for the SCell needs to be transmitted, 3 resources (two for the PCell and one for the SCell) are needed. In this case, the number of resources additionally configured may be 2 when the maximum value rule is applied. In the case of 4-bit A/N, N may be 2 since 2 (orthogonal) resources need to be secured from each cell.

An (orthogonal) resource additionally configured by a higher layer can replace an unobtained resource in a mapping table for channel selection. For example, if 2 explicit RRC resources (e.g. $n^{(1)}_{PUCCH,4}$ and $n^{(1)}_{PUCCH,5}$) are configured and a PDCCH with respect to the SCell is missed, the UE can replace $n^{(1)}_{PUCCH,2}$ by $n^{(1)}_{PUCCH,4}$ and replace $n^{(1)}_{PUCCH,3}$ by $n^{(1)}_{PUCCH,5}$ in Table 19. Accordingly, spatial diversity gain can be obtained even if resources are not obtained because the PDCCH is missed. Furthermore, when signals are received through $n^{(1)}_{PUCCH,2}$ or $n^{(1)}_{PUCCH,3}$, the receiver can be aware that A/N information is NACK when the A/N information corresponds to (NACK, NACK). When signals are received through $n^{(1)}_{PUCCH,4}$ or $n^{(1)}_{PUCCH,5}$, the receiver can be aware that A/N information (NACK, NACK) corresponds to DTX for the corresponding cell.

Alternatively, when it is assumed that non-cross-carrier scheduling, FDD and 4-bit A/N are used, resources indicated by the TPC field in the SCell PDCCH from among resource sets configured by RRC are used as 2 resources for the SCell and thus the UE cannot obtain the resources if the UE misses the SCell PDCCH. Accordingly, the present scheme may be applied to obtain a gain even in the case of non-cross-carrier scheduling.

The TxD scheme proposed by the present invention can be further optimized in association with conventional resource allocation schemes. For example, a TxD mapping table can be designed using available resources considering PDCCH missing. In this case, a predefined mapping table can be used for antenna port #0 and an available resource can be mapped to antenna port #1 in consideration of PDCCH missing. For example, when 4-bit FDD A/N corresponds to (B, B, D, D) (B representing A or N except for DTX), resources Ch1 and Ch2 obtained from the PDCCH of the PCell are available whereas resources Ch3 and Ch4 obtained (implicitly or explicitly by ARI) from the PDCCH of the SCell are not available. In this case, Ch1 can be mapped to antenna port #0 and Ch2 can be mapped to antenna port #1 (similar to SORTD) according to the conventional 1Tx mapping scheme. In the case of (A, D, A, D), (A, D, D, A), (D, A, A, D) or (D, A, D, A), all resources Ch1, Ch2, Ch3 and Ch4 are available and thus mapping tables can be designed with an RS part and a data part separated from each other. Even in this case, transmit diversity gain can be obtained without codeword overlap since all codewords are discriminated.

While FDD mapping tables are described in the following for convenience, mapping tables described below can be used for TDD channel selection.

Table 27 shows application of the present invention to an FDD 4-bit A/N mapping table. In Table 27, unshaded portions (rows 0, 1, 2, 4, 5, 6, 8, 9 and 10) correspond to a case in which an RS and data can be separated from each other even if a PDCCH is missed during resource allocation and shaded portions (rows 3, 7 and 11 to 16) correspond to a case in which there is a problem in resource allocation when the PDCCH is missed. This example illustrates a case in which the RS and data are separately mapped to antenna port #1 in the unshaded portions and SORTD is applied to the shaded portions.

In this case, resource application can be performed as follows.

(Ch1=$n^{(1)}_{PUCCH,0}$, Ch2=$n^{(1)}_{PUCCH,1}$, Ch3=$n^{(1)}_{PUCCH,2}$ and Ch4=$n^{(1)}_{PUCCH,3}$).

In the case of cross-carrier scheduling
Ch1 and Ch2 inferred from the PCell are determined by $n_{CCE}$ and $n_{CCE}+1$ of the PDCCH (transmitted in the PCell) corresponding to the PCell PDSCH.
Ch3 and Ch4 inferred from the SCell are determined by $n_{CCE}$ and $n_{CCE}+1$ of the PDCCH (transmitted in the PCell) corresponding to the SCell PDSCH.

In the case of non-cross-carrier scheduling
Ch1 and Ch2 inferred from the PCell are determined by $n_{CCE}$ and $n_{CCE}+1$ of the PDCCH (transmitted in the PCell) corresponding to the PCell PDSCH.
Ch3 and Ch4 inferred from the SCell are determined by resource values indicated by ARI (TPC field) of the PDCCH (transmitted in the SCell) corresponding to the SCell PDSCH.

Table 27 shows FDD 4-bit mapping table according to the present invention, which corresponds to a case in which the PCell corresponds to a MIMO cell and the SCell corresponds to a SIMO cell.

TABLE 27

| | | | | Antenna port #0 (p = 0) | | | | Antenna port #1 (p = 1) | | | |
|---|---|---|---|---|---|---|---|---|---|---|---|
| | | | | | | RS | | | | RS | |
| HARQ-ACK(0) | HARQ-ACK(1) | HARQ-ACK(2) | HARQ-ACK(3) | $n_{PUCCH,i}^{(1)}$ | Modulation value | $n_{PUCCH,i}^{(1)}$ | Data b(0)b(1) | $n_{PUCCH,i}^{(1)}$ | Modulation value | $n_{PUCCH,i}^{(1)}$ | Data b(0)b(1) |
| 0 | A | A | A | A | $n_{PUCCH,1}^{(1)}$ | 1 + 0j | $n_{PUCCH,1}^{(1)}$ | 1, 1 | $n_{PUCCH,3}^{(1)}$ | 1 + 0j | $n_{PUCCH,2}^{(1)}$ | 1, 1 |
| 1 | A | N/D | A | A | $n_{PUCCH,2}^{(1)}$ | 1 + 0j | $n_{PUCCH,2}^{(1)}$ | 0, 1 | $n_{PUCCH,0}^{(1)}$ | 1 + 0j | $n_{PUCCH,1}^{(1)}$ | 0, 1 |
| 2 | N/D | A | A | A | $n_{PUCCH,1}^{(1)}$ | 1 + 0j | $n_{PUCCH,1}^{(1)}$ | 0, 1 | $n_{PUCCH,3}^{(1)}$ | 1 + 0j | $n_{PUCCH,2}^{(1)}$ | 0, 1 |
| 3 | N/D | N/D | A | A | $n_{PUCCH,3}^{(1)}$ | 1 + 0j | $n_{PUCCH,3}^{(1)}$ | 1, 1 | $n_{PUCCH,2}^{(1)}$ | 1 + 0j | $n_{PUCCH,2}^{(1)}$ | 1, 1 |
| 4 | A | A | A | N/D | $n_{PUCCH,1}^{(1)}$ | 1 + 0j | $n_{PUCCH,1}^{(1)}$ | 1, 0 | $n_{PUCCH,3}^{(1)}$ | 1 + 0j | $n_{PUCCH,2}^{(1)}$ | 1, 0 |
| 5 | A | N/D | A | N/D | $n_{PUCCH,2}^{(1)}$ | 1 + 0j | $n_{PUCCH,2}^{(1)}$ | 0, 0 | $n_{PUCCH,0}^{(1)}$ | 1 + 0j | $n_{PUCCH,1}^{(1)}$ | 0, 0 |
| 6 | N/D | A | A | N/D | $n_{PUCCH,1}^{(1)}$ | 1 + 0j | $n_{PUCCH,1}^{(1)}$ | 0, 0 | $n_{PUCCH,3}^{(1)}$ | 1 + 0j | $n_{PUCCH,2}^{(1)}$ | 0, 0 |
| 7 | N/D | N/D | A | N/D | $n_{PUCCH,3}^{(1)}$ | 1 + 0j | $n_{PUCCH,3}^{(1)}$ | 1, 0 | $n_{PUCCH,2}^{(1)}$ | 1 + 0j | $n_{PUCCH,2}^{(1)}$ | 1, 0 |
| 8 | A | A | N/D | A | $n_{PUCCH,2}^{(1)}$ | 1 + 0j | $n_{PUCCH,2}^{(1)}$ | 1, 1 | $n_{PUCCH,0}^{(1)}$ | 1 + 0j | $n_{PUCCH,1}^{(1)}$ | 1, 1 |
| 9 | A | N/D | N/D | A | $n_{PUCCH,2}^{(1)}$ | 1 + 0j | $n_{PUCCH,2}^{(1)}$ | 1, 0 | $n_{PUCCH,0}^{(1)}$ | 1 + 0j | $n_{PUCCH,1}^{(1)}$ | 1, 0 |
| 10 | N/D | A | N/D | A | $n_{PUCCH,3}^{(1)}$ | 1 + 0j | $n_{PUCCH,3}^{(1)}$ | 0, 1 | $n_{PUCCH,1}^{(1)}$ | 1 + 0j | $n_{PUCCH,0}^{(1)}$ | 0, 1 |
| 11 | N/D | N/D | N/D | A | $n_{PUCCH,3}^{(1)}$ | 1 + 0j | $n_{PUCCH,3}^{(1)}$ | 0, 0 | $n_{PUCCH,2}^{(1)}$ | 1 + 0j | $n_{PUCCH,2}^{(1)}$ | 0, 0 |
| 12 | A | A | N/D | N/D | $n_{PUCCH,0}^{(1)}$ | 1 + 0j | $n_{PUCCH,0}^{(1)}$ | 1, 1 | $n_{PUCCH,1}^{(1)}$ | 1 + 0j | $n_{PUCCH,1}^{(1)}$ | 1, 1 |
| 13 | A | N/D | N/D | N/D | $n_{PUCCH,0}^{(1)}$ | 1 + 0j | $n_{PUCCH,0}^{(1)}$ | 1, 0 | $n_{PUCCH,1}^{(1)}$ | 1 + 0j | $n_{PUCCH,1}^{(1)}$ | 1, 0 |
| 14 | N/D | A | N/D | N/D | $n_{PUCCH,0}^{(1)}$ | 1 + 0j | $n_{PUCCH,0}^{(1)}$ | 0, 1 | $n_{PUCCH,1}^{(1)}$ | 1 + 0j | $n_{PUCCH,1}^{(1)}$ | 0, 1 |
| 15 | N/D | N | N/D | N/D | $n_{PUCCH,0}^{(1)}$ | 1 + 0j | $n_{PUCCH,0}^{(1)}$ | 0, 0 | $n_{PUCCH,1}^{(1)}$ | 1 + 0j | $n_{PUCCH,1}^{(1)}$ | 0, 0 |
| 16 | N | N/D | N/D | N/D | $n_{PUCCH,0}^{(1)}$ | 1 + 0j | $n_{PUCCH,0}^{(1)}$ | 0, 0 | $n_{PUCCH,1}^{(1)}$ | 1 + 0j | $n_{PUCCH,1}^{(1)}$ | 0, 0 |
| 17 | D | D | N/D | N/D | | | | | No Transmission | | | |

Tables 28 and 29 show FDD 3-bit mapping tables according to the present invention. Table 28 shows a case in which the PCell corresponds to a MIMO cell and the SCell corresponds to a SIMO cell and Table 29 shows a case in which the PCell corresponds to a SIMO cell and the SCell corresponds to a MIMO cell. In Tables 28 and 29, unshaded portions (rows 0, 1 and 2) correspond to a case in which an RS and data can be separated from each other even if a PDCCH is missed during resource allocation and shaded portions (rows 3 to 9) correspond to a case in which there is a problem in resource allocation when the PDCCH is missed. This example illustrates a case in which the RS and data are separately mapped to antenna port #1 in the unshaded portions and SORTD is applied to the shaded portions. The same mapping table can be generated in the two cases.

For Tables 28 and 29, resource allocation can be performed as follows (Ch1=$n_{PUCCH,0}^{(1)}$, Ch2=$n_{PUCCH,1}^{(1)}$, Ch3=$n_{PUCCH,2}^{(1)}$ and Ch4=$n_{PUCCH,3}^{(1)}$). Underlined parts denote additionally allocated resources.

When the PCell corresponds to a MIMO cell and the SCell corresponds to a SIMO cell In the case of cross-carrier scheduling Ch1 and Ch2 inferred from the PCell are determined by $n_{CCE}$ and $n_{CCE}$+1 of the PDCCH (transmitted in the PCell) corresponding to the PCell PDSCH.

Ch3 and Ch4 inferred from the SCell are determined by $n_{CCE}$ and $n_{CCE}$+1 of the PDCCH (transmitted in the PCell) corresponding to the SCell PDSCH.

In the case of non-cross-carrier scheduling

Ch1 and Ch2 inferred from the PCell are determined by $n_{CCE}$ and $n_{CCE}$+1 of the PDCCH (transmitted in the PCell) corresponding to the PCell PDSCH.

Ch3 and Ch4 inferred from the SCell are determined by resource values indicated by ARI (TPC field) of the PDCCH (transmitted in the SCell) corresponding to the SCell PDSCH.

When the PCell corresponds to a SIMO cell and the SCell corresponds to a MIMO cell In the case of cross-carrier scheduling Ch3 and Ch4 inferred from the PCell are determined by $n_{CCE}$ and $n_{CCE}$+1 of the PDCCH (transmitted in the PCell) corresponding to the PCell PDSCH.

Ch1 and Ch2 inferred from the SCell are determined by $n_{CCE}$ and $n_{CCE}$+1 of the PDCCH (transmitted in the PCell) corresponding to the SCell PDSCH.

In the case of non-cross-carrier scheduling

Ch3 and Ch4 inferred from the PCell are determined by $n_{CCE}$ and $n_{CCE}$+1 of the PDCCH (transmitted in the PCell) corresponding to the PCell PDSCH.

Ch1 and Ch2 inferred from the SCell are determined by resource values indicated by ARI (TPC field) of the PDCCH (transmitted in the SCell) corresponding to the SCell PDSCH.

TABLE 28

| | HARQ-ACK(0) (PCell) | HARQ-ACK(1) (PCell) | HARQ-ACK(2) (SCell) | Antenna port #0 (p = 0) | | | | Antenna port #1 (p = 1) | | | |
|---|---|---|---|---|---|---|---|---|---|---|---|
| | | | | RS | | Data | | RS | | Data | |
| | | | | Modulation | | | | Modulation | | | |
| | | | | $n_{PUCCH,i}^{(1)}$ | value | $n_{PUCCH,i}^{(1)}$ | b(0)b(1) | $n_{PUCCH,i}^{(1)}$ | value | $n_{PUCCH,i}^{(1)}$ | b(0)b(1) |
| 0 | A | A | A | $n_{PUCCH,1}^{(1)}$ | 1 + 0j | $n_{PUCCH,1}^{(1)}$ | 1, 1 | $n_{PUCCH,3}^{(1)}$ | 1 + 0j | $n_{PUCCH,2}^{(1)}$ | 1, 1 |
| 1 | A | N/D | A | $n_{PUCCH,1}^{(1)}$ | 1 + 0j | $n_{PUCCH,1}^{(1)}$ | 1, 0 | $n_{PUCCH,3}^{(1)}$ | 1 + 0j | $n_{PUCCH,2}^{(1)}$ | 1, 0 |
| 2 | N/D | A | A | $n_{PUCCH,1}^{(1)}$ | 1 + 0j | $n_{PUCCH,1}^{(1)}$ | 0, 1 | $n_{PUCCH,3}^{(1)}$ | 1 + 0j | $n_{PUCCH,2}^{(1)}$ | 0, 1 |
| 3 | N/D | N/D | A | $n_{PUCCH,2}^{(1)}$ | 1 + 0j | $n_{PUCCH,2}^{(1)}$ | 1, 1 | $n_{PUCCH,3}^{(1)}$ | 1 + 0j | $n_{PUCCH,3}^{(1)}$ | 1, 1 |
| 4 | A | A | N/D | $n_{PUCCH,0}^{(1)}$ | 1 + 0j | $n_{PUCCH,0}^{(1)}$ | 1, 1 | $n_{PUCCH,1}^{(1)}$ | 1 + 0j | $n_{PUCCH,1}^{(1)}$ | 1, 1 |
| 5 | A | N/D | N/D | $n_{PUCCH,0}^{(1)}$ | 1 + 0j | $n_{PUCCH,0}^{(1)}$ | 1, 0 | $n_{PUCCH,1}^{(1)}$ | 1 + 0j | $n_{PUCCH,1}^{(1)}$ | 1, 0 |
| 6 | N/D | A | N/D | $n_{PUCCH,0}^{(1)}$ | 1 + 0j | $n_{PUCCH,0}^{(1)}$ | 0, 1 | $n_{PUCCH,1}^{(1)}$ | 1 + 0j | $n_{PUCCH,1}^{(1)}$ | 0, 1 |
| 7 | N/D | N/D | NACK | $n_{PUCCH,2}^{(1)}$ | 1 + 0j | $n_{PUCCH,2}^{(1)}$ | 0, 0 | $n_{PUCCH,3}^{(1)}$ | 1 + 0j | $n_{PUCCH,3}^{(1)}$ | 0, 0 |
| 8 | NACK | N/D | DTX | $n_{PUCCH,0}^{(1)}$ | 1 + 0j | $n_{PUCCH,0}^{(1)}$ | 0, 0 | $n_{PUCCH,1}^{(1)}$ | 1 + 0j | $n_{PUCCH,1}^{(1)}$ | 0, 0 |
| 9 | N/D | N | DTX | $n_{PUCCH,0}^{(1)}$ | 1 + 0j | $n_{PUCCH,0}^{(1)}$ | 0, 0 | $n_{PUCCH,1}^{(1)}$ | 1 + 0j | $n_{PUCCH,1}^{(1)}$ | 0, 0 |
| 10 | D | D | D | | | | | No Transmission | | | |

TABLE 29

| | HARQ-ACK(0) (PCell) | HARQ-ACK(1) (PCell) | HARQ-ACK(2) (SCell) | Antenna port #0 (p = 0) | | | | Antenna port #1 (p = 1) | | | |
|---|---|---|---|---|---|---|---|---|---|---|---|
| | | | | RS | | Data | | RS | | Data | |
| | | | | Modulation | | | | Modulation | | | |
| | | | | $n_{PUCCH,i}^{(1)}$ | value | $n_{PUCCH,i}^{(1)}$ | b(0)b(1) | $n_{PUCCH,i}^{(1)}$ | value | $n_{PUCCH,i}^{(1)}$ | b(0)b(1) |
| 0 | A | A | A | $n_{PUCCH,1}^{(1)}$ | 1 + 0j | $n_{PUCCH,1}^{(1)}$ | 1, 1 | $n_{PUCCH,3}^{(1)}$ | 1 + 0j | $n_{PUCCH,2}^{(1)}$ | 1, 1 |
| 1 | A | N/D | A | $n_{PUCCH,1}^{(1)}$ | 1 + 0j | $n_{PUCCH,1}^{(1)}$ | 1, 0 | $n_{PUCCH,3}^{(1)}$ | 1 + 0j | $n_{PUCCH,2}^{(1)}$ | 1, 0 |
| 2 | N/D | A | A | $n_{PUCCH,1}^{(1)}$ | 1 + 0j | $n_{PUCCH,1}^{(1)}$ | 0, 1 | $n_{PUCCH,3}^{(1)}$ | 1 + 0j | $n_{PUCCH,2}^{(1)}$ | 0, 1 |
| 3 | N/D | N/D | A | $n_{PUCCH,2}^{(1)}$ | 1 + 0j | $n_{PUCCH,2}^{(1)}$ | 1, 1 | $n_{PUCCH,3}^{(1)}$ | 1 + 0j | $n_{PUCCH,3}^{(1)}$ | 1, 1 |
| 4 | A | A | N/D | $n_{PUCCH,0}^{(1)}$ | 1 + 0j | $n_{PUCCH,0}^{(1)}$ | 1, 1 | $n_{PUCCH,1}^{(1)}$ | 1 + 0j | $n_{PUCCH,1}^{(1)}$ | 1, 1 |
| 5 | A | N/D | N/D | $n_{PUCCH,0}^{(1)}$ | 1 + 0j | $n_{PUCCH,0}^{(1)}$ | 1, 0 | $n_{PUCCH,1}^{(1)}$ | 1 + 0j | $n_{PUCCH,1}^{(1)}$ | 1, 0 |
| 6 | N/D | A | N/D | $n_{PUCCH,0}^{(1)}$ | 1 + 0j | $n_{PUCCH,0}^{(1)}$ | 0, 1 | $n_{PUCCH,1}^{(1)}$ | 1 + 0j | $n_{PUCCH,1}^{(1)}$ | 0, 1 |
| 7 | N/D | N/D | N | $n_{PUCCH,2}^{(1)}$ | 1 + 0j | $n_{PUCCH,2}^{(1)}$ | 0, 0 | $n_{PUCCH,1}^{(1)}$ | 1 + 0j | $n_{PUCCH,3}^{(1)}$ | 0, 0 |
| 8 | N | N/D | D | $n_{PUCCH,0}^{(1)}$ | 1 + 0j | $n_{PUCCH,0}^{(1)}$ | 0, 0 | $n_{PUCCH,1}^{(1)}$ | 1 + 0j | $n_{PUCCH,1}^{(1)}$ | 0, 0 |
| 9 | N/D | N | D | $n_{PUCCH,0}^{(1)}$ | 1 + 0j | $n_{PUCCH,0}^{(1)}$ | 0, 0 | $n_{PUCCH,1}^{(1)}$ | 1 + 0j | $n_{PUCCH,1}^{(1)}$ | 0, 0 |
| 10 | D | D | D | | | | | No Transmission | | | |

Alternatively, the present invention proposes use of a different transmit diversity scheme for rows having a resource allocation problem. The following cases can be considered.

SORTD is used (FIG. 11 and Tables 27, 28 and 29)

SCBC is used (FIG. 14 and Tables 30, 31 and 32)→Resource allocation can be performed in the same manner as illustrated with reference to Tables 27, 28 and 29.

The single antenna port scheme is used (e.g. PVS (precoding vector switching), CDD (cyclic delay diversity), antenna selection, etc.) (Tables 33, 34 and 35)→Resource allocation can be performed in the same manner as illustrated with reference to Tables 27, 28 and 29.

Table 30 shows an FDD 4-bit A/N mapping table according to the present invention (PCell MIMO, SCell MIMO). SCBC is applicable to shaded portions having a resource allocation problem.

TABLE 30

| | HARQ-ACK(0) | HARQ-ACK(1) | HARQ-ACK(2) | HARQ-ACK(3) | Antenna port #0 (p = 0) | | | | | Antenna port #1 (p = 1) | | | | |
|---|---|---|---|---|---|---|---|---|---|---|---|---|---|---|
| | | | | | RS | | Data | | | RS | | Data | | |
| | | | | | $n_{PUCCH,i}^{(1)}$ | Modulation value | $n_{PUCCH,i}^{(1)}$ | b(0)b(1) | | $n_{PUCCH,i}^{(1)}$ | Modulation value | $n_{PUCCH,i}^{(1)}$ | b(0)b(1) | |
| 0 | A | A | A | A | $n_{PUCCH,1}^{(1)}$ | 1 + 0j | $n_{PUCCH,1}^{(1)}$ | 1, 1 | | $n_{PUCCH,3}^{(1)}$ | 1 + 0j | $n_{PUCCH,2}^{(1)}$ | 1, 1 | |
| 1 | A | N/D | A | A | $n_{PUCCH,2}^{(1)}$ | 1 + 0j | $n_{PUCCH,2}^{(1)}$ | 0, 1 | | $n_{PUCCH,0}^{(1)}$ | 1 + 0j | $n_{PUCCH,1}^{(1)}$ | 0, 1 | |
| 2 | N/D | A | A | A | $n_{PUCCH,1}^{(1)}$ | 1 + 0j | $n_{PUCCH,1}^{(1)}$ | 0, 1 | | $n_{PUCCH,3}^{(1)}$ | 1 + 0j | $n_{PUCCH,2}^{(1)}$ | 0, 1 | |
| 3 | N/D | N/D | A | A | $n_{PUCCH,2}^{(1)}$ | 1 + 0j | $n_{PUCCH,3}^{(1)}$ | 1, 1 | | $n_{PUCCH,3}^{(1)}$ | 1 + 0j | $n_{PUCCH,2}^{(1)}$ | 0, 0 | |
| 4 | A | A | A | N/D | $n_{PUCCH,1}^{(1)}$ | 1 + 0j | $n_{PUCCH,1}^{(1)}$ | 1, 0 | | $n_{PUCCH,3}^{(1)}$ | 1 + 0j | $n_{PUCCH,2}^{(1)}$ | 1, 0 | |
| 5 | A | N/D | A | N/D | $n_{PUCCH,2}^{(1)}$ | 1 + 0j | $n_{PUCCH,2}^{(1)}$ | 1, 0 | | $n_{PUCCH,0}^{(1)}$ | 1 + 0j | $n_{PUCCH,1}^{(1)}$ | 0, 0 | |
| 6 | N/D | A | A | N/D | $n_{PUCCH,1}^{(1)}$ | 1 + 0j | $n_{PUCCH,1}^{(1)}$ | 0, 0 | | $n_{PUCCH,3}^{(1)}$ | 1 + 0j | $n_{PUCCH,2}^{(1)}$ | 0, 0 | |
| 7 | N/D | N/D | A | N/D | $n_{PUCCH,2}^{(1)}$ | 1 + 0j | $n_{PUCCH,3}^{(1)}$ | 1, 0 | | $n_{PUCCH,3}^{(1)}$ | 1 + 0j | $n_{PUCCH,2}^{(1)}$ | 1, 0 | |
| 8 | A | A | N/D | A | $n_{PUCCH,2}^{(1)}$ | 1 + 0j | $n_{PUCCH,2}^{(1)}$ | 1, 1 | | $n_{PUCCH,0}^{(1)}$ | 1 + 0j | $n_{PUCCH,1}^{(1)}$ | 1, 1 | |
| 9 | A | N/D | N/D | A | $n_{PUCCH,2}^{(1)}$ | 1 + 0j | $n_{PUCCH,2}^{(1)}$ | 1, 0 | | $n_{PUCCH,0}^{(1)}$ | 1 + 0j | $n_{PUCCH,1}^{(1)}$ | 1, 0 | |
| 10 | N/D | A | N/D | A | $n_{PUCCH,3}^{(1)}$ | 1 + 0j | $n_{PUCCH,3}^{(1)}$ | 0, 1 | | $n_{PUCCH,1}^{(1)}$ | 1 + 0j | $n_{PUCCH,0}^{(1)}$ | 0, 1 | |
| 11 | N/D | N/D | N/D | A | $n_{PUCCH,2}^{(1)}$ | 1 + 0j | $n_{PUCCH,3}^{(1)}$ | 0, 0 | | $n_{PUCCH,3}^{(1)}$ | 1 + 0j | $n_{PUCCH,2}^{(1)}$ | 1, 1 | |
| 12 | A | A | N/D | N/D | $n_{PUCCH,0}^{(1)}$ | 1 + 0j | $n_{PUCCH,0}^{(1)}$ | 1, 1 | | $n_{PUCCH,1}^{(1)}$ | 1 + 0j | $n_{PUCCH,1}^{(1)}$ | 1, 1 | |
| 13 | A | N/D | N/D | N/D | $n_{PUCCH,0}^{(1)}$ | 1 + 0j | $n_{PUCCH,0}^{(1)}$ | 1, 0 | | $n_{PUCCH,1}^{(1)}$ | 1 + 0j | $n_{PUCCH,1}^{(1)}$ | 0, 1 | |
| 14 | N/D | A | N/D | N/D | $n_{PUCCH,0}^{(1)}$ | 1 + 0j | $n_{PUCCH,0}^{(1)}$ | 0, 1 | | $n_{PUCCH,1}^{(1)}$ | 1 + 0j | $n_{PUCCH,1}^{(1)}$ | 1, 0 | |
| 15 | N/D | N | N/D | N/D | $n_{PUCCH,0}^{(1)}$ | 1 + 0j | $n_{PUCCH,0}^{(1)}$ | 0, 0 | | $n_{PUCCH,1}^{(1)}$ | 1 + 0j | $n_{PUCCH,1}^{(1)}$ | 0, 0 | |
| 16 | N | N/D | N/D | N/D | $n_{PUCCH,0}^{(1)}$ | 1 + 0j | $n_{PUCCH,0}^{(1)}$ | 0, 0 | | $n_{PUCCH,1}^{(1)}$ | 1 + 0j | $n_{PUCCH,1}^{(1)}$ | 0, 0 | |
| 17 | D | D | N/D | N/D | | | | No Transmission | | | | | | |

Table 31 shows an FDD 3-bit A/N mapping table according to the present invention (PCell MIMO, SCell SIMO). SCBC is applicable to shaded portions having a resource allocation problem.

TABLE 31

| | HARQ-ACK(0) (PCell) | HARQ-ACK(1) (PCell) | HARQ-ACK(2) (SCell) | Antenna port #0 (p = 0) | | | | | Antenna port #1 (p = 1) | | | | |
|---|---|---|---|---|---|---|---|---|---|---|---|---|---|
| | | | | RS | | Data | | | RS | | Data | | |
| | | | | $n_{PUCCH,i}^{(1)}$ | Modulation value | $n_{PUCCH,i}^{(1)}$ | b(0)b(1) | | $n_{PUCCH,i}^{(1)}$ | Modulation value | $n_{PUCCH,i}^{(1)}$ | b(0)b(1) | |
| 0 | A | A | A | $n_{PUCCH,1}^{(1)}$ | 1 + 0j | $n_{PUCCH,1}^{(1)}$ | 1, 1 | | $n_{PUCCH,3}^{(1)}$ | 1 + 0j | $n_{PUCCH,2}^{(1)}$ | 1, 1 | |
| 1 | A | N/D | A | $n_{PUCCH,1}^{(1)}$ | 1 + 0j | $n_{PUCCH,1}^{(1)}$ | 1, 0 | | $n_{PUCCH,3}^{(1)}$ | 1 + 0j | $n_{PUCCH,2}^{(1)}$ | 1, 0 | |
| 2 | N/D | A | A | $n_{PUCCH,1}^{(1)}$ | 1 + 0j | $n_{PUCCH,1}^{(1)}$ | 0, 1 | | $n_{PUCCH,3}^{(1)}$ | 1 + 0j | $n_{PUCCH,2}^{(1)}$ | 0, 1 | |
| 3 | N/D | N/D | A | $n_{PUCCH,2}^{(1)}$ | 1 + 0j | $n_{PUCCH,2}^{(1)}$ | 1, 1 | | $n_{PUCCH,3}^{(1)}$ | 1 + 0j | $n_{PUCCH,3}^{(1)}$ | 1, 1 | |
| 4 | A | A | N/D | $n_{PUCCH,0}^{(1)}$ | 1 + 0j | $n_{PUCCH,0}^{(1)}$ | 1, 1 | | $n_{PUCCH,1}^{(1)}$ | 1 + 0j | $n_{PUCCH,3}^{(1)}$ | 1, 1 | |
| 5 | A | N/D | N/D | $n_{PUCCH,0}^{(1)}$ | 1 + 0j | $n_{PUCCH,0}^{(1)}$ | 1, 0 | | $n_{PUCCH,1}^{(1)}$ | 1 + 0j | $n_{PUCCH,3}^{(1)}$ | 0, 1 | |
| 6 | N/D | A | N/D | $n_{PUCCH,0}^{(1)}$ | 1 + 0j | $n_{PUCCH,0}^{(1)}$ | 0, 1 | | $n_{PUCCH,1}^{(1)}$ | 1 + 0j | $n_{PUCCH,1}^{(1)}$ | 1, 0 | |
| 7 | N/D | N/D | N | $n_{PUCCH,2}^{(1)}$ | 1 + 0j | $n_{PUCCH,2}^{(1)}$ | 0, 0 | | $n_{PUCCH,3}^{(1)}$ | 1 + 0j | $n_{PUCCH,3}^{(1)}$ | 0, 0 | |
| 8 | N | N/D | D | $n_{PUCCH,0}^{(1)}$ | 1 + 0j | $n_{PUCCH,0}^{(1)}$ | 0, 0 | | $n_{PUCCH,1}^{(1)}$ | 1 + 0j | $n_{PUCCH,1}^{(1)}$ | 0, 0 | |
| 9 | N/D | N | D | $n_{PUCCH,0}^{(1)}$ | 1 + 0j | $n_{PUCCH,0}^{(1)}$ | 0, 0 | | $n_{PUCCH,1}^{(1)}$ | 1 + 0j | $n_{PUCCH,1}^{(1)}$ | 0, 0 | |
| 10 | D | D | D | | | | No Transmission | | | | | | |

Table 32 shows an FDD 3-bit A/N mapping table according to the present invention (PCell SIMO, SCell MIMO). SCBC is applicable to shaded portions having a resource allocation problem.

TABLE 32

| | | | | Antenna port #0 (p = 0) | | | | Antenna port #1 (p = 1) | | | |
|---|---|---|---|---|---|---|---|---|---|---|---|
| | HARQ-ACK(0) (SCell) | HARQ-ACK(1) (SCell) | HARQ-ACK(2) (PCell) | RS $n_{PUCCH,i}^{(1)}$ | Modulation value | Data $n_{PUCCH,i}^{(1)}$ | b(0)b(1) | RS $n_{PUCCH,i}^{(1)}$ | Modulation value | Data $n_{PUCCH,i}^{(1)}$ | b(0)b(1) |
| 0 | A | A | A | $n_{PUCCH,1}^{(1)}$ | 1 + 0j | $n_{PUCCH,1}^{(1)}$ | 1, 1 | $n_{PUCCH,3}^{(1)}$ | 1 + 0j | $n_{PUCCH,2}^{(1)}$ | 1, 1 |
| 1 | A | N/D | A | $n_{PUCCH,1}^{(1)}$ | 1 + 0j | $n_{PUCCH,1}^{(1)}$ | 1, 0 | $n_{PUCCH,3}^{(1)}$ | 1 + 0j | $n_{PUCCH,2}^{(1)}$ | 1, 0 |
| 2 | N/D | A | A | $n_{PUCCH,1}^{(1)}$ | 1 + 0j | $n_{PUCCH,1}^{(1)}$ | 0, 1 | $n_{PUCCH,3}^{(1)}$ | 1 + 0j | $n_{PUCCH,2}^{(1)}$ | 0, 1 |
| 3 | N/D | N/D | A | $n_{PUCCH,2}^{(1)}$ | 1 + 0j | $n_{PUCCH,2}^{(1)}$ | 1, 1 | $n_{PUCCH,3}^{(1)}$ | 1 + 0j | $n_{PUCCH,3}^{(1)}$ | 1, 1 |
| 4 | A | A | N/D | $n_{PUCCH,0}^{(1)}$ | 1 + 0j | $n_{PUCCH,0}^{(1)}$ | 1, 1 | $n_{PUCCH,1}^{(1)}$ | 1 + 0j | $n_{PUCCH,3}^{(1)}$ | 1, 1 |
| 5 | A | N/D | N/D | $n_{PUCCH,0}^{(1)}$ | 1 + 0j | $n_{PUCCH,0}^{(1)}$ | 1, 0 | $n_{PUCCH,1}^{(1)}$ | 1 + 0j | $n_{PUCCH,1}^{(1)}$ | 1, 0 |
| 6 | N/D | A | N/D | $n_{PUCCH,0}^{(1)}$ | 1 + 0j | $n_{PUCCH,0}^{(1)}$ | 0, 1 | $n_{PUCCH,1}^{(1)}$ | 1 + 0j | $n_{PUCCH,1}^{(1)}$ | 0, 1 |
| 7 | N/D | N/D | N | $n_{PUCCH,2}^{(1)}$ | 1 + 0j | $n_{PUCCH,2}^{(1)}$ | 0, 0 | $n_{PUCCH,3}^{(1)}$ | 1 + 0j | $n_{PUCCH,3}^{(1)}$ | 0, 0 |
| 8 | N | N/D | D | $n_{PUCCH,0}^{(1)}$ | 1 + 0j | $n_{PUCCH,0}^{(1)}$ | 0, 0 | $n_{PUCCH,1}^{(1)}$ | 1 + 0j | $n_{PUCCH,1}^{(1)}$ | 0, 0 |
| 9 | N/D | N | D | $n_{PUCCH,0}^{(1)}$ | 1 + 0j | $n_{PUCCH,0}^{(1)}$ | 0, 0 | $n_{PUCCH,1}^{(1)}$ | 1 + 0j | $n_{PUCCH,1}^{(1)}$ | 0, 0 |
| 10 | D | D | D | | | No Transmission | | | | | |

Table 33 shows an FDD 4-bit A/N mapping table according to the present invention (PCell MIMO, SCell MIMO). The single antenna port scheme (e.g. PVS, CDD, antenna selection, etc.) is applicable to shaded portions having a resource allocation problem. For convenience, Table 33 shows a case in which antenna ports #0 and #1 transmit the same b(0)b(1) through the same resource when there is a problem in resource allocation.

TABLE 33

| | | | | | Antenna port #0 (p = 0) | | | | Antenna port #1 (p = 1) | | | |
|---|---|---|---|---|---|---|---|---|---|---|---|---|
| | HARQ-ACK(0) | HARQ-ACK(1) | HARQ-ACK(2) | HARQ-ACK(2) | RS $n_{PUCCH,i}^{(1)}$ | Modulation value | Data $n_{PUCCH,i}^{(1)}$ | b(0)b(1) | RS $n_{PUCCH,i}^{(1)}$ | Modulation value | Data $n_{PUCCH,i}^{(1)}$ | b(0)b(1) |
| 0 | A | A | A | A | $n_{PUCCH,1}^{(1)}$ | 1 + 0j | $n_{PUCCH,1}^{(1)}$ | 1, 1 | $n_{PUCCH,3}^{(1)}$ | 1 + 0j | $n_{PUCCH,2}^{(1)}$ | 1, 1 |
| 1 | A | N/D | A | A | $n_{PUCCH,2}^{(1)}$ | 1 + 0j | $n_{PUCCH,2}^{(1)}$ | 0, 1 | $n_{PUCCH,0}^{(1)}$ | 1 + 0j | $n_{PUCCH,1}^{(1)}$ | 0, 1 |
| 2 | N/D | A | A | A | $n_{PUCCH,1}^{(1)}$ | 1 + 0j | $n_{PUCCH,1}^{(1)}$ | 0, 1 | $n_{PUCCH,3}^{(1)}$ | 1 + 0j | $n_{PUCCH,2}^{(1)}$ | 0, 1 |
| 3 | N/D | N/D | A | A | $n_{PUCCH,3}^{(1)}$ | 1 + 0j | $n_{PUCCH,3}^{(1)}$ | 1, 1 | $n_{PUCCH,3}^{(1)}$ | 1 + 0j | $n_{PUCCH,3}^{(1)}$ | 1, 1 |
| 4 | A | A | A | N/D | $n_{PUCCH,1}^{(1)}$ | 1 + 0j | $n_{PUCCH,1}^{(1)}$ | 1, 0 | $n_{PUCCH,3}^{(1)}$ | 1 + 0j | $n_{PUCCH,2}^{(1)}$ | 1, 0 |
| 5 | A | N/D | A | N/D | $n_{PUCCH,2}^{(1)}$ | 1 + 0j | $n_{PUCCH,2}^{(1)}$ | 0, 0 | $n_{PUCCH,0}^{(1)}$ | 1 + 0j | $n_{PUCCH,1}^{(1)}$ | 0, 0 |
| 6 | N/D | A | A | N/D | $n_{PUCCH,1}^{(1)}$ | 1 + 0j | $n_{PUCCH,1}^{(1)}$ | 0, 0 | $n_{PUCCH,3}^{(1)}$ | 1 + 0j | $n_{PUCCH,2}^{(1)}$ | 0, 0 |
| 7 | N/D | N/D | A | N/D | $n_{PUCCH,3}^{(1)}$ | 1 + 0j | $n_{PUCCH,3}^{(1)}$ | 1, 0 | $n_{PUCCH,3}^{(1)}$ | 1 + 0j | $n_{PUCCH,3}^{(1)}$ | 1, 0 |
| 8 | A | A | N/D | A | $n_{PUCCH,2}^{(1)}$ | 1 + 0j | $n_{PUCCH,2}^{(1)}$ | 0, 0 | $n_{PUCCH,0}^{(1)}$ | 1 + 0j | $n_{PUCCH,1}^{(1)}$ | 1, 1 |
| 9 | A | N/D | N/D | A | $n_{PUCCH,2}^{(1)}$ | 1 + 0j | $n_{PUCCH,2}^{(1)}$ | 1, 1 | $n_{PUCCH,0}^{(1)}$ | 1 + 0j | $n_{PUCCH,1}^{(1)}$ | 1, 0 |
| 10 | N/D | A | N/D | A | $n_{PUCCH,3}^{(1)}$ | 1 + 0j | $n_{PUCCH,3}^{(1)}$ | 0, 1 | $n_{PUCCH,1}^{(1)}$ | 1 + 0j | $n_{PUCCH,0}^{(1)}$ | 0, 1 |
| 11 | N/D | N/D | N/D | A | $n_{PUCCH,3}^{(1)}$ | 1 + 0j | $n_{PUCCH,3}^{(1)}$ | 0, 0 | $n_{PUCCH,3}^{(1)}$ | 1 + 0j | $n_{PUCCH,3}^{(1)}$ | 0, 0 |
| 12 | A | A | N/D | N/D | $n_{PUCCH,0}^{(1)}$ | 1 + 0j | $n_{PUCCH,0}^{(1)}$ | 1, 1 | $n_{PUCCH,0}^{(1)}$ | 1 + 0j | $n_{PUCCH,0}^{(1)}$ | 1, 1 |
| 13 | A | N/D | N/D | N/D | $n_{PUCCH,0}^{(1)}$ | 1 + 0j | $n_{PUCCH,0}^{(1)}$ | 1, 0 | $n_{PUCCH,0}^{(1)}$ | 1 + 0j | $n_{PUCCH,0}^{(1)}$ | 1, 0 |
| 14 | N/D | A | N/D | N/D | $n_{PUCCH,0}^{(1)}$ | 1 + 0j | $n_{PUCCH,0}^{(1)}$ | 0, 1 | $n_{PUCCH,0}^{(1)}$ | 1 + 0j | $n_{PUCCH,0}^{(1)}$ | 0, 1 |
| 15 | N/D | N | N/D | N/D | $n_{PUCCH,0}^{(1)}$ | 1 + 0j | $n_{PUCCH,0}^{(1)}$ | 0, 0 | $n_{PUCCH,0}^{(1)}$ | 1 + 0j | $n_{PUCCH,0}^{(1)}$ | 0, 0 |
| 16 | N | N/D | N/D | N/D | $n_{PUCCH,0}^{(1)}$ | 1 + 0j | $n_{PUCCH,0}^{(1)}$ | 0, 0 | $n_{PUCCH,0}^{(1)}$ | 1 + 0j | $n_{PUCCH,0}^{(1)}$ | 0, 0 |
| 17 | D | D | N/D | N/D | | | No Transmission | | | | | |

Table 34 shows an FDD 3-bit A/N mapping table according to the present invention (PCell MIMO, SCell SIMO). The single antenna port scheme (e.g. PVS, CDD, antenna selection, etc.) is applicable to shaded portions having a resource allocation problem. For convenience, Table 34 shows a case in which antenna ports #0 and #1 transmit the same b(0)b(1) through the same resource when there is a problem in resource allocation.

TABLE 34

| | HARQ-ACK(0) (PCell) | HARQ-ACK(1) (PCell) | HARQ-ACK(2) (SCell) | Antenna port #0 (p = 0) | | | | Antenna port #1 (p = 1) | | | |
|---|---|---|---|---|---|---|---|---|---|---|---|
| | | | | RS | | Data | | RS | | Data | |
| | | | | $n_{PUCCH,i}^{(1)}$ | Modulation value | $n_{PUCCH,i}^{(1)}$ | b(0)b(1) | $n_{PUCCH,i}^{(1)}$ | Modulation value | $n_{PUCCH,i}^{(1)}$ | b(0)b(1) |
| 0 | A | A | A | $n_{PUCCH,1}^{(1)}$ | 1 + 0j | $n_{PUCCH,1}^{(1)}$ | 1, 1 | $n_{PUCCH,3}^{(1)}$ | 1 + 0j | $n_{PUCCH,2}^{(1)}$ | 1, 1 |
| 1 | A | N/D | A | $n_{PUCCH,1}^{(1)}$ | 1 + 0j | $n_{PUCCH,1}^{(1)}$ | 1, 0 | $n_{PUCCH,3}^{(1)}$ | 1 + 0j | $n_{PUCCH,2}^{(1)}$ | 1, 0 |
| 2 | N/D | A | A | $n_{PUCCH,1}^{(1)}$ | 1 + 0j | $n_{PUCCH,1}^{(1)}$ | 0, 1 | $n_{PUCCH,3}^{(1)}$ | 1 + 0j | $n_{PUCCH,2}^{(1)}$ | 0, 1 |
| 3 | N/D | N/D | A | $n_{PUCCH,2}^{(1)}$ | 1 + 0j | $n_{PUCCH,2}^{(1)}$ | 1, 1 | $n_{PUCCH,3}^{(1)}$ | 1 + 0j | $n_{PUCCH,3}^{(1)}$ | 1, 1 |
| 4 | A | A | N/D | $n_{PUCCH,0}^{(1)}$ | 1 + 0j | $n_{PUCCH,0}^{(1)}$ | 1, 1 | $n_{PUCCH,1}^{(1)}$ | 1 + 0j | $n_{PUCCH,1}^{(1)}$ | 1, 1 |
| 5 | A | N/D | N/D | $n_{PUCCH,0}^{(1)}$ | 1 + 0j | $n_{PUCCH,0}^{(1)}$ | 1, 0 | $n_{PUCCH,1}^{(1)}$ | 1 + 0j | $n_{PUCCH,1}^{(1)}$ | 1, 0 |
| 6 | N/D | A | N/D | $n_{PUCCH,0}^{(1)}$ | 1 + 0j | $n_{PUCCH,0}^{(1)}$ | 0, 1 | $n_{PUCCH,1}^{(1)}$ | 1 + 0j | $n_{PUCCH,1}^{(1)}$ | 0, 1 |
| 7 | N/D | N/D | N | $n_{PUCCH,2}^{(1)}$ | 1 + 0j | $n_{PUCCH,2}^{(1)}$ | 0, 0 | $n_{PUCCH,3}^{(1)}$ | 1 + 0j | $n_{PUCCH,3}^{(1)}$ | 0, 0 |
| 8 | N | N/D | D | $n_{PUCCH,0}^{(1)}$ | 1 + 0j | $n_{PUCCH,0}^{(1)}$ | 0, 0 | $n_{PUCCH,1}^{(1)}$ | 1 + 0j | $n_{PUCCH,1}^{(1)}$ | 0, 0 |
| 9 | N/D | N | D | $n_{PUCCH,0}^{(1)}$ | 1 + 0j | $n_{PUCCH,0}^{(1)}$ | 0, 0 | $n_{PUCCH,1}^{(1)}$ | 1 + 0j | $n_{PUCCH,1}^{(1)}$ | 0, 0 |
| 10 | D | D | D | | | No Transmission | | | | | |

Table 35 shows an FDD 3-bit A/N mapping table according to the present invention (PCell SIMO, SCell MIMO). The single antenna port scheme (e.g. PVS, CDD, antenna selection, etc.) is applicable to shaded portions having a resource allocation problem. For convenience, Table 35 shows a case in which antenna ports #0 and #1 transmit the same b(0)b(1) through the same resource when there is a problem in resource allocation.

TABLE 35

| | HARQ-ACK(0) (SCell) | HARQ-ACK(1) (SCell) | HARQ-ACK(2) (PCell) | Antenna port #0 (p = 0) | | | | Antenna port #1 (p = 1) | | | |
|---|---|---|---|---|---|---|---|---|---|---|---|
| | | | | RS | | Data | | RS | | Data | |
| | | | | $n_{PUCCH,i}^{(1)}$ | Modulation vlaue | $n_{PUCCH,i}^{(1)}$ | b(0)b(1) | $n_{PUCCH,i}^{(1)}$ | Modulation value | $n_{PUCCH,i}^{(1)}$ | b(0)b(1) |
| 0 | A | A | A | $n_{PUCCH,1}^{(1)}$ | 1 + 0j | $n_{PUCCH,1}^{(1)}$ | 1, 1 | $n_{PUCCH,3}^{(1)}$ | 1 + 0j | $n_{PUCCH,2}^{(1)}$ | 1, 1 |
| 1 | A | N/D | A | $n_{PUCCH,1}^{(1)}$ | 1 + 0j | $n_{PUCCH,1}^{(1)}$ | 1, 0 | $n_{PUCCH,3}^{(1)}$ | 1 + 0j | $n_{PUCCH,2}^{(1)}$ | 1, 0 |
| 2 | N/D | A | A | $n_{PUCCH,1}^{(1)}$ | 1 + 0j | $n_{PUCCH,1}^{(1)}$ | 0, 1 | $n_{PUCCH,3}^{(1)}$ | 1 + 0j | $n_{PUCCH,2}^{(1)}$ | 0, 1 |
| 3 | N/D | N/D | A | $n_{PUCCH,2}^{(1)}$ | 1 + 0j | $n_{PUCCH,2}^{(1)}$ | 1, 1 | $n_{PUCCH,3}^{(1)}$ | 1 + 0j | $n_{PUCCH,3}^{(1)}$ | 1, 1 |
| 4 | A | A | N/D | $n_{PUCCH,0}^{(1)}$ | 1 + 0j | $n_{PUCCH,0}^{(1)}$ | 1, 1 | $n_{PUCCH,1}^{(1)}$ | 1 + 0j | $n_{PUCCH,1}^{(1)}$ | 1, 1 |
| 5 | A | N/D | N/D | $n_{PUCCH,0}^{(1)}$ | 1 + 0j | $n_{PUCCH,0}^{(1)}$ | 1, 0 | $n_{PUCCH,1}^{(1)}$ | 1 + 0j | $n_{PUCCH,1}^{(1)}$ | 1, 0 |
| 6 | N/D | A | N/D | $n_{PUCCH,0}^{(1)}$ | 1 + 0j | $n_{PUCCH,0}^{(1)}$ | 0, 1 | $n_{PUCCH,1}^{(1)}$ | 1 + 0j | $n_{PUCCH,1}^{(1)}$ | 0, 1 |
| 7 | N/D | N/D | N | $n_{PUCCH,2}^{(1)}$ | 1 + 0j | $n_{PUCCH,2}^{(1)}$ | 0, 0 | $n_{PUCCH,3}^{(1)}$ | 1 + 0j | $n_{PUCCH,3}^{(1)}$ | 0, 0 |
| 8 | N | N/D | D | $n_{PUCCH,0}^{(1)}$ | 1 + 0j | $n_{PUCCH,0}^{(1)}$ | 0, 0 | $n_{PUCCH,1}^{(1)}$ | 1 + 0j | $n_{PUCCH,1}^{(1)}$ | 0, 0 |
| 9 | N/D | N | D | $n_{PUCCH,0}^{(1)}$ | 1 + 0j | $n_{PUCCH,0}^{(1)}$ | 0, 0 | $n_{PUCCH,1}^{(1)}$ | 1 + 0j | $n_{PUCCH,1}^{(1)}$ | 0, 0 |
| 10 | D | D | D | | | No Transmission | | | | | |

Conventional LTE-A FDD mapping tables were designed to support 2-codeword PCell fallback. That is, when only the PCell PDCCH is received, used resources and constellation have the same forms as those of PUCCH format 1b. Since the resource of the second antenna port for SORTD of PUCCH format 1b is defined by (resource index used for the first antenna port)+1, it is preferable to use SORTD when resources are not available in order to maintain nested property, as described above. Here, to improve A/N performance, remapping of rows having no resource allocation problem can be considered. In this case, in order to minimize modification of the conventional mapping tables, SORTD mapping is performed for rows (shaded portions) having trouble with resource allocation and an RS can be separated from data additionally at antenna port #0 (p=0) for rows having no trouble with resource allocation (i.e. rows in which all resources are available) (unshaded portions). Here, as a separation rule, +1 (when data resource $n_{PUCCH,i}^{(1)}$ is even-numbered) or −1 (when data resource $n_{PUCCH,i}^{(1)}$ is odd-numbered) is applicable to an RS resource in single antenna mapping tables (Tables 36, 38 and 40). Equivalently, +1 (when RS resource $n_{PUCCH,i}^{(1)}$ is even-numbered) or −1 (when RS resource $n_{PUCCH,i}^{(1)}$ is odd-numbered) is applicable to the data resource in mapping tables (Tables 37, 39 and 41). Here, the above-described methods can be used for resource allocation.

Table 36 shows an FDD 4-bit mapping table according to the present invention (PCell MIMO, SCell MIMO). This example shows a case in which the position of the RS resource is changed by +1 or −1 from the data resource at antenna port #0 (p=0) when there is no problem in resource allocation (i.e. in the case of unshaded portions). When there is a problem in resource allocation (i.e. in the case of shaded portions), the RS resource and data resource are inferred from the same PUCCH resource index at each antenna port.

TABLE 36

| | | | | Antenna port #0 (p = 0) | | | | Antenna port #1 (p = 1) | | | |
|---|---|---|---|---|---|---|---|---|---|---|---|
| | | | | RS | | Data | | RS | | Data | |
| HARQ-ACK (0) | HARQ-ACK (1) | HARQ-ACK (2) | HARQ-ACK (3) | $n^{1}_{PUCCH,i}$ | Modulation value | $n^{1}_{PUCCH,j}$ | b(0)b(1) | $n^{1}_{PUCCH,i}$ | Modulation value | $n^{1}_{PUCCH,i}$ | b(0)b(1) |
| 0 | A | A | A | A | $n^{(1)}_{PUCCH,0}$ | 1 + 0j | $n^{(1)}_{PUCCH,1}$ | 1, 1 | $n^{(1)}_{PUCCH,3}$ | 1 + 0j | $n^{(1)}_{PUCCH,2}$ | 1, 1 |
| 1 | A | N/D | A | A | $n^{(1)}_{PUCCH,3}$ | 1 + 0j | $n^{(1)}_{PUCCH,2}$ | 0, 1 | $n^{(1)}_{PUCCH,0}$ | 1 + 0j | $n^{(1)}_{PUCCH,1}$ | 0, 1 |
| 2 | N/D | A | A | A | $n^{(1)}_{PUCCH,0}$ | 1 + 0j | $n^{(1)}_{PUCCH,1}$ | 0, 1 | $n^{(1)}_{PUCCH,3}$ | 1 + 0j | $n^{(1)}_{PUCCH,2}$ | 0, 1 |
| 3 | N/D | N/D | A | A | $n^{(1)}_{PUCCH,3}$ | 1 + 0j | $n^{(1)}_{PUCCH,3}$ | 1, 1 | $n^{(1)}_{PUCCH,2}$ | 1 + 0j | $n^{(1)}_{PUCCH,2}$ | 1, 1 |
| 4 | A | A | A | N/D | $n^{(1)}_{PUCCH,0}$ | 1 + 0j | $n^{(1)}_{PUCCH,1}$ | 1, 0 | $n^{(1)}_{PUCCH,3}$ | 1 + 0j | $n^{(1)}_{PUCCH,2}$ | 1, 0 |
| 5 | A | N/D | A | N/D | $n^{(1)}_{PUCCH,3}$ | 1 + 0j | $n^{(1)}_{PUCCH,2}$ | 0, 0 | $n^{(1)}_{PUCCH,0}$ | 1 + 0j | $n^{(1)}_{PUCCH,1}$ | 0, 0 |
| 6 | N/D | A | A | N/D | $n^{(1)}_{PUCCH,0}$ | 1 + 0j | $n^{(1)}_{PUCCH,1}$ | 0, 0 | $n^{(1)}_{PUCCH,3}$ | 1 + 0j | $n^{(1)}_{PUCCH,2}$ | 0, 0 |
| 7 | N/D | N/D | A | N/D | $n^{(1)}_{PUCCH,3}$ | 1 + 0j | $n^{(1)}_{PUCCH,3}$ | 1, 0 | $n^{(1)}_{PUCCH,2}$ | 1 + 0j | $n^{(1)}_{PUCCH,2}$ | 1, 0 |
| 8 | A | A | N/D | A | $n^{(1)}_{PUCCH,3}$ | 1 + 0j | $n^{(1)}_{PUCCH,2}$ | 1, 1 | $n^{(1)}_{PUCCH,0}$ | 1 + 0j | $n^{(1)}_{PUCCH,1}$ | 1, 1 |
| 9 | A | N/D | N/D | A | $n^{(1)}_{PUCCH,3}$ | 1 + 0j | $n^{(1)}_{PUCCH,2}$ | 1, 0 | $n^{(1)}_{PUCCH,0}$ | 1 + 0j | $n^{(1)}_{PUCCH,1}$ | 1, 0 |
| 10 | N/D | A | N/D | A | $n^{(1)}_{PUCCH,2}$ | 1 + 0j | $n^{(1)}_{PUCCH,3}$ | 0, 1 | $n^{(1)}_{PUCCH,1}$ | 1 + 0j | $n^{(1)}_{PUCCH,0}$ | 0, 1 |
| 11 | N/D | N/D | N/D | A | $n^{(1)}_{PUCCH,3}$ | 1 + 0j | $n^{(1)}_{PUCCH,3}$ | 0, 0 | $n^{(1)}_{PUCCH,2}$ | 1 + 0j | $n^{(1)}_{PUCCH,2}$ | 0, 0 |
| 12 | A | A | N/D | N/D | $n^{(1)}_{PUCCH,0}$ | 1 + 0j | $n^{(1)}_{PUCCH,0}$ | 1, 1 | $n^{(1)}_{PUCCH,1}$ | 1 + 0j | $n^{(1)}_{PUCCH,1}$ | 1, 1 |
| 13 | A | N/D | N/D | N/D | $n^{(1)}_{PUCCH,0}$ | 1 + 0j | $n^{(1)}_{PUCCH,0}$ | 1, 0 | $n^{(1)}_{PUCCH,1}$ | 1 + 0j | $n^{(1)}_{PUCCH,1}$ | 1, 0 |
| 14 | N/D | A | N/D | N/D | $n^{(1)}_{PUCCH,0}$ | 1 + 0j | $n^{(1)}_{PUCCH,0}$ | 0, 1 | $n^{(1)}_{PUCCH,1}$ | 1 + 0j | $n^{(1)}_{PUCCH,1}$ | 0, 1 |
| 15 | N/D | N | N/D | N/D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 16 | N | N/D | N/D | N/D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 17 | D | D | N/D | N/D | | | | | No Transmission | | | |

Table 37 shows an FDD 4-bit mapping table according to the present invention (PCell MIMO, SCell MIMO). This example shows a case in which the position of the RS resource is changed by +1 or −1 from the data resource at antenna port #0 (p=0) when there is no problem in resource allocation (i.e. in the case of unshaded portions). When there is a problem in resource allocation (i.e. in the case of shaded portions), the RS resource and data resource are inferred from the same PUCCH resource index at each antenna port.

Table 38 shows an FDD 3-bit mapping table according to the present invention (PCell MIMO, SCell SIMO). This example shows a case in which the position of the RS resource is changed by +1 or −1 from the data resource at antenna port #0 (p=0) when there is no problem in resource allocation (i.e. in the case of unshaded portions). When there is a problem in resource allocation (i.e. in the case of shaded portions), the RS resource and data resource are inferred from the same PUCCH resource index at each antenna port.

TABLE 37

| | | | | Antenna port #0 (p = 0) | | | | Antenna port #1 (p = 1) | | | |
|---|---|---|---|---|---|---|---|---|---|---|---|
| | | | | RS | | Data | | RS | | Data | |
| HARQ-ACK (0) | HARQ-ACK (1) | HARQ-ACK (2) | HARQ-ACK (3) | $n^{1}_{PUCCH,i}$ | Modulation value | $n^{1}_{PUCCH,j}$ | b(0)b(1) | $n^{1}_{PUCCH,i}$ | Modulation value | $n^{1}_{PUCCH,i}$ | b(0)b(1) |
| 0 | A | A | A | A | $n^{(1)}_{PUCCH,1}$ | 1 + 0j | $n^{(1)}_{PUCCH,0}$ | 1, 1 | $n^{(1)}_{PUCCH,3}$ | 1 + 0j | $n^{(1)}_{PUCCH,2}$ | 1, 1 |
| 1 | A | N/D | A | A | $n^{(1)}_{PUCCH,2}$ | 1 + 0j | $n^{(1)}_{PUCCH,3}$ | 0, 1 | $n^{(1)}_{PUCCH,0}$ | 1 + 0j | $n^{(1)}_{PUCCH,1}$ | 0, 1 |
| 2 | N/D | A | A | A | $n^{(1)}_{PUCCH,1}$ | 1 + 0j | $n^{(1)}_{PUCCH,0}$ | 0, 1 | $n^{(1)}_{PUCCH,3}$ | 1 + 0j | $n^{(1)}_{PUCCH,2}$ | 0, 1 |
| 3 | N/D | N/D | A | A | $n^{(1)}_{PUCCH,3}$ | 1 + 0j | $n^{(1)}_{PUCCH,3}$ | 1, 1 | $n^{(1)}_{PUCCH,2}$ | 1 + 0j | $n^{(1)}_{PUCCH,2}$ | 1, 1 |
| 4 | A | A | A | N/D | $n^{(1)}_{PUCCH,1}$ | 1 + 0j | $n^{(1)}_{PUCCH,0}$ | 1, 0 | $n^{(1)}_{PUCCH,3}$ | 1 + 0j | $n^{(1)}_{PUCCH,2}$ | 1, 0 |
| 5 | A | N/D | A | N/D | $n^{(1)}_{PUCCH,2}$ | 1 + 0j | $n^{(1)}_{PUCCH,3}$ | 0, 0 | $n^{(1)}_{PUCCH,0}$ | 1 + 0j | $n^{(1)}_{PUCCH,1}$ | 0, 0 |
| 6 | N/D | A | A | N/D | $n^{(1)}_{PUCCH,1}$ | 1 + 0j | $n^{(1)}_{PUCCH,0}$ | 0, 0 | $n^{(1)}_{PUCCH,3}$ | 1 + 0j | $n^{(1)}_{PUCCH,2}$ | 0, 0 |
| 7 | N/D | N/D | A | N/D | $n^{(1)}_{PUCCH,3}$ | 1 + 0j | $n^{(1)}_{PUCCH,3}$ | 1, 0 | $n^{(1)}_{PUCCH,2}$ | 1 + 0j | $n^{(1)}_{PUCCH,2}$ | 1, 0 |
| 8 | A | A | N/D | A | $n^{(1)}_{PUCCH,2}$ | 1 + 0j | $n^{(1)}_{PUCCH,3}$ | 1, 1 | $n^{(1)}_{PUCCH,0}$ | 1 + 0j | $n^{(1)}_{PUCCH,1}$ | 1, 1 |
| 9 | A | N/D | N/D | A | $n^{(1)}_{PUCCH,2}$ | 1 + 0j | $n^{(1)}_{PUCCH,3}$ | 1, 0 | $n^{(1)}_{PUCCH,0}$ | 1 + 0j | $n^{(1)}_{PUCCH,1}$ | 1, 0 |
| 10 | N/D | A | N/D | A | $n^{(1)}_{PUCCH,3}$ | 1 + 0j | $n^{(1)}_{PUCCH,2}$ | 0, 1 | $n^{(1)}_{PUCCH,1}$ | 1 + 0j | $n^{(1)}_{PUCCH,0}$ | 0, 1 |
| 11 | N/D | N/D | N/D | A | $n^{(1)}_{PUCCH,3}$ | 1 + 0j | $n^{(1)}_{PUCCH,3}$ | 0, 0 | $n^{(1)}_{PUCCH,2}$ | 1 + 0j | $n^{(1)}_{PUCCH,2}$ | 0, 0 |
| 12 | A | A | N/D | N/D | $n^{(1)}_{PUCCH,0}$ | 1 + 0j | $n^{(1)}_{PUCCH,0}$ | 1, 1 | $n^{(1)}_{PUCCH,1}$ | 1 + 0j | $n^{(1)}_{PUCCH,1}$ | 1, 1 |
| 13 | A | N/D | N/D | N/D | $n^{(1)}_{PUCCH,0}$ | 1 + 0j | $n^{(1)}_{PUCCH,0}$ | 1, 0 | $n^{(1)}_{PUCCH,1}$ | 1 + 0j | $n^{(1)}_{PUCCH,1}$ | 1, 0 |
| 14 | N/D | A | N/D | N/D | $n^{(1)}_{PUCCH,0}$ | 1 + 0j | $n^{(1)}_{PUCCH,0}$ | 0, 1 | $n^{(1)}_{PUCCH,1}$ | 1 + 0j | $n^{(1)}_{PUCCH,1}$ | 0, 1 |
| 15 | N/D | N | N/D | N/D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 16 | N | N/D | N/D | N/D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 17 | D | D | N/D | N/D | | | | | No Transmission | | | |

TABLE 38

| HARQ-ACK (0) | HARQ-ACK (1) | HARQ-ACK (2) | Antenna port #0 (p = 0) | | | | | Antenna port #1 (p = 1) | | | | |
|---|---|---|---|---|---|---|---|---|---|---|---|---|
| | | | RS | | Data | | | RS | | Data | | |
| | | | $n^{1}_{PUCCH,i}$ | Modulation value | $n^{1}_{PUCCH,j}$ | b(0)b(1) | $n^{1}_{PUCCH,i}$ | $n^{1}_{PUCCH,i}$ | Modulation value | $n^{1}_{PUCCH,i}$ | b(0)b(1) | |
| 0 | A | A | A | $n^{(1)}_{PUCCH,0}$ | 1 + 0j | $n^{(1)}_{PUCCH,1}$ | 1, 1 | $n^{(1)}_{PUCCH,3}$ | 1 + 0j | $n^{(1)}_{PUCCH,2}$ | 1, 1 |
| 1 | A | N/D | A | $n^{(1)}_{PUCCH,0}$ | 1 + 0j | $n^{(1)}_{PUCCH,1}$ | 1, 0 | $n^{(1)}_{PUCCH,3}$ | 1 + 0j | $n^{(1)}_{PUCCH,2}$ | 1, 0 |
| 2 | N/D | A | A | $n^{(1)}_{PUCCH,0}$ | 1 + 0j | $n^{(1)}_{PUCCH,1}$ | 0, 1 | $n^{(1)}_{PUCCH,3}$ | 1 + 0j | $n^{(1)}_{PUCCH,2}$ | 0, 1 |
| 3 | N/D | N/D | A | $n^{(1)}_{PUCCH,2}$ | 1 + 0j | $n^{(1)}_{PUCCH,2}$ | 1, 1 | $n^{(1)}_{PUCCH,3}$ | 1 + 0j | $n^{(1)}_{PUCCH,3}$ | 1, 1 |
| 4 | A | A | N/D | $n^{(1)}_{PUCCH,0}$ | 1 + 0j | $n^{(1)}_{PUCCH,0}$ | 1, 1 | $n^{(1)}_{PUCCH,1}$ | 1 + 0j | $n^{(1)}_{PUCCH,1}$ | 1, 1 |
| 5 | A | N/D | N/D | $n^{(1)}_{PUCCH,0}$ | 1 + 0j | $n^{(1)}_{PUCCH,0}$ | 1, 0 | $n^{(1)}_{PUCCH,1}$ | 1 + 0j | $n^{(1)}_{PUCCH,1}$ | 1, 0 |
| 6 | N/D | A | N/D | $n^{(1)}_{PUCCH,0}$ | 1 + 0j | $n^{(1)}_{PUCCH,0}$ | 0, 1 | $n^{(1)}_{PUCCH,1}$ | 1 + 0j | $n^{(1)}_{PUCCH,1}$ | 0, 1 |
| 7 | N/D | N/D | N | $n^{(1)}_{PUCCH,2}$ | 1 + 0j | $n^{(1)}_{PUCCH,2}$ | 0, 0 | $n^{(1)}_{PUCCH,3}$ | 1 + 0j | $n^{(1)}_{PUCCH,3}$ | 0, 0 |
| 8 | N | N/D | D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 9 | N/D | N | D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 10 | D | D | D | | | | | No Transmission | | | |

Table 39 shows an FDD 3-bit mapping table according to the present invention (PCell SIMO, SCell MIMO). This example shows a case in which the position of the RS resource is changed by +1 or −1 from the data resource at antenna port #0 (p=0) when there is no problem in resource allocation (i.e. in the case of unshaded portions). When there is a problem in resource allocation (i.e. in the case of shaded portions), the RS resource and data resource are inferred from the same PUCCH resource index at each antenna port.

TABLE 39

| HARQ-ACK (0) | HARQ-ACK (1) | HARQ-ACK (2) | Antenna port #0 (p = 0) | | | | | Antenna port #1 (p = 1) | | | | |
|---|---|---|---|---|---|---|---|---|---|---|---|---|
| | | | RS | | Data | | | RS | | Data | | |
| | | | $n^{1}_{PUCCH,i}$ | Modulation value | $n^{1}_{PUCCH,j}$ | b(0)b(1) | $n^{1}_{PUCCH,i}$ | $n^{1}_{PUCCH,i}$ | Modulation value | $n^{1}_{PUCCH,i}$ | b(0)b(1) | |
| 0 | A | A | A | $n^{(1)}_{PUCCH,0}$ | 1 + 0j | $n^{(1)}_{PUCCH,1}$ | 1, 1 | $n^{(1)}_{PUCCH,3}$ | 1 + 0j | $n^{(1)}_{PUCCH,2}$ | 1, 1 |
| 1 | A | N/D | A | $n^{(1)}_{PUCCH,0}$ | 1 + 0j | $n^{(1)}_{PUCCH,1}$ | 1, 0 | $n^{(1)}_{PUCCH,3}$ | 1 + 0j | $n^{(1)}_{PUCCH,2}$ | 1, 0 |
| 2 | N/D | A | A | $n^{(1)}_{PUCCH,0}$ | 1 + 0j | $n^{(1)}_{PUCCH,1}$ | 0, 1 | $n^{(1)}_{PUCCH,3}$ | 1 + 0j | $n^{(1)}_{PUCCH,2}$ | 0, 1 |
| 3 | N/D | N/D | A | $n^{(1)}_{PUCCH,2}$ | 1 + 0j | $n^{(1)}_{PUCCH,2}$ | 1, 1 | $n^{(1)}_{PUCCH,3}$ | 1 + 0j | $n^{(1)}_{PUCCH,3}$ | 1, 1 |
| 4 | A | A | N/D | $n^{(1)}_{PUCCH,0}$ | 1 + 0j | $n^{(1)}_{PUCCH,0}$ | 1, 1 | $n^{(1)}_{PUCCH,1}$ | 1 + 0j | $n^{(1)}_{PUCCH,1}$ | 1, 1 |
| 5 | A | N/D | N/D | $n^{(1)}_{PUCCH,0}$ | 1 + 0j | $n^{(1)}_{PUCCH,0}$ | 1, 0 | $n^{(1)}_{PUCCH,1}$ | 1 + 0j | $n^{(1)}_{PUCCH,1}$ | 1, 0 |
| 6 | N/D | A | N/D | $n^{(1)}_{PUCCH,0}$ | 1 + 0j | $n^{(1)}_{PUCCH,0}$ | 0, 1 | $n^{(1)}_{PUCCH,1}$ | 1 + 0j | $n^{(1)}_{PUCCH,1}$ | 0, 1 |
| 7 | N/D | N/D | N | $n^{(1)}_{PUCCH,2}$ | 1 + 0j | $n^{(1)}_{PUCCH,2}$ | 0, 0 | $n^{(1)}_{PUCCH,3}$ | 1 + 0j | $n^{(1)}_{PUCCH,3}$ | 0, 0 |
| 8 | N | N/D | D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 9 | N/D | N | D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 10 | D | D | D | | | | | No Transmission | | | |

Table 40 shows an FDD 3-bit mapping table according to the present invention (PCell MIMO, SCell SIMO). This example shows a case in which the position of the RS resource is changed by +1 or −1 from the data resource at antenna port #0 (p=0) when there is no problem in resource allocation (i.e. in the case of unshaded portions). When there is a problem in resource allocation (i.e. in the case of shaded portions), the RS resource and data resource are inferred from the same PUCCH resource index at each antenna port.

TABLE 40

| HARQ-ACK (0) | HARQ-ACK (1) | HARQ-ACK (2) | Antenna port #0 (p = 0) | | | | | Antenna port #1 (p = 1) | | | | |
|---|---|---|---|---|---|---|---|---|---|---|---|---|
| | | | RS | | Data | | | RS | | Data | | |
| | | | $n^{1}_{PUCCH,i}$ | Modulation value | $n^{1}_{PUCCH,j}$ | b(0)b(1) | $n^{1}_{PUCCH,i}$ | $n^{1}_{PUCCH,i}$ | Modulation value | $n^{1}_{PUCCH,i}$ | b(0)b(1) | |
| 0 | A | A | A | $n^{(1)}_{PUCCH,1}$ | 1 + 0j | $n^{(1)}_{PUCCH,0}$ | 1, 1 | $n^{(1)}_{PUCCH,3}$ | 1 + 0j | $n^{(1)}_{PUCCH,2}$ | 1, 1 |
| 1 | A | N/D | A | $n^{(1)}_{PUCCH,1}$ | 1 + 0j | $n^{(1)}_{PUCCH,0}$ | 1, 0 | $n^{(1)}_{PUCCH,3}$ | 1 + 0j | $n^{(1)}_{PUCCH,2}$ | 1, 0 |
| 2 | N/D | A | A | $n^{(1)}_{PUCCH,1}$ | 1 + 0j | $n^{(1)}_{PUCCH,0}$ | 0, 1 | $n^{(1)}_{PUCCH,3}$ | 1 + 0j | $n^{(1)}_{PUCCH,2}$ | 0, 1 |
| 3 | N/D | N/D | A | $n^{(1)}_{PUCCH,2}$ | 1 + 0j | $n^{(1)}_{PUCCH,2}$ | 1, 1 | $n^{(1)}_{PUCCH,3}$ | 1 + 0j | $n^{(1)}_{PUCCH,3}$ | 1, 1 |
| 4 | A | A | N/D | $n^{(1)}_{PUCCH,0}$ | 1 + 0j | $n^{(1)}_{PUCCH,0}$ | 1, 1 | $n^{(1)}_{PUCCH,1}$ | 1 + 0j | $n^{(1)}_{PUCCH,1}$ | 1, 1 |

TABLE 40-continued

| | | | | Antenna port #0 (p = 0) | | | Antenna port #1 (p = 1) | | | |
| | | | | | RS | | | RS | | |
| HARQ-ACK (0) | HARQ-ACK (1) | HARQ-ACK (2) | | Modulation | Data | | | Modulation | Data | |
| | | | $n^1_{PUCCH,i}$ | value | $n^1_{PUCCHj}$ | b(0)b(1) | $n^1_{PUCCH,i}$ | value | $n^1_{PUCCH,i}$ | b(0)b(1) |
|---|---|---|---|---|---|---|---|---|---|---|
| 5 | A | N/D | N/D | $n^{(1)}_{PUCCH,0}$ | 1 + 0j | $n^{(1)}_{PUCCH,0}$ | 1, 0 | $n^{(1)}_{PUCCH,1}$ | 1 + 0j | $n^{(1)}_{PUCCH,1}$ | 1, 0 |
| 6 | N/D | A | N/D | $n^{(1)}_{PUCCH,0}$ | 1 + 0j | $n^{(1)}_{PUCCH,0}$ | 0, 1 | $n^{(1)}_{PUCCH,1}$ | 1 + 0j | $n^{(1)}_{PUCCH,1}$ | 0, 1 |
| 7 | N/D | N/D | N | $n^{(1)}_{PUCCH,2}$ | 1 + 0j | $n^{(1)}_{PUCCH,2}$ | 0, 0 | $n^{(1)}_{PUCCH,3}$ | 1 + 0j | $n^{(1)}_{PUCCH,3}$ | 0, 0 |
| 8 | N | N/D | D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 9 | N/D | N | D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 10 | D | D | D | | | No Transmission | | | | | |

Table 41 shows an FDD 3-bit mapping table according to the present invention (PCell SIMO, SCell MIMO). This example shows a case in which the position of the RS resource is changed by +1 or −1 from the data resource at antenna port #0 (p=0) when there is no problem in resource allocation (i.e. in the case of unshaded portions). When there is a problem in resource allocation (i.e. in the case of shaded portions), the RS resource and data resource are inferred from the same PUCCH resource index at each antenna port.

TABLE 41

| | | | | Antenna port #0 (p = 0) | | | Antenna port #1 (p = 1) | | | |
| | | | | | RS | | | RS | | |
| HARQ-ACK (0) | HARQ-ACK (1) | HARQ-ACK (2) | | Modulation | Data | | | Modulation | Data | |
| | | | $n^1_{PUCCH,i}$ | value | $n^1_{PUCCHj}$ | b(0)b(1) | $n^1_{PUCCH,i}$ | value | $n^1_{PUCCH,i}$ | b(0)b(1) |
|---|---|---|---|---|---|---|---|---|---|---|
| 0 | A | A | A | $n^{(1)}_{PUCCH,1}$ | 1 + 0j | $n^{(1)}_{PUCCH,0}$ | 1, 1 | $n^{(1)}_{PUCCH,3}$ | 1 + 0j | $n^{(1)}_{PUCCH,2}$ | 1, 1 |
| 1 | A | N/D | A | $n^{(1)}_{PUCCH,1}$ | 1 + 0j | $n^{(1)}_{PUCCH,0}$ | 1, 0 | $n^{(1)}_{PUCCH,3}$ | 1 + 0j | $n^{(1)}_{PUCCH,2}$ | 1, 0 |
| 2 | N/D | A | A | $n^{(1)}_{PUCCH,1}$ | 1 + 0j | $n^{(1)}_{PUCCH,0}$ | 0, 1 | $n^{(1)}_{PUCCH,3}$ | 1 + 0j | $n^{(1)}_{PUCCH,2}$ | 0, 1 |
| 3 | N/D | N/D | A | $n^{(1)}_{PUCCH,2}$ | 1 + 0j | $n^{(1)}_{PUCCH,2}$ | 1, 1 | $n^{(1)}_{PUCCH,3}$ | 1 + 0j | $n^{(1)}_{PUCCH,3}$ | 1, 1 |
| 4 | A | A | N/D | $n^{(1)}_{PUCCH,0}$ | 1 + 0j | $n^{(1)}_{PUCCH,0}$ | 1, 1 | $n^{(1)}_{PUCCH,1}$ | 1 + 0j | $n^{(1)}_{PUCCH,1}$ | 1, 1 |
| 5 | A | N/D | N/D | $n^{(1)}_{PUCCH,0}$ | 1 + 0j | $n^{(1)}_{PUCCH,0}$ | 1, 0 | $n^{(1)}_{PUCCH,1}$ | 1 + 0j | $n^{(1)}_{PUCCH,1}$ | 1, 0 |
| 6 | N/D | A | N/D | $n^{(1)}_{PUCCH,0}$ | 1 + 0j | $n^{(1)}_{PUCCH,0}$ | 0, 1 | $n^{(1)}_{PUCCH,1}$ | 1 + 0j | $n^{(1)}_{PUCCH,1}$ | 0, 1 |
| 7 | N/D | N/D | N | $n^{(1)}_{PUCCH,2}$ | 1 + 0j | $n^{(1)}_{PUCCH,2}$ | 0, 0 | $n^{(1)}_{PUCCH,3}$ | 1 + 0j | $n^{(1)}_{PUCCH,3}$ | 0, 0 |
| 8 | N | N/D | D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 9 | N/D | N | D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 10 | D | D | D | | | No Transmission | | | | | |

Table 42 shows an FDD 4-bit mapping table according to the present invention (PCell MIMO, SCell MIMO). This example shows a case in which the position of the RS resource is changed by +1 or −1 from the data resource at antenna port #1 (p=1) when there is no problem in resource allocation (i.e. in the case of unshaded portions). When there is a problem in resource allocation (i.e. in the case of shaded portions), the RS resource and data resource are inferred from the same PUCCH resource index at each antenna port.

TABLE 42

| | | | | | Antenna port #0 (p = 0) | | | Antenna port #1 (p = 1) | | | |
| | | | | | | RS | | | RS | | |
| HARQ-ACK (0) | HARQ-ACK (1) | HARQ-ACK (2) | HARQ-ACK (3) | | Modulation | Data | | | Modulation | Data | |
| | | | | $n^1_{PUCCH,i}$ | value | $n^1_{PUCCHj}$ | b(0)b(1) | $n^1_{PUCCH,i}$ | value | $n^1_{PUCCH,i}$ | b(0)b(1) |
|---|---|---|---|---|---|---|---|---|---|---|---|
| 0 | A | A | A | A | $n^{(1)}_{PUCCH,1}$ | 1 + 0j | $n^{(1)}_{PUCCH,1}$ | 1, 1 | $n^{(1)}_{PUCCH,3}$ | 1 + 0j | $n^{(1)}_{PUCCH,2}$ | 1, 1 |
| 1 | A | N/D | A | A | $n^{(1)}_{PUCCH,2}$ | 1 + 0j | $n^{(1)}_{PUCCH,2}$ | 0, 1 | $n^{(1)}_{PUCCH,0}$ | 1 + 0j | $n^{(1)}_{PUCCH,1}$ | 0, 1 |
| 2 | N/D | A | A | A | $n^{(1)}_{PUCCH,1}$ | 1 + 0j | $n^{(1)}_{PUCCH,1}$ | 0, 1 | $n^{(1)}_{PUCCH,3}$ | 1 + 0j | $n^{(1)}_{PUCCH,2}$ | 0, 1 |
| 3 | N/D | N/D | A | A | $n^{(1)}_{PUCCH,3}$ | 1 + 0j | $n^{(1)}_{PUCCH,3}$ | 1, 1 | $n^{(1)}_{PUCCH,2}$ | 1 + 0j | $n^{(1)}_{PUCCH,2}$ | 1, 1 |
| 4 | A | A | N/D | A | $n^{(1)}_{PUCCH,1}$ | 1 + 0j | $n^{(1)}_{PUCCH,1}$ | 1, 0 | $n^{(1)}_{PUCCH,3}$ | 1 + 0j | $n^{(1)}_{PUCCH,2}$ | 1, 0 |
| 5 | A | N/D | A | N/D | $n^{(1)}_{PUCCH,2}$ | 1 + 0j | $n^{(1)}_{PUCCH,2}$ | 0, 0 | $n^{(1)}_{PUCCH,0}$ | 1 + 0j | $n^{(1)}_{PUCCH,1}$ | 0, 0 |
| 6 | N/D | A | A | N/D | $n^{(1)}_{PUCCH,1}$ | 1 + 0j | $n^{(1)}_{PUCCH,1}$ | 0, 0 | $n^{(1)}_{PUCCH,3}$ | 1 + 0j | $n^{(1)}_{PUCCH,2}$ | 0, 0 |
| 7 | N/D | N/D | A | N/D | $n^{(1)}_{PUCCH,3}$ | 1 + 0j | $n^{(1)}_{PUCCH,3}$ | 1, 0 | $n^{(1)}_{PUCCH,2}$ | 1 + 0j | $n^{(1)}_{PUCCH,2}$ | 1, 0 |
| 8 | A | A | N/D | A | $n^{(1)}_{PUCCH,2}$ | 1 + 0j | $n^{(1)}_{PUCCH,2}$ | 1, 1 | $n^{(1)}_{PUCCH,0}$ | 1 + 0j | $n^{(1)}_{PUCCH,1}$ | 1, 1 |
| 9 | A | N/D | N/D | A | $n^{(1)}_{PUCCH,2}$ | 1 + 0j | $n^{(1)}_{PUCCH,2}$ | 1, 0 | $n^{(1)}_{PUCCH,0}$ | 1 + 0j | $n^{(1)}_{PUCCH,1}$ | 1, 0 |

TABLE 42-continued

| | | | | Antenna port #0 (p = 0) | | | | Antenna port #1 (p = 1) | | | |
| | | | | | RS | Data | | | RS | Data | |
| HARQ-ACK (0) | HARQ-ACK (1) | HARQ-ACK (2) | HARQ-ACK (3) | $n^1_{PUCCH,i}$ | Modulation value | $n^1_{PUCCH,j}$ | b(0)b(1) | $n^1_{PUCCH,i}$ | Modulation value | $n^1_{PUCCH,j}$ | b(0)b(1) |
|---|---|---|---|---|---|---|---|---|---|---|---|
| 10 | N/D | A | N/D | A | $n^{(1)}_{PUCCH,3}$ | 1 + 0j | $n^{(1)}_{PUCCH,3}$ | 0, 1 | $n^{(1)}_{PUCCH,1}$ | 1 + 0j | $n^{(1)}_{PUCCH,0}$ | 0, 1 |
| 11 | N/D | N/D | A | A | $n^{(1)}_{PUCCH,3}$ | 1 + 0j | $n^{(1)}_{PUCCH,3}$ | 0, 0 | $n^{(1)}_{PUCCH,2}$ | 1 + 0j | $n^{(1)}_{PUCCH,2}$ | 0, 0 |
| 12 | A | A | N/D | N/D | $n^{(1)}_{PUCCH,0}$ | 1 + 0j | $n^{(1)}_{PUCCH,0}$ | 1, 1 | $n^{(1)}_{PUCCH,1}$ | 1 + 0j | $n^{(1)}_{PUCCH,1}$ | 1, 1 |
| 13 | A | N/D | N/D | N/D | $n^{(1)}_{PUCCH,0}$ | 1 + 0j | $n^{(1)}_{PUCCH,0}$ | 1, 0 | $n^{(1)}_{PUCCH,1}$ | 1 + 0j | $n^{(1)}_{PUCCH,1}$ | 1, 0 |
| 14 | N/D | A | N/D | N/D | $n^{(1)}_{PUCCH,0}$ | 1 + 0j | $n^{(1)}_{PUCCH,0}$ | 0, 1 | $n^{(1)}_{PUCCH,1}$ | 1 + 0j | $n^{(1)}_{PUCCH,1}$ | 0, 1 |
| 15 | N/D | N | N/D | N/D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 16 | N | N/D | N/D | N/D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 17 | D | D | N/D | N/D | | | | No Transmission | | | |

Alternatively, SORTD can be used for rows having trouble with resource allocation and an RS and data can be separately mapped even at antenna port #0 (p=0) for rows having no trouble with resource allocation (Tables 43 and 44, 4-bit A/N; Tables 45 to 48, 3-bit A/N). Specifically, in the case of 4-bit A/N (Tables 43 and 44), SORTD is applicable to paired resources (Ch1-Ch2 and Ch3-Ch4) for rows 3, 7, 10, 11, 12, 13, 14, 15 and 16 and $n_{PUCCH,i,DATA}^{(1,p=p0)} = n_{PUCCH,i}^{(1)}$, $n_{PUCCH,i,RS}^{(1,p=p0)} = n_{PUCCH,(i+(-1)^i),DATA}^{(1,p=p0)}$, $n_{PUCCH,i,DATA}^{(1,p=p1)} = n_{PUCCH,mod(i+2,4),DATA}^{(1,p=p0)}$ and $n_{PUCCH,i,RS}^{(1,p=p1)} = n_{PUCCH,(i+(-1)^i),DATA}$ are applicable to other rows. One of the above-described resource allocation methods can be used. In the case of 3-bit A/N (Tables 45 to 48), rows 3, 4, 5, 6, 7, 8 and 9 may have trouble with resource allocation.

TABLE 43

| | | | | Antenna port #0 (p = 0) | | | | Antenna port #1 (p = 1) | | | |
| | | | | | RS | Data | | | RS | Data | |
| HARQ-ACK (0) | HARQ-ACK (1) | HARQ-ACK (2) | HARQ-ACK (3) | $n^1_{PUCCH,i}$ | Modulation value | $n^1_{PUCCH,j}$ | b(0)b(1) | $n^1_{PUCCH,i}$ | Modulation value | $n^1_{PUCCH,j}$ | b(0)b(1) |
|---|---|---|---|---|---|---|---|---|---|---|---|
| 0 | A | A | A | A | $n^{(1)}_{PUCCH,1}$ | 1 + 0j | $n^{(1)}_{PUCCH,0}$ | 1, 1 | $n^{(1)}_{PUCCH,3}$ | 1 + 0j | $n^{(1)}_{PUCCH,2}$ | 1, 1 |
| 1 | A | N/D | A | A | $n^{(1)}_{PUCCH,2}$ | 1 + 0j | $n^{(1)}_{PUCCH,3}$ | 0, 1 | $n^{(1)}_{PUCCH,0}$ | 1 + 0j | $n^{(1)}_{PUCCH,1}$ | 0, 1 |
| 2 | N/D | A | A | A | $n^{(1)}_{PUCCH,1}$ | 1 + 0j | $n^{(1)}_{PUCCH,0}$ | 0, 1 | $n^{(1)}_{PUCCH,3}$ | 1 + 0j | $n^{(1)}_{PUCCH,2}$ | 0, 1 |
| 3 | N/D | N/D | A | A | $n^{(1)}_{PUCCH,3}$ | 1 + 0j | $n^{(1)}_{PUCCH,3}$ | 1, 1 | $n^{(1)}_{PUCCH,2}$ | 1 + 0j | $n^{(1)}_{PUCCH,2}$ | 1, 1 |
| 4 | A | A | A | N/D | $n^{(1)}_{PUCCH,1}$ | 1 + 0j | $n^{(1)}_{PUCCH,0}$ | 1, 0 | $n^{(1)}_{PUCCH,3}$ | 1 + 0j | $n^{(1)}_{PUCCH,2}$ | 1, 0 |
| 5 | A | N/D | A | N/D | $n^{(1)}_{PUCCH,2}$ | 1 + 0j | $n^{(1)}_{PUCCH,3}$ | 0, 0 | $n^{(1)}_{PUCCH,0}$ | 1 + 0j | $n^{(1)}_{PUCCH,1}$ | 0, 0 |
| 6 | N/D | A | A | N/D | $n^{(1)}_{PUCCH,1}$ | 1 + 0j | $n^{(1)}_{PUCCH,0}$ | 0, 0 | $n^{(1)}_{PUCCH,3}$ | 1 + 0j | $n^{(1)}_{PUCCH,2}$ | 0, 0 |
| 7 | N/D | N/D | A | N/D | $n^{(1)}_{PUCCH,3}$ | 1 + 0j | $n^{(1)}_{PUCCH,3}$ | 1, 0 | $n^{(1)}_{PUCCH,2}$ | 1 + 0j | $n^{(1)}_{PUCCH,2}$ | 1, 0 |
| 8 | A | A | N/D | A | $n^{(1)}_{PUCCH,2}$ | 1 + 0j | $n^{(1)}_{PUCCH,3}$ | 1, 1 | $n^{(1)}_{PUCCH,0}$ | 1 + 0j | $n^{(1)}_{PUCCH,1}$ | 1, 1 |
| 9 | A | N/D | N/D | A | $n^{(1)}_{PUCCH,2}$ | 1 + 0j | $n^{(1)}_{PUCCH,3}$ | 1, 0 | $n^{(1)}_{PUCCH,0}$ | 1 + 0j | $n^{(1)}_{PUCCH,1}$ | 1, 0 |
| 10 | N/D | A | N/D | A | $n^{(1)}_{PUCCH,3}$ | 1 + 0j | $n^{(1)}_{PUCCH,3}$ | 0, 1 | $n^{(1)}_{PUCCH,1}$ | 1 + 0j | $n^{(1)}_{PUCCH,0}$ | 0, 1 |
| 11 | N/D | N/D | A | A | $n^{(1)}_{PUCCH,3}$ | 1 + 0j | $n^{(1)}_{PUCCH,3}$ | 0, 0 | $n^{(1)}_{PUCCH,2}$ | 1 + 0j | $n^{(1)}_{PUCCH,2}$ | 0, 0 |
| 12 | A | A | N/D | N/D | $n^{(1)}_{PUCCH,0}$ | 1 + 0j | $n^{(1)}_{PUCCH,0}$ | 1, 1 | $n^{(1)}_{PUCCH,1}$ | 1 + 0j | $n^{(1)}_{PUCCH,1}$ | 1, 1 |
| 13 | A | N/D | N/D | N/D | $n^{(1)}_{PUCCH,0}$ | 1 + 0j | $n^{(1)}_{PUCCH,0}$ | 1, 0 | $n^{(1)}_{PUCCH,1}$ | 1 + 0j | $n^{(1)}_{PUCCH,1}$ | 1, 0 |
| 14 | N/D | A | N/D | N/D | $n^{(1)}_{PUCCH,0}$ | 1 + 0j | $n^{(1)}_{PUCCH,0}$ | 0, 1 | $n^{(1)}_{PUCCH,1}$ | 1 + 0j | $n^{(1)}_{PUCCH,1}$ | 0, 1 |
| 15 | N/D | N | N/D | N/D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 16 | N | N/D | N/D | N/D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 17 | D | D | N/D | N/D | | | | No Transmission | | | |

TABLE 44

| | | | | Antenna port #0 (p = 0) | | | | Antenna port #1 (p = 1) | | | |
| | | | | | RS | Data | | | RS | Data | |
| HARQ-ACK (0) | HARQ-ACK (1) | HARQ-ACK (2) | HARQ-ACK (3) | $n^1_{PUCCH,i}$ | Modulation value | $n^1_{PUCCH,j}$ | b(0)b(1) | $n^1_{PUCCH,i}$ | Modulation value | $n^1_{PUCCH,j}$ | b(0)b(1) |
|---|---|---|---|---|---|---|---|---|---|---|---|
| 0 | A | A | A | A | $n^{(1)}_{PUCCH,0}$ | 1 + 0j | $n^{(1)}_{PUCCH,1}$ | 1, 1 | $n^{(1)}_{PUCCH,2}$ | 1 + 0j | $n^{(1)}_{PUCCH,3}$ | 1, 1 |
| 1 | A | N/D | A | A | $n^{(1)}_{PUCCH,3}$ | 1 + 0j | $n^{(1)}_{PUCCH,2}$ | 0, 1 | $n^{(1)}_{PUCCH,1}$ | 1 + 0j | $n^{(1)}_{PUCCH,0}$ | 0, 1 |
| 2 | N/D | A | A | A | $n^{(1)}_{PUCCH,0}$ | 1 + 0j | $n^{(1)}_{PUCCH,2}$ | 0, 1 | $n^{(1)}_{PUCCH,2}$ | 1 + 0j | $n^{(1)}_{PUCCH,3}$ | 0, 1 |
| 3 | N/D | N/D | A | A | $n^{(1)}_{PUCCH,3}$ | 1 + 0j | $n^{(1)}_{PUCCH,3}$ | 1, 1 | $n^{(1)}_{PUCCH,2}$ | 1 + 0j | $n^{(1)}_{PUCCH,2}$ | 1, 1 |
| 4 | A | A | A | N/D | $n^{(1)}_{PUCCH,0}$ | 1 + 0j | $n^{(1)}_{PUCCH,0}$ | 1, 0 | $n^{(1)}_{PUCCH,1}$ | 1 + 0j | $n^{(1)}_{PUCCH,3}$ | 1, 0 |
| 5 | A | N/D | A | N/D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 6 | N/D | A | A | N/D | $n^{(1)}_{PUCCH,0}$ | 1 + 0j | $n^{(1)}_{PUCCH,1}$ | 0, 0 | $n^{(1)}_{PUCCH,2}$ | 1 + 0j | $n^{(1)}_{PUCCH,3}$ | 0, 0 |
| 7 | N/D | N/D | A | N/D | $n^{(1)}_{PUCCH,3}$ | 1 + 0j | $n^{(1)}_{PUCCH,3}$ | 1, 0 | $n^{(1)}_{PUCCH,1}$ | 1 + 0j | $n^{(1)}_{PUCCH,2}$ | 1, 0 |
| 8 | A | A | N/D | A | $n^{(1)}_{PUCCH,3}$ | 1 + 0j | $n^{(1)}_{PUCCH,2}$ | 1, 1 | $n^{(1)}_{PUCCH,1}$ | 1 + 0j | $n^{(1)}_{PUCCH,0}$ | 1, 1 |

TABLE 44-continued

| | | | | Antenna port #0 (p = 0) | | | | Antenna port #1 (p = 1) | | | |
|---|---|---|---|---|---|---|---|---|---|---|---|
| | | | | | | RS | | | | RS | |
| HARQ-ACK (0) | HARQ-ACK (1) | HARQ-ACK (2) | HARQ-ACK (3) | $n^1_{PUCCH,i}$ | Modulation value | $n^1_{PUCCH,j}$ | Data b(0)b(1) | $n^1_{PUCCH,i}$ | Modulation value | $n^1_{PUCCH,i}$ | Data b(0)b(1) |
| 9  | A   | N/D | N/D | A   | $n^{(1)}_{PUCCH,3}$ | $1+0j$ | $n^{(1)}_{PUCCH,2}$ | 1, 0 | $n^{(1)}_{PUCCH,1}$ | $1+0j$ | $n^{(1)}_{PUCCH,0}$ | 1, 0 |
| 10 | N/D | A   | N/D | A   | $n^{(1)}_{PUCCH,3}$ | $1+0j$ | $n^{(1)}_{PUCCH,3}$ | 0, 1 | $n^{(1)}_{PUCCH,2}$ | $1+0j$ | $n^{(1)}_{PUCCH,2}$ | 0, 1 |
| 11 | N/D | N/D | N/D | A   | $n^{(1)}_{PUCCH,3}$ | $1+0j$ | $n^{(1)}_{PUCCH,3}$ | 0, 0 | $n^{(1)}_{PUCCH,2}$ | $1+0j$ | $n^{(1)}_{PUCCH,2}$ | 0, 0 |
| 12 | A   | A   | N/D | N/D | $n^{(1)}_{PUCCH,0}$ | $1+0j$ | $n^{(1)}_{PUCCH,0}$ | 1, 1 | $n^{(1)}_{PUCCH,1}$ | $1+0j$ | $n^{(1)}_{PUCCH,1}$ | 1, 1 |
| 13 | A   | N/D | N/D | N/D | $n^{(1)}_{PUCCH,0}$ | $1+0j$ | $n^{(1)}_{PUCCH,0}$ | 1, 0 | $n^{(1)}_{PUCCH,1}$ | $1+0j$ | $n^{(1)}_{PUCCH,1}$ | 1, 0 |
| 14 | N/D | A   | N/D | N/D | $n^{(1)}_{PUCCH,0}$ | $1+0j$ | $n^{(1)}_{PUCCH,0}$ | 0, 1 | $n^{(1)}_{PUCCH,1}$ | $1+0j$ | $n^{(1)}_{PUCCH,1}$ | 0, 1 |
| 15 | N/D | N   | N/D | N/D | $n^{(1)}_{PUCCH,0}$ | $1+0j$ | $n^{(1)}_{PUCCH,0}$ | 0, 0 | $n^{(1)}_{PUCCH,1}$ | $1+0j$ | $n^{(1)}_{PUCCH,1}$ | 0, 0 |
| 16 | N   | N/D | N/D | N/D | $n^{(1)}_{PUCCH,0}$ | $1+0j$ | $n^{(1)}_{PUCCH,0}$ | 0, 0 | $n^{(1)}_{PUCCH,1}$ | $1+0j$ | $n^{(1)}_{PUCCH,1}$ | 0, 0 |
| 17 | D   | D   | N/D | N/D | | | | No Transmission | | | | |

TABLE 45

| | | | | Antenna port #0 (p = 0) | | | | Antenna port #1 (p = 1) | | | |
|---|---|---|---|---|---|---|---|---|---|---|---|
| | | | | | RS | | | | RS | | |
| HARQ-ACK (0) | HARQ-ACK (1) | HARQ-ACK (2) | | $n^1_{PUCCH,i}$ | Modulation value | $n^1_{PUCCH,j}$ | Data b(0)b(1) | $n^1_{PUCCH,i}$ | Modulation value | $n^1_{PUCCH,i}$ | Data b(0)b(1) |
| 0  | A   | A   | A   | | $n^{(1)}_{PUCCH,1}$ | $1+0j$ | $n^{(1)}_{PUCCH,0}$ | 1, 1 | $n^{(1)}_{PUCCH,3}$ | $1+0j$ | $n^{(1)}_{PUCCH,2}$ | 1, 1 |
| 1  | A   | N/D | A   | | $n^{(1)}_{PUCCH,1}$ | $1+0j$ | $n^{(1)}_{PUCCH,0}$ | 1, 0 | $n^{(1)}_{PUCCH,3}$ | $1+0j$ | $n^{(1)}_{PUCCH,2}$ | 1, 0 |
| 2  | N/D | A   | A   | | $n^{(1)}_{PUCCH,1}$ | $1+0j$ | $n^{(1)}_{PUCCH,0}$ | 0, 1 | $n^{(1)}_{PUCCH,3}$ | $1+0j$ | $n^{(1)}_{PUCCH,2}$ | 0, 1 |
| 3  | N/D | N/D | A   | | $n^{(1)}_{PUCCH,2}$ | $1+0j$ | $n^{(1)}_{PUCCH,2}$ | 1, 1 | $n^{(1)}_{PUCCH,2}$ | $1+0j$ | $n^{(1)}_{PUCCH,2}$ | 1, 1 |
| 4  | A   | A   | N/D | | $n^{(1)}_{PUCCH,0}$ | $1+0j$ | $n^{(1)}_{PUCCH,0}$ | 1, 1 | $n^{(1)}_{PUCCH,0}$ | $1+0j$ | $n^{(1)}_{PUCCH,0}$ | 1, 1 |
| 5  | A   | N/D | N/D | | $n^{(1)}_{PUCCH,0}$ | $1+0j$ | $n^{(1)}_{PUCCH,0}$ | 1, 0 | $n^{(1)}_{PUCCH,0}$ | $1+0j$ | $n^{(1)}_{PUCCH,0}$ | 1, 0 |
| 6  | N/D | A   | N/D | | $n^{(1)}_{PUCCH,0}$ | $1+0j$ | $n^{(1)}_{PUCCH,0}$ | 0, 1 | $n^{(1)}_{PUCCH,0}$ | $1+0j$ | $n^{(1)}_{PUCCH,0}$ | 0, 1 |
| 7  | N/D | N/D | N   | | $n^{(1)}_{PUCCH,2}$ | $1+0j$ | $n^{(1)}_{PUCCH,2}$ | 0, 0 | $n^{(1)}_{PUCCH,2}$ | $1+0j$ | $n^{(1)}_{PUCCH,2}$ | 0, 0 |
| 8  | N   | N/D | D   | | $n^{(1)}_{PUCCH,0}$ | $1+0j$ | $n^{(1)}_{PUCCH,0}$ | 0, 0 | $n^{(1)}_{PUCCH,0}$ | $1+0j$ | $n^{(1)}_{PUCCH,0}$ | 0, 0 |
| 9  | N/D | N   | D   | | $n^{(1)}_{PUCCH,0}$ | $1+0j$ | $n^{(1)}_{PUCCH,0}$ | 0, 0 | $n^{(1)}_{PUCCH,0.}$ | $1+0j$ | $n^{(1)}_{PUCCH,0}$ | 0, 0 |
| 10 | D   | D   | D   | | | | | No Transmission | | | | |

TABLE 46

| | | | Antenna port #0 (p = 0) | | | | Antenna port #1 (p = 1) | | | |
|---|---|---|---|---|---|---|---|---|---|---|
| | | | | RS | | | | RS | | |
| HARQ-ACK (0) | HARQ-ACK (1) | HARQ-ACK (2) | $n^1_{PUCCH,i}$ | Modulation value | $n^1_{PUCCH,j}$ | Data b(0)b(1) | $n^1_{PUCCH,i}$ | Modulation value | $n^1_{PUCCH,i}$ | Data b(0)b(1) |
| 0  | A   | A   | A   | $n^{(1)}_{PUCCH,0}$ | $1+0j$ | $n^{(1)}_{PUCCH,1}$ | 1, 1 | $n^{(1)}_{PUCCH,3}$ | $1+0j$ | $n^{(1)}_{PUCCH,2}$ | 1, 1 |
| 1  | A   | N/D | A   | $n^{(1)}_{PUCCH,0}$ | $1+0j$ | $n^{(1)}_{PUCCH,1}$ | 1, 0 | $n^{(1)}_{PUCCH,3}$ | $1+0j$ | $n^{(1)}_{PUCCH,2}$ | 1, 0 |
| 2  | N/D | A   | A   | $n^{(1)}_{PUCCH,0}$ | $1+0j$ | $n^{(1)}_{PUCCH,1}$ | 0, 1 | $n^{(1)}_{PUCCH,3}$ | $1+0j$ | $n^{(1)}_{PUCCH,2}$ | 0, 1 |
| 3  | N/D | N/D | A   | $n^{(1)}_{PUCCH,2}$ | $1+0j$ | $n^{(1)}_{PUCCH,2}$ | 1, 1 | $n^{(1)}_{PUCCH,0}$ | $1+0j$ | $n^{(1)}_{PUCCH,0}$ | 1, 1 |
| 4  | A   | A   | N/D | $n^{(1)}_{PUCCH,0}$ | $1+0j$ | $n^{(1)}_{PUCCH,0}$ | 1, 1 | $n^{(1)}_{PUCCH,0}$ | $1+0j$ | $n^{(1)}_{PUCCH,0}$ | 1, 1 |
| 5  | A   | N/D | N/D | $n^{(1)}_{PUCCH,0}$ | $1+0j$ | $n^{(1)}_{PUCCH,0}$ | 1, 0 | $n^{(1)}_{PUCCH,0}$ | $1+0j$ | $n^{(1)}_{PUCCH,0}$ | 1, 0 |
| 6  | N/D | A   | N/D | $n^{(1)}_{PUCCH,0}$ | $1+0j$ | $n^{(1)}_{PUCCH,0}$ | 0, 1 | $n^{(1)}_{PUCCH,0}$ | $1+0j$ | $n^{(1)}_{PUCCH,0}$ | 0, 1 |
| 7  | N/D | N/D | N   | $n^{(1)}_{PUCCH,2}$ | $1+0j$ | $n^{(1)}_{PUCCH,2}$ | 0, 0 | $n^{(1)}_{PUCCH,2}$ | $1+0j$ | $n^{(1)}_{PUCCH,2}$ | 0, 0 |
| 8  | N   | N/D | D   | $n^{(1)}_{PUCCH,0}$ | $1+0j$ | $n^{(1)}_{PUCCH,0}$ | 0, 0 | $n^{(1)}_{PUCCH,0}$ | $1+0j$ | $n^{(1)}_{PUCCH,0}$ | 0, 0 |
| 9  | N/D | N   | D   | $n^{(1)}_{PUCCH,0}$ | $1+0j$ | $n^{(1)}_{PUCCH,0}$ | 0, 0 | $n^{(1)}_{PUCCH,0.}$ | $1+0j$ | $n^{(1)}_{PUCCH,0}$ | 0, 0 |
| 10 | D   | D   | D   | | | | No Transmission | | | | |

TABLE 47

| | HARQ-ACK (0) | HARQ-ACK (1) | HARQ-ACK (2) | Antenna port #0 (p = 0) | | | | Antenna port #1 (p = 1) | | | |
|---|---|---|---|---|---|---|---|---|---|---|---|
| | | | | RS | | Data | | RS | | Data | |
| | | | | $n^{(1)}_{PUCCH,i}$ | Modulation value | $n^{(1)}_{PUCCH,j}$ | b(0)b(1) | $n^{(1)}_{PUCCH,i}$ | Modulation value | $n^{(1)}_{PUCCH,i}$ | b(0)b(1) |
| 0 | A | A | A | $n^{(1)}_{PUCCH,1}$ | 1 + 0j | $n^{(1)}_{PUCCH,0}$ | 1, 1 | $n^{(1)}_{PUCCH,2}$ | 1 + 0j | $n^{(1)}_{PUCCH,3}$ | 1, 1 |
| 1 | A | N/D | A | $n^{(1)}_{PUCCH,1}$ | 1 + 0j | $n^{(1)}_{PUCCH,0}$ | 1, 0 | $n^{(1)}_{PUCCH,2}$ | 1 + 0j | $n^{(1)}_{PUCCH,3}$ | 1, 0 |
| 2 | N/D | A | A | $n^{(1)}_{PUCCH,1}$ | 1 + 0j | $n^{(1)}_{PUCCH,0}$ | 0, 1 | $n^{(1)}_{PUCCH,2}$ | 1 + 0j | $n^{(1)}_{PUCCH,3}$ | 0, 1 |
| 3 | N/D | N/D | A | $n^{(1)}_{PUCCH,2}$ | 1 + 0j | $n^{(1)}_{PUCCH,2}$ | 1, 1 | $n^{(1)}_{PUCCH,2}$ | 1 + 0j | $n^{(1)}_{PUCCH,2}$ | 1, 1 |
| 4 | A | A | N/D | $n^{(1)}_{PUCCH,0}$ | 1 + 0j | $n^{(1)}_{PUCCH,0}$ | 1, 1 | $n^{(1)}_{PUCCH,0}$ | 1 + 0j | $n^{(1)}_{PUCCH,0}$ | 1, 1 |
| 5 | A | N/D | N/D | $n^{(1)}_{PUCCH,0}$ | 1 + 0j | $n^{(1)}_{PUCCH,0}$ | 1, 0 | $n^{(1)}_{PUCCH,0}$ | 1 + 0j | $n^{(1)}_{PUCCH,0}$ | 1, 0 |
| 6 | N/D | A | N/D | $n^{(1)}_{PUCCH,0}$ | 1 + 0j | $n^{(1)}_{PUCCH,0}$ | 0, 1 | $n^{(1)}_{PUCCH,0}$ | 1 + 0j | $n^{(1)}_{PUCCH,0}$ | 0, 1 |
| 7 | N/D | N/D | N | $n^{(1)}_{PUCCH,2}$ | 1 + 0j | $n^{(1)}_{PUCCH,2}$ | 0, 0 | $n^{(1)}_{PUCCH,2}$ | 1 + 0j | $n^{(1)}_{PUCCH,2}$ | 0, 0 |
| 8 | N | N/D | D | $n^{(1)}_{PUCCH,0}$ | 1 + 0j | $n^{(1)}_{PUCCH,0}$ | 0, 0 | $n^{(1)}_{PUCCH,0}$ | 1 + 0j | $n^{(1)}_{PUCCH,0}$ | 0, 0 |
| 9 | N/D | N | D | $n^{(1)}_{PUCCH,0}$ | 1 + 0j | $n^{(1)}_{PUCCH,0}$ | 0, 0 | $n^{(1)}_{PUCCH,0}$ | 1 + 0j | $n^{(1)}_{PUCCH,0}$ | 0, 0 |
| 10 | D | D | D | | | No Transmission | | | | | |

TABLE 48

| | HARQ-ACK (0) | HARQ-ACK (1) | HARQ-ACK (2) | Antenna port #0 (p = 0) | | | | Antenna port #1 (p = 1) | | | |
|---|---|---|---|---|---|---|---|---|---|---|---|
| | | | | RS | | Data | | RS | | Data | |
| | | | | $n^{(1)}_{PUCCH,i}$ | Modulation value | $n^{(1)}_{PUCCH,j}$ | b(0)b(1) | $n^{(1)}_{PUCCH,i}$ | Modulation value | $n^{(1)}_{PUCCH,i}$ | b(0)b(1) |
| 0 | A | A | A | $n^{(1)}_{PUCCH,0}$ | 1 + 0j | $n^{(1)}_{PUCCH,1}$ | 1, 1 | $n^{(1)}_{PUCCH,2}$ | 1 + 0j | $n^{(1)}_{PUCCH,3}$ | 1, 1 |
| 1 | A | N/D | A | $n^{(1)}_{PUCCH,0}$ | 1 + 0j | $n^{(1)}_{PUCCH,1}$ | 1, 0 | $n^{(1)}_{PUCCH,2}$ | 1 + 0j | $n^{(1)}_{PUCCH,3}$ | 1, 0 |
| 2 | N/D | A | A | $n^{(1)}_{PUCCH,0}$ | 1 + 0j | $n^{(1)}_{PUCCH,1}$ | 0, 1 | $n^{(1)}_{PUCCH,2}$ | 1 + 0j | $n^{(1)}_{PUCCH,3}$ | 0, 1 |
| 3 | N/D | N/D | A | $n^{(1)}_{PUCCH,2}$ | 1 + 0j | $n^{(1)}_{PUCCH,2}$ | 1, 1 | $n^{(1)}_{PUCCH,2}$ | 1 + 0j | $n^{(1)}_{PUCCH,2}$ | 1, 1 |
| 4 | A | A | N/D | $n^{(1)}_{PUCCH,0}$ | 1 + 0j | $n^{(1)}_{PUCCH,0}$ | 1, 1 | $n^{(1)}_{PUCCH,0}$ | 1 + 0j | $n^{(1)}_{PUCCH,0}$ | 1, 1 |
| 5 | A | N/D | N/D | $n^{(1)}_{PUCCH,0}$ | 1 + 0j | $n^{(1)}_{PUCCH,0}$ | 1, 0 | $n^{(1)}_{PUCCH,0}$ | 1 + 0j | $n^{(1)}_{PUCCH,0}$ | 1, 0 |
| 6 | N/D | A | N/D | $n^{(1)}_{PUCCH,0}$ | 1 + 0j | $n^{(1)}_{PUCCH,0}$ | 0, 1 | $n^{(1)}_{PUCCH,0}$ | 1 + 0j | $n^{(1)}_{PUCCH,0}$ | 0, 1 |
| 7 | N/D | N/D | N | $n^{(1)}_{PUCCH,2}$ | 1 + 0j | $n^{(1)}_{PUCCH,2}$ | 0, 0 | $n^{(1)}_{PUCCH,2}$ | 1 + 0j | $n^{(1)}_{PUCCH,2}$ | 0, 0 |
| 8 | N | N/D | D | $n^{(1)}_{PUCCH,0}$ | 1 + 0j | $n^{(1)}_{PUCCH,0}$ | 0, 0 | $n^{(1)}_{PUCCH,0}$ | 1 + 0j | $n^{(1)}_{PUCCH,0}$ | 0, 0 |
| 9 | N/D | N | D | $n^{(1)}_{PUCCH,0}$ | 1 + 0j | $n^{(1)}_{PUCCH,0}$ | 0, 0 | $n^{(1)}_{PUCCH,0}$ | 1 + 0j | $n^{(1)}_{PUCCH,0}$ | 0, 0 |
| 10 | D | D | D | | | No Transmission | | | | | |

Table 49 shows a 4-bit FDD mapping table according to another embodiment of the present invention. A mapping table of antenna port #0 (p=0) conforms to the 1Tx mapping table. For nested property with respect to unavailable resources (due to generation of DTX) and PUCCH format 1b SORTD (reconfiguration handling), SORTD transmission can be performed when only a PDCCH corresponding to one of the two cells is detected (i.e. available resources are limited). In the case of implicit resource allocation, when the first resource for antenna port #0 (p=0) is $n_1$, the second resource for antenna port #1 (p=1) is $n_1+1$. Particularly, Table 49 is designed such that even though all resources are available in row 10, SORTD is employed for row 10 in order to secure a distance from other codewords.

TABLE 49

| | HARQ-ACK (0) | HARQ-ACK (1) | HARQ-ACK (2) | HARQ-ACK (3) | Antenna port #0 (p = 0) | | | | Antenna port #1 (p = 1) | | | |
|---|---|---|---|---|---|---|---|---|---|---|---|---|
| | | | | | RS | | Data | | RS | | Data | |
| | | | | | $n^{(1)}_{PUCCH,i}$ | Modulation value | $n^{(1)}_{PUCCH,j}$ | b(0)b(1) | $n^{(1)}_{PUCCH,i}$ | Modulation value | $n^{(1)}_{PUCCH,i}$ | b(0)b(1) |
| 0 | A | A | A | A | $n^{(1)}_{PUCCH,0}$ | 1 + 0j | $n^{(1)}_{PUCCH,1}$ | 1, 1 | $n^{(1)}_{PUCCH,2}$ | 1 + 0j | $n^{(1)}_{PUCCH,3}$ | 1, 1 |
| 1 | A | N/D | A | A | $n^{(1)}_{PUCCH,3}$ | 1 + 0j | $n^{(1)}_{PUCCH,2}$ | 0, 1 | $n^{(1)}_{PUCCH,1}$ | 1 + 0j | $n^{(1)}_{PUCCH,0}$ | 0, 1 |
| 2 | N/D | A | A | A | $n^{(1)}_{PUCCH,0}$ | 1 + 0j | $n^{(1)}_{PUCCH,1}$ | 0, 1 | $n^{(1)}_{PUCCH,2}$ | 1 + 0j | $n^{(1)}_{PUCCH,3}$ | 0, 1 |
| 3 | N/D | N/D | A | A | $n^{(1)}_{PUCCH,3}$ | 1 + 0j | $n^{(1)}_{PUCCH,3}$ | 1, 1 | $n^{(1)}_{PUCCH,2}$ | 1 + 0j | $n^{(1)}_{PUCCH,2}$ | 1, 1 |
| 4 | A | A | A | N/D | $n^{(1)}_{PUCCH,0}$ | 1 + 0j | $n^{(1)}_{PUCCH,1}$ | 1, 0 | $n^{(1)}_{PUCCH,2}$ | 1 + 0j | $n^{(1)}_{PUCCH,3}$ | 1, 0 |
| 5 | A | N/D | A | N/D | $n^{(1)}_{PUCCH,3}$ | 1 + 0j | $n^{(1)}_{PUCCH,2}$ | 0, 0 | $n^{(1)}_{PUCCH,1}$ | 1 + 0j | $n^{(1)}_{PUCCH,0}$ | 0, 0 |
| 6 | N/D | A | A | N/D | $n^{(1)}_{PUCCH,0}$ | 1 + 0j | $n^{(1)}_{PUCCH,1}$ | 0, 0 | $n^{(1)}_{PUCCH,2}$ | 1 + 0j | $n^{(1)}_{PUCCH,3}$ | 0, 0 |
| 7 | N/D | N/D | A | N/D | $n^{(1)}_{PUCCH,3}$ | 1 + 0j | $n^{(1)}_{PUCCH,3}$ | 1, 0 | $n^{(1)}_{PUCCH,2}$ | 1 + 0j | $n^{(1)}_{PUCCH,2}$ | 1, 0 |
| 8 | A | A | N/D | A | $n^{(1)}_{PUCCH,3}$ | 1 + 0j | $n^{(1)}_{PUCCH,2}$ | 1, 1 | $n^{(1)}_{PUCCH,1}$ | 1 + 0j | $n^{(1)}_{PUCCH,0}$ | 1, 1 |
| 9 | A | N/D | N/D | A | $n^{(1)}_{PUCCH,3}$ | 1 + 0j | $n^{(1)}_{PUCCH,2}$ | 1, 0 | $n^{(1)}_{PUCCH,1}$ | 1 + 0j | $n^{(1)}_{PUCCH,0}$ | 1, 0 |
| 10 | N/D | A | N/D | A | $n^{(1)}_{PUCCH,3}$ | 1 + 0j | $n^{(1)}_{PUCCH,3}$ | 0, 1 | $n^{(1)}_{PUCCH,2}$ | 1 + 0j | $n^{(1)}_{PUCCH,2}$ | 0, 1 |
| 11 | N/D | N/D | N/D | A | $n^{(1)}_{PUCCH,3}$ | 1 + 0j | $n^{(1)}_{PUCCH,3}$ | 0, 0 | $n^{(1)}_{PUCCH,2}$ | 1 + 0j | $n^{(1)}_{PUCCH,2}$ | 0, 0 |
| 12 | A | A | N/D | N/D | $n^{(1)}_{PUCCH,0}$ | 1 + 0j | $n^{(1)}_{PUCCH,0}$ | 1, 1 | $n^{(1)}_{PUCCH,1}$ | 1 + 0j | $n^{(1)}_{PUCCH,1}$ | 1, 1 |
| 13 | A | N/D | N/D | N/D | $n^{(1)}_{PUCCH,0}$ | 1 + 0j | $n^{(1)}_{PUCCH,0}$ | 1, 0 | $n^{(1)}_{PUCCH,1}$ | 1 + 0j | $n^{(1)}_{PUCCH,1}$ | 1, 0 |

TABLE 49-continued

| | | | | Antenna port #0 (p = 0) | | | | Antenna port #1 (p = 1) | | | |
| | | | | RS | | Data | | RS | | Data | |
| HARQ-ACK (0) | HARQ-ACK (1) | HARQ-ACK (2) | HARQ-ACK (3) | Modulation $n^1_{PUCCH,i}$ | value | $n^1_{PUCCHj}$ | b(0)b(1) | Modulation $n^1_{PUCCH,i}$ | value | $n^1_{PUCCH,i}$ | b(0)b(1) |
|---|---|---|---|---|---|---|---|---|---|---|---|
| 14 | N/D | A | N/D | N/D | $n^{(1)}_{PUCCH,0}$ | 1 + 0j | $n^{(1)}_{PUCCH,0}$ | 0, 1 | $n^{(1)}_{PUCCH,1}$ | 1 + 0j | $n^{(1)}_{PUCCH,1}$ | 0, 1 |
| 15 | N/D | N | N/D | N/D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 16 | N | N/D | N/D | N/D | $n^{(1)}_{PUCCH,0}$ | 1 + 0j | $n^{(1)}_{PUCCH,0}$ | 0, 0 | $n^{(1)}_{PUCCH,1}$ | 1 + 0j | $n^{(1)}_{PUCCH,1}$ | 0, 0 |
| 17 | D | D | N/D | N/D | | | | No Transmission | | | | |

Table 50 shows a 3-bit FDD mapping table according to the present invention.

TABLE 50

| | | | Antenna port #0 (p = 0) | | | | Antenna port #1 (p = 1) | | | |
| | | | RS | | Data | | RS | | Data | |
| HARQ-ACK (0) | HARQ-ACK (1) | HARQ-ACK (2) | Modulation $n^1_{PUCCH,i}$ | value | $n^1_{PUCCHj}$ | b(0)b(1) | Modulation $n^1_{PUCCH,i}$ | value | $n^1_{PUCCH,i}$ | b(0)b(1) |
|---|---|---|---|---|---|---|---|---|---|---|
| 0 | A | A | A | $n^{(1)}_{PUCCH,0}$ | 1 + 0j | $n^{(1)}_{PUCCH,1}$ | 1, 1 | $n^{(1)}_{PUCCH,2}$ | 1 + 0j | $n^{(1)}_{PUCCH,3}$ | 1, 1 |
| 1 | A | N/D | A | $n^{(1)}_{PUCCH,0}$ | 1 + 0j | $n^{(1)}_{PUCCH,1}$ | 1, 0 | $n^{(1)}_{PUCCH,2}$ | 1 + 0j | $n^{(1)}_{PUCCH,3}$ | 1, 0 |
| 2 | N/D | A | A | $n^{(1)}_{PUCCH,0}$ | 1 + 0j | $n^{(1)}_{PUCCH,1}$ | 0, 1 | $n^{(1)}_{PUCCH,2}$ | 1 + 0j | $n^{(1)}_{PUCCH,3}$ | 0, 1 |
| 3 | N/D | N/D | A | $n^{(1)}_{PUCCH,2}$ | 1 + 0j | $n^{(1)}_{PUCCH,2}$ | 1, 1 | $n^{(1)}_{PUCCH,3}$ | 1 + 0j | $n^{(1)}_{PUCCH,3}$ | 1, 1 |
| 4 | A | A | N/D | $n^{(1)}_{PUCCH,0}$ | 1 + 0j | $n^{(1)}_{PUCCH,0}$ | 1, 1 | $n^{(1)}_{PUCCH,0}$ | 1 + 0j | $n^{(1)}_{PUCCH,0}$ | 1, 1 |
| 5 | A | N/D | N/D | $n^{(1)}_{PUCCH,0}$ | 1 + 0j | $n^{(1)}_{PUCCH,0}$ | 1, 0 | $n^{(1)}_{PUCCH,0}$ | 1 + 0j | $n^{(1)}_{PUCCH,0}$ | 1, 0 |
| 6 | N/D | A | N/D | $n^{(1)}_{PUCCH,0}$ | 1 + 0j | $n^{(1)}_{PUCCH,0}$ | 0, 1 | $n^{(1)}_{PUCCH,0}$ | 1 + 0j | $n^{(1)}_{PUCCH,0}$ | 0, 1 |
| 7 | N/D | N/D | N | $n^{(1)}_{PUCCH,2}$ | 1 + 0j | $n^{(1)}_{PUCCH,2}$ | 0, 0 | $n^{(1)}_{PUCCH,2}$ | 1 + 0j | $n^{(1)}_{PUCCH,2}$ | 0, 0 |
| 8 | N | N/D | D | $n^{(1)}_{PUCCH,0}$ | 1 + 0j | $n^{(1)}_{PUCCH,0}$ | 0, 0 | $n^{(1)}_{PUCCH,0}$ | 1 + 0j | $n^{(1)}_{PUCCH,0}$ | 0, 0 |
| 9 | N/D | N | D | $n^{(1)}_{PUCCH,0}$ | 1 + 0j | $n^{(1)}_{PUCCH,0}$ | 0, 0 | $n^{(1)}_{PUCCH,0.}$ | 1 + 0j | $n^{(1)}_{PUCCH,0}$ | 0, 0 |
| 10 | D | D | D | | | | No Transmission | | | | |

Figure 16:
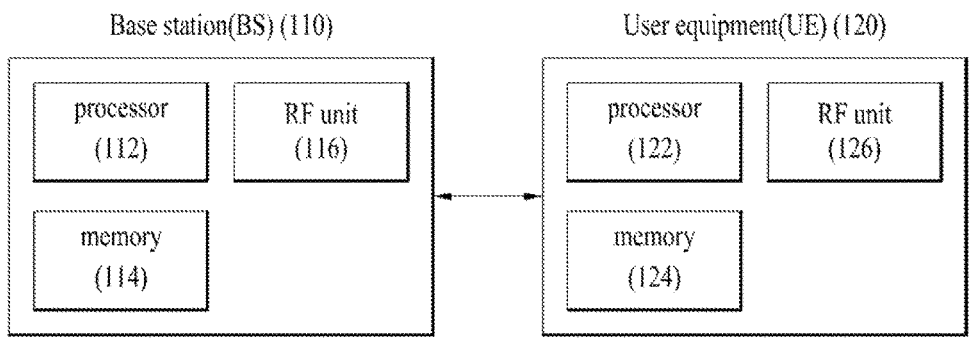
FIG. 16 illustrates a base station (BS) and UE applicable to embodiments of the present invention.

FIG. 16 illustrates a BS and a UE in a wireless communication system, which are applicable to embodiments of the present invention. When the wireless communication system includes a relay, the BS or UE can be replaced by the relay.

Referring to FIG. 16, a wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication apparatus such as a UE, relay, BS, etc.

The invention claimed is:

1. A method for transmitting uplink control information performed by a User Equipment (UE) in a wireless communication system, comprising:
generating a plurality of hybrid ARQ acknowledgements (HARQ-ACKs);
selecting, from among a plurality of resource indices, one first resource index for a first antenna port and two second resource indices for a second antenna port corresponding to the plurality of HARQ-ACKs;
transmitting, through the first antenna port to a base station (BS), a first modulation symbol corresponding to the plurality of HARQ-ACKs and a first reference signal for demodulating the first modulation symbol; and
transmitting, through the second antenna port to the BS, a second modulation symbol corresponding to the plurality of HARQ-ACKs and a second reference signal for demodulating the second modulation symbol,
wherein a transmission resource for the first modulation symbol, a transmission resource for the first reference signal, a transmission resource for the second modulation symbol, and a transmission resource for the second reference signal are defined by the following equation:
[Equation]

$$n_{PUCCH,RS}^{(1,p=p_0)} = n_{PUCCH}^{(1)}$$

$$n_{PUCCH,DATA}^{(1,p=p_0)} = n_{PUCCH}^{(1)}$$

$$n_{PUCCH,RS}^{(1,p=p_1)} = (n_{PUCCH}^{(1)}+2) \bmod (4)$$

$$n_{PUCCH,DATA}^{(1,p=p_1)} = n_{PUCCH,RS}^{(1,p=p_1)} + (-1)^{n_{PUCCH,RS}^{(1,p=p_1)}}$$

where $p_0$ represents the first antenna port, $p_1$ represents the second antenna port, both $n_{PUCCH,RS}^{(1,p=p_0)}$ and $n_{PUCCH,DATA}^{(1,p=p_0)}$ represent the one first resource index, and $n_{PUCCH,RS}^{(1,p=p_1)}$ and $n_{PUCCH,DATA}^{(1,p=p_1)}$ represent the two second resource indices, respectively, and $n_{PUCCH}^{(1)}$ represents a resource index defined for a single antenna transmission, and
wherein $n_{PUCCH,RS}^{(1,p=p_0)}$ indicates the transmission resource for the first reference signal, $n_{PUCCH,DATA}^{(1,p=p_0)}$ indicates the transmission resource for the first modulation symbol, $n_{PUCCH,RS}^{(1,p=p_1)}$ indicates the transmission resource for the second reference signal, and $n_{PUCCH,DATA}^{(1,p=p_1)}$ indicates the transmission resource for the second modulation symbol.

2. The method according to claim 1, wherein the plurality of resource indices includes a plurality of physical uplink control channel (PUCCH) format 1b resource indices.

3. The method according to claim 1, wherein the transmission resources for the first modulation symbol, the second modulation symbol, the first reference signal and the second reference signal include at least one of a physical resource block (PRB), a cyclic shift (CS) and an orthogonal cover code (OCC).

4. The method according to claim 1, wherein a PRB, a CS and an OCC used for transmission of the first modulation symbol are identical to a PRB, a CS and an OCC used for transmission of the first reference signal, and
wherein at least one of a PRB, a CS and an OCC used for transmission of the second modulation symbol is different from a PRB, a CS and an OCC used for transmission of the second reference signal.

5. The method according to claim 1, wherein, when normal cyclic prefix (CP) is configured, the first and second modulation symbols are transmitted on single carrier frequency division multiple access (SC-FDMA) symbols #0, #1, #5 and #6 in a slot and the first and second reference signals are transmitted on SC-FDMA symbols #2, #3 and #4 in the slot.

6. The method according to claim 1, wherein, when extended CP is configured, the first and second modulation symbols are transmitted on SC-FDMA symbols #0, #1, #4 and #5 in a slot and the first and second reference signals are transmitted on SC-FDMA symbols #2 and #3 in the slot.

7. A User Equipment (UE) configured to transmit uplink control information in a wireless communication system, comprising:
a radio frequency (RF) unit; and
a processor,
wherein the processor generates a plurality of hybrid HARQ-ACKs, selects, from among a plurality of resource indices, one first resource index for a first antenna port and two second resource indices for a second antenna port corresponding to the plurality of HARQ-ACKs, controls the RF unit to transmit, through the first antenna port to a base station (BS), a first modulation symbol corresponding to the plurality of HARQ-ACKs and a first reference signal for demodulating the first modulation symbol and control the RF unit to transmit, through the second antenna port to the BS, a second modulation symbol corresponding to the plurality of HARQ-ACKs and a second reference signal for demodulating the second modulation symbol,
wherein a transmission resource for the first modulation symbol, a transmission resource for the first reference signal, a transmission resource for the second modulation symbol, and a transmission resource for the second reference signal are defined by the following equation:
[Equation]

$$n_{PUCCH,RS}^{(1,p=p_0)} = n_{PUCCH}^{(1)}$$

$$n_{PUCCH,DATA}^{(1,p=p_0)} = n_{PUCCH}^{(1)}$$

$$n_{PUCCH,RS}^{(1,p=p_1)} = (n_{PUCCH}^{(1)}+2) \bmod (4)$$

$$n_{PUCCH,DATA}^{(1,p=p_1)} = n_{PUCCH,RS}^{(1,p=p_1)} + (-1)^{n_{PUCCH,RS}^{(1,p=p_1)}}$$

where $p_0$ represents the first antenna port, $p_1$ represents the second antenna port, both $n_{PUCCH,RS}^{(1,\tilde{p}=p_0)}$ and $n_{PUCCH,DATA}^{(1,\tilde{p}=p_0)}$ represent the one first resource index, and $n_{PUCCH,RS}^{(1,\tilde{p}=p_1)}$ and $n_{PUCCH,DATA}^{(1,\tilde{p}=p_1)}$ represent the two second resource indices, respectively, and $n_{PUCCH}^{(1)}$ represents a resource index defined for a single antenna transmission, and wherein $n_{PUCCH,RS}^{(1,\tilde{p}=p_0)}$ indicates the transmission resource for the first reference signal, $n_{PUCCH,DATA}^{(1,\tilde{p}=p_0)}$ indicates the transmission resource for the first modulation symbol, $n_{PUCCH,RS}^{(1,\tilde{p}=p_1)}$ indicates the transmission resource for the second reference signal, and $n_{PUCCH,DATA}^{(1,\tilde{p}=p_1)}$ indicates the transmission resource for the second modulation symbol.

8. The UE according to claim 7, wherein the plurality of resource indices includes a plurality of PUCCH format 1b resource indices.

9. The UE according to claim 7, wherein the transmission resources for the first modulation symbol, the second modulation symbol, the first reference signal and the second reference signal include at least one of a PRB, a CS and an OCC.

10. The UE according to claim 7, wherein a PRB, a CS and an OCC used for transmission of the first modulation symbol are identical to a PRB, a CS and an OCC used for transmission of the first reference signal, and wherein at least one of a PRB, a CS and an OCC used for transmission of the second modulation symbol is different from a PRB, a CS and an OCC used for transmission of the second reference signal.

11. The UE according to claim 7, wherein, when normal CP is configured, the first and second modulation symbols are transmitted on SC-FDMA symbols #0, #1, #5 and #6 in a slot and the first and second reference signals are transmitted on SC-FDMA symbols #2, #3 and #4 in the slot.

12. The UE according to claim 7, wherein, when extended CP is configured, the first and second modulation symbols are transmitted on SC-FDMA symbols #0, #1, #4 and #5 in a slot and the first and second reference signals are transmitted on SC-FDMA symbols #2 and #3 in the slot.

* * * * *